United States Patent
Yi et al.

(10) Patent No.: US 12,556,348 B2
(45) Date of Patent: Feb. 17, 2026

(54) POWER-SAVING ACTIVE BWP

(71) Applicant: KONINKLIJKE PHILIPS N.V., Eindhoven (NL)

(72) Inventors: Yunjung Yi, Vienna, VA (US); Esmael Hejazi Dinan, McLean, VA (US); Hua Zhou, Herndon, VA (US); Kyungmin Park, Vienna, VA (US); Hyoungsuk Jeon, Centreville, VA (US); Alireza Babaei, Fairfax, VA (US); Kai Xu, Herndon, VA (US)

(73) Assignee: Koninklijke Philips N.V., Eindhoven (NL)

( * ) Notice: Subject to any disclaimer, the term of this patent is extended or adjusted under 35 U.S.C. 154(b) by 1106 days.

(21) Appl. No.: 17/197,297

(22) Filed: Mar. 10, 2021

(65) Prior Publication Data

US 2021/0203468 A1    Jul. 1, 2021

Related U.S. Application Data

(63) Continuation of application No. PCT/US2020/025802, filed on Mar. 30, 2020.

(60) Provisional application No. 62/825,684, filed on Mar. 28, 2019.

(51) Int. Cl.
*H04L 5/00*        (2006.01)
*H04W 72/0453*     (2023.01)
(Continued)

(52) U.S. Cl.
CPC ....... *H04L 5/0098* (2013.01); *H04W 72/0453* (2013.01); *H04W 76/10* (2018.02); *H04W 76/27* (2018.02)

(58) Field of Classification Search
CPC ..... H04L 5/001; H04L 5/0053; H04L 5/0098; H04W 48/12; H04W 52/0216;
(Continued)

(56) References Cited

U.S. PATENT DOCUMENTS 10,700,845 B2   6/2020   Dinan
10,791,512 B2   9/2020   Kadiri et al.
(Continued)

FOREIGN PATENT DOCUMENTS

CN   110351854 A   * 10/2019   ........... H04L 5/0053
EP   3570613        11/2019
(Continued)

OTHER PUBLICATIONS

Li, "Configuration Information Indication Method And Communication Device," English Machine Translation of LI (CN 110351854A), Clarivate Analytics, pp. 1-22. (Year: 2023).*
(Continued)

*Primary Examiner* — Marcus Smith
*Assistant Examiner* — Kai Chang

(57) ABSTRACT

A wireless device receives configuration parameters indicating a non-dormant bandwidth part (BWP) for transitioning to a non-dormant state of a cell. The wireless device activates a first BWP as an active BWP in response to activation of the cell. The wireless device activates the non-dormant BWP as the active BWP in response to transitioning the cell from a dormant state to the non-dormant state.

19 Claims, 39 Drawing Sheets

(51) Int. Cl.
*H04W 76/10* (2018.01)
*H04W 76/27* (2018.01)

(58) Field of Classification Search
CPC ......... H04W 52/0229; H04W 72/0453; H04W 72/23; H04W 76/10; H04W 76/27; H04W 76/28; Y02D 30/70
See application file for complete search history.

(56) References Cited

U.S. PATENT DOCUMENTS

| | | | |
|---|---|---|---|
| 11,116,032 | B2 | 9/2021 | Zhou et al. |
| 11,871,349 | B2 | 1/2024 | Kuang et al. |
| 12,167,329 | B2* | 12/2024 | Iyer .................. H04W 52/0229 |
| 2014/0146680 | A1* | 5/2014 | Wang ................ H04W 52/0206 370/236 |
| 2017/0367046 | A1 | 12/2017 | Papasakellariou |
| 2018/0279229 | A1 | 9/2018 | Dinan |
| 2018/0279274 | A1 | 9/2018 | Sun et al. |
| 2019/0045491 | A1 | 2/2019 | Zhang et al. |
| 2019/0090299 | A1 | 3/2019 | Ang et al. |
| 2019/0103954 | A1* | 4/2019 | Lee ....................... H04L 5/0098 |
| 2019/0132109 | A1* | 5/2019 | Zhou .................. H04L 27/2607 |
| 2019/0166555 | A1 | 5/2019 | Cheng et al. |
| 2019/0222290 | A1 | 7/2019 | Ly et al. |
| 2019/0254110 | A1 | 8/2019 | He et al. |
| 2019/0289513 | A1 | 9/2019 | Jeon et al. |
| 2019/0357215 | A1* | 11/2019 | Zhou ................ H04W 72/0453 |
| 2019/0357238 | A1* | 11/2019 | Zhou ..................... H04W 72/23 |
| 2020/0119898 | A1* | 4/2020 | Orsino ................ H04B 17/336 |
| 2020/0205041 | A1 | 6/2020 | Ang et al. |
| 2020/0229081 | A1 | 7/2020 | Ang et al. |
| 2020/0236692 | A1 | 7/2020 | Lin et al. |
| 2020/0280894 | A1* | 9/2020 | Koskinen .............. H04L 5/0053 |
| 2020/0367307 | A1* | 11/2020 | Zhang ................. H04W 72/04 |
| 2020/0374914 | A1* | 11/2020 | Kim .................. H04W 72/0446 |
| 2021/0007139 | A1* | 1/2021 | Fu ....................... H04L 41/0896 |
| 2021/0014862 | A1* | 1/2021 | Yue ....................... H04W 56/00 |
| 2021/0185609 | A1* | 6/2021 | Zhou ................ H04W 52/0206 |
| 2021/0219154 | A1 | 7/2021 | Han et al. |
| 2021/0266135 | A1* | 8/2021 | Fu ........................ H04L 1/0025 |
| 2021/0306987 | A1* | 9/2021 | Takeda .................. H04W 72/02 |
| 2021/0352654 | A1* | 11/2021 | Ai ..................... H04W 72/0453 |
| 2021/0376975 | A1 | 12/2021 | Kim et al. |
| 2021/0377998 | A1* | 12/2021 | Li ......................... H04W 72/23 |
| 2021/0392651 | A1 | 12/2021 | Futaki et al. |
| 2022/0039009 | A1 | 2/2022 | Iyer et al. |
| 2022/0109547 | A1 | 4/2022 | Svedman et al. |
| 2022/0116923 | A1 | 4/2022 | Kim et al. |
| 2022/0210866 | A1 | 6/2022 | He et al. |
| 2024/0333466 | A1* | 10/2024 | Zhou ..................... H04L 5/0094 |

FOREIGN PATENT DOCUMENTS

| | | |
|---|---|---|
| EP | 3591887 | 1/2020 |
| EP | 3598806 | 1/2020 |
| EP | 3627910 | 3/2020 |
| WO | 2018/232090 A1 | 12/2018 |
| WO | 2019/032882 A1 | 2/2019 |
| WO | 2019050323 | 3/2019 |
| WO | WO-2019156527 A1 * | 8/2019 ......... H04L 41/0896 |
| WO | 2020/159222 A1 | 8/2020 |
| WO | 2020/192540 A1 | 10/2020 |
| WO | 2020/198594 A1 | 10/2020 |

OTHER PUBLICATIONS

R1-1810312 Discussion on power saving for CA operation; 3GPP TSG-RAN WG1 #94bis; Chengdu, China, Oct. 8-12, 2018; Agenda Item: 7.2.9.4; Source: LG Electronics; Document for: Discussion and decision.
R1-1813447 Ue Adaptation to the Traffic and UE Power Consumption Characteristics; 3GPP TSG-RAN WG1 #95; Spokane, Washington, USA, Nov. 12-16, 2018; Agenda Item: 7.2.9.2.1; Source: Qualcomm Incorporated; Document for. Discussion and decision.
R2-1803564 Dormant BWP for fast SCell activation; 3GPP TSG-RAN WG2 #101; Athens, Greece, Feb. 26-Mar. 2, 2018; Agenda Item: 10.3.1.2; Source: Qualcomm; Document for: Discussion and decision.
Office Action, mailed Dec. 9, 2022, in KR Patent Application No. 2021-7034949.
R2-1901020; 3GPP TSG-RAN WG2 Meeting #105; Athens, Greece, Feb. 25, 2019-Mar. 1, 2019; CR-Form-v11.4; Change Request; 38.331 CR-; rev-; Current version: 15.4.0; Title: RRC CR to configure SCell state in NR.
3GPP TS 38.212 V15.4.0 (Dec. 2018); Technical Specification; 3rd Generation Partnership Project; Technical Specification Group Radio Access Network; NR; Multiplexing and channel coding; (Release 15).
3GPP TS 38.213 V15.4.0 (Dec. 2018); Technical Specification; 3rd Generation Partnership Project; Technical Specification Group Radio Access Network; NR; Physical layer procedures for control (Release 15).
3GPP TS 38.214 V15.4.0 (Dec. 2018); Technical Specification; 3rd Generation Partnership Project; Technical Specification Group Radio Access Network; NR; Physical layer procedures for data; (Release 15).
3GPP TS 38.321 V15.4.0 (Dec. 2018); Technical Specification; 3rd Generation Partnership Project; Technical Specification Group Radio Access Network; NR; Medium Access Control (MAC) protocol specification; (Release 15).
3GPP TS 38.331 V15.4.0 (Dec. 2018); Technical Specification; 3rd Generation Partnership Project; Technical Specification Group Radio Access Network; NR; Radio Resource Control (RRC) protocol specification; (Release 15).
R1-1812361 Adaptation framework for UE power saving_final; 3GPP TSG-RAN WG1 #95; Spokane, USA, Nov. 12-16, 2018; Agenda Item:7.2.9.2.1; Souce: MediaTek Inc.; Title:Adaptation framework for UE power saving; Document for: Discussion and decision.
R1-1813448 Triggering mechanism for adaptation; 3GPP TSG-RAN WG1 Meeting #95; Nov. 12-16, 2018; Spokane, Washington, USA; ; Agenda item:7.2.9.2.2; Source: Qualcomm Incorporated.
R1-1906184 Efficient Scell activation_Final; 3GPP TSG RAN WG1 #97; Reno, USA, May 13-17, 2019; ; Source: vivo; Title:Efficient Scell activation; Agenda Item:7.2.13.4.
R1-1908198—Discussion on PDCCH-based power saving signal-final; 3GPP TSG RAN WG1 #98; Prague, Czech Republic, Aug. 26-30, 2019; Title: Discussion on PDCCH-based power saving signal; Source: ZTE; Agenda Item:7.2.9.1; Document for:Discussion and Decision.
R1-1908876; 3GPP TSG RAN WG1 #98 ; Prague, CZ, Aug. 26-30, 2019; ; Source: CMCC; Title:Discussion on fast activation and deactivation of Scell; Agenda item:7.2.13.3.
R1-1909421_On_Power_Savings_Indication_in_and_Outside_Active_time; 3GPP TSG-RAN WG1 Meeting #98; Prague, CZ, Aug. 26-30, 2019; ; Agenda item:7.2.9.1 ; Title:On Power Savings Indication in and Outside Active time; Source:Convida Wireless.
R2-1900803; 3GPP TSG-RAN WG2 Meeting#105; Athens, Greece, Feb. 25-Mar. 1, 2019; Source: ZTE Corporation, Sanechips; Title: Dormant State for SCells.
R2-1711189; 3GPP TSG-RAN WG2 NR #99bis Meeting; Prague, Czech, Oct. 9-13, 2017; Agenda item: 10.2.3 Source: Samsung; Title: Activation/deactivation of bandwidth parts in NR.
International Search Report for International Application No. PCT/US2020/025802, mail date of Jul. 13, 2020.
Office Action, mailed Dec. 8, 2022, in JP Patent Application No. 2021-557659.
R1-1903028; 3GPP TSG-RAN WG1 #96; Athens, Greece, Feb. 25-Mar. 1, 2019; Agenda item: 7.2.13.4; Source: Qualcomm Incorporated; Title: Solutions for Fast SCG and SCell Activation; Document for: Discussion/Decision.
R2-1808570; 3GPP TSG-RAN WG2 Meeting #102; Busan, Korea, May 21-May 25, 2018; Resubmission of R2-1805748; Agenda item: 10.3.1.2; Source: Qualcomm Inc; Title: Dormant BWP for fast

(56) References Cited

OTHER PUBLICATIONS

SCell activation; WID/51D: NR_newRAT-Core—Release 15; Document for: Discussion and Decision.
R4-1807545; 3GPP TSG-RAN WG4 #87; Busan, Korea (Republic of), May 21-May 25, 2018; Agenda item: 6.26; WF for RRM requirements for euCA; Nokia, Nokia Shanghai Bell.
R1-1901807; 3GPP TSG RAN WG1 Meeting #96; Athens, Greece, Feb. 25-Mar. 1, 2019; Agenda Item: 7.2.13.4; Source: MediaTek Inc.; Title: Efficient SCell Access Switching for NR; Document for: Discussion and Decision.
Ericsson, R2-1811629, Dormant SCell state in NR, 3GPP TSG RAN WG2 #103, 3GPP (Aug. 10, 2018).
Huawei et al., R2-1812600, Configuration of first Active BWPs for SCell [H341], 3GPP TSG RAN WG2 #103, 3GPP (Aug. 10, 2018).

\* cited by examiner

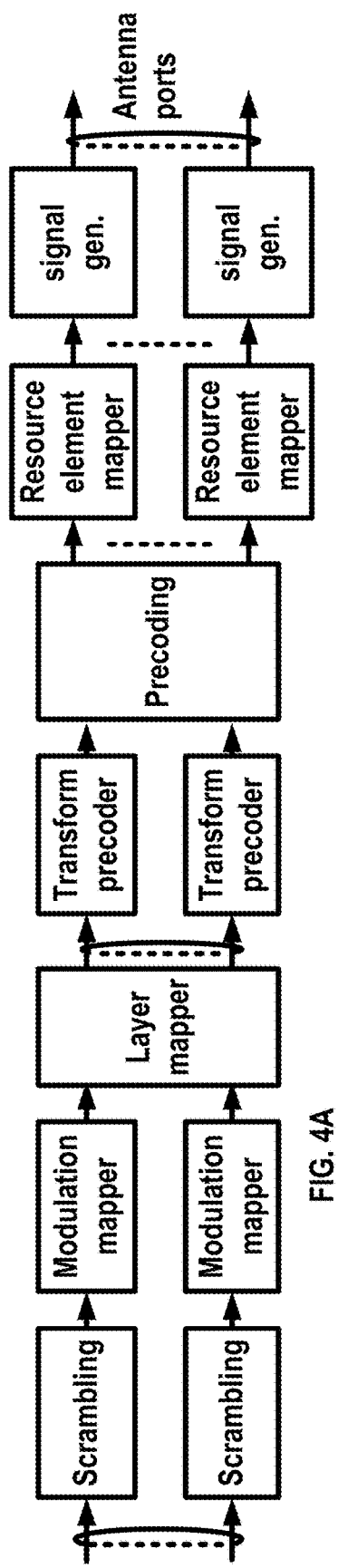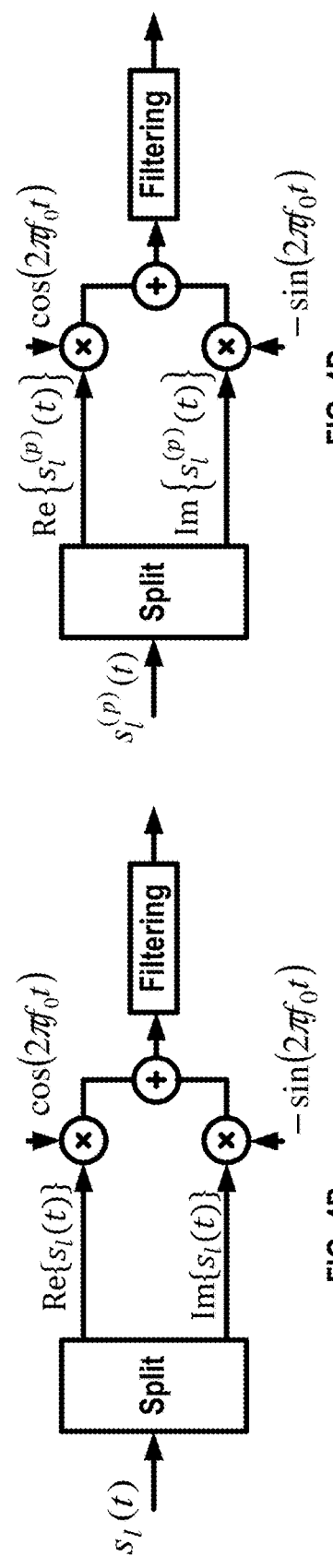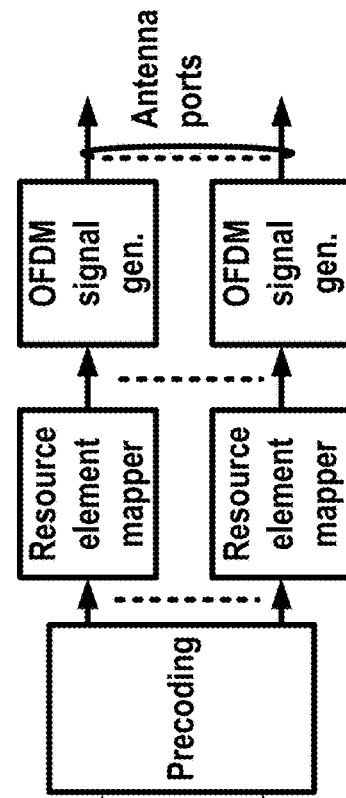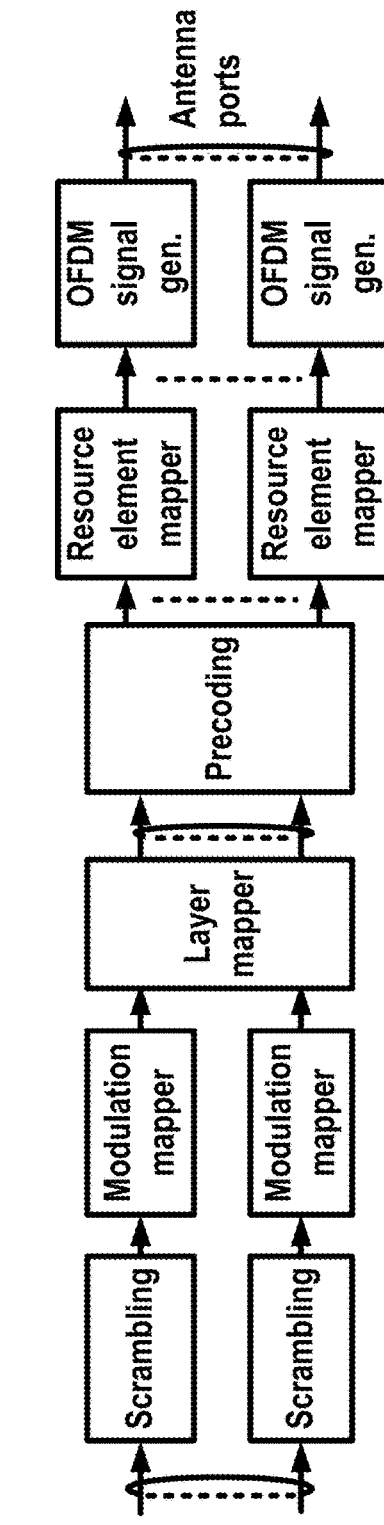

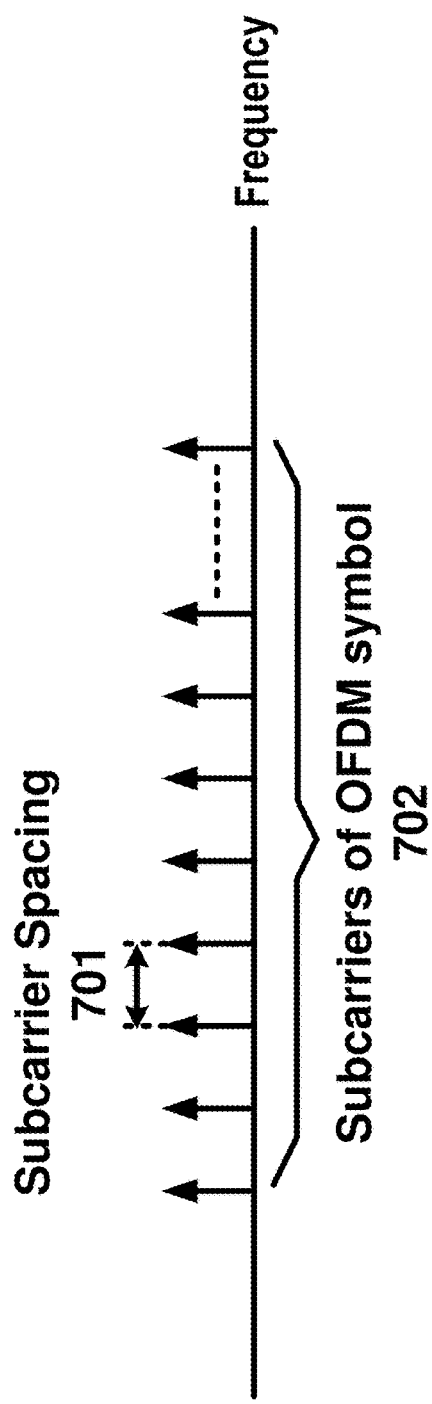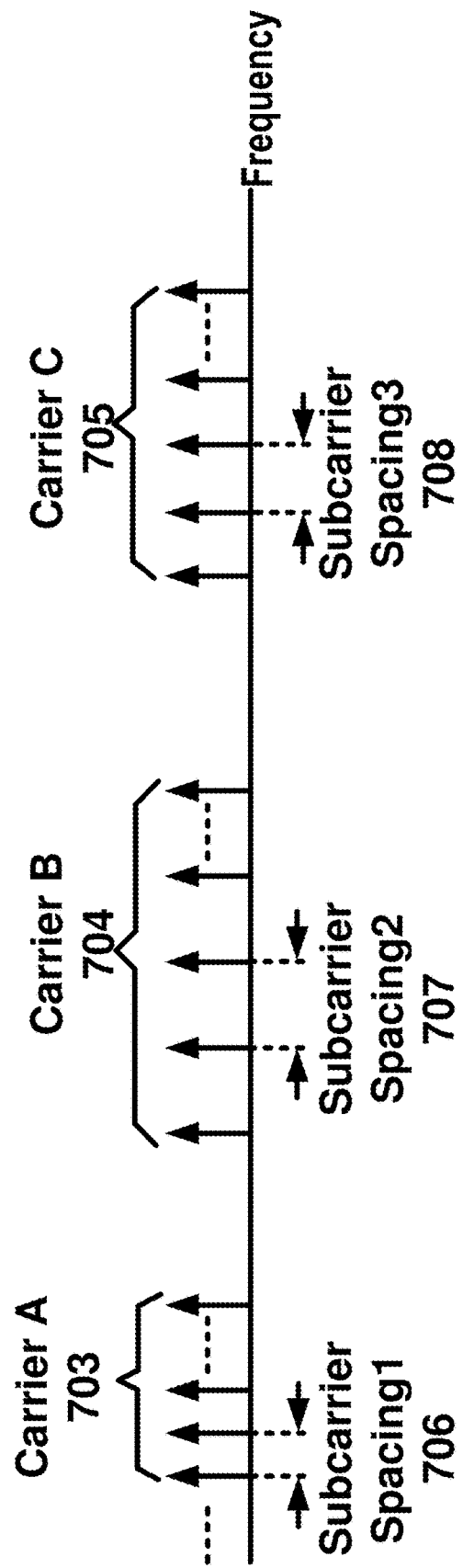
FIG. 7A
FIG. 7B

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 18

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 19

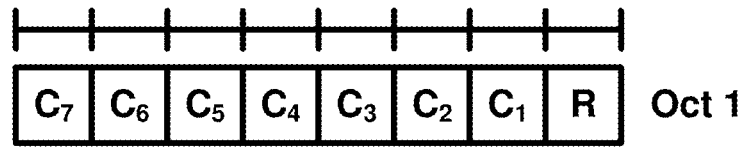
FIG. 21A
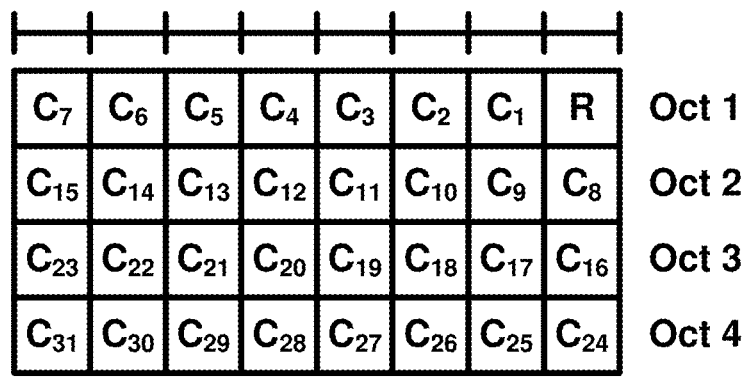
FIG. 21B
| Hibernation MAC CE $C_i$ | Activation/ Deactivation MAC CE $C_i$ | SCell may be |
|---|---|---|
| 0 | 0 | Deactivated |
| 0 | 1 | Activated |
| 1 | 0 | Reserved MAC CE combination |
| 1 | 1 | Dormant |
FIG. 21C

|  | DCI format | Example size (Bits) | Usage |
|---|---|---|---|
| Uplink | 0 | 45 | Uplink scheduling grant |
| | 4 | 53 | Uplink scheduling grant with spatial multiplexing |
| | 6-0A, 6-0B | 46, 36 | Uplink scheduling grant for eMTC devices |
| Downlink | 1C | 31 | Special purpose compact assignment |
| | 1A | 45 | Contiguous allocation only |
| | 1B | 46 | Codebook-based beamforming using CRS |
| | 1D | 46 | MU-MIMO using CRS |
| | 1 | 55 | Flexible allocations |
| | 2A | 64 | Open-loop spatial multiplexing using CRS |
| | 2B | 64 | Dual-layer transmission using DM-RS (TM8) |
| | 2C | 66 | Multi-layer transmission using DM-RS (TM9) |
| | 2D | 68 | Multi-layer transmission using DM-RS (TM9) |
| | 2 | 67 | Closed-loop spatial multiplexing using CRS |
| | 6-1A, 6-1B | 46, 36 | Downlink scheduling grants for eMTC devices |
| Special | 3, 3A | 45 | Power control commands |
| | 5 | | Sidelink operation |
| | 6-2 | | Paging/direct indication for eMTC devices |

FIG. 22

| | DCI format 1_0 | DCI format 1_1 |
|---|---|---|
| HARQ process number | set to all '1's | set to all '1's |
| Redundancy version | set to '11' | set to '11' |
| Modulation and coding scheme | set to all '0's | set to all '0's |
| Frequency domain resource assignment | set to all '1's | Allocation type 0: all set to '0'<br>Allocation type 1: all set to '1'<br>Allocation type 1/0 dynamic: all set to '0' |

FIG. 37

POWER-SAVING ACTIVE BWP

CROSS-REFERENCE TO RELATED APPLICATIONS

This application is a continuation of International Application No. PCT/US2020/025802, filed Mar. 30, 2020, which claims the benefit of U.S. Provisional Application No. 62/825,684, filed Mar. 28, 2019, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 7A and FIG. 7B are diagrams depicting example sets of OFDM subcarriers as per an aspect of an embodiment of the present disclosure.

FIG. 18 is an example of LCIDs for DL-SCH as per an aspect of an embodiment of the present disclosure.

FIG. 19 is an example of LCIDs for UL-SCH as per an aspect of an embodiment of the present disclosure.

FIG. 21A is an example of an SCell hibernation MAC CE of one octet as per an aspect of an embodiment of the present disclosure.

FIG. 21B is an example of an SCell hibernation MAC CE of four octets as per an aspect of an embodiment of the present disclosure.

FIG. 21C is an example of MAC control elements for an SCell state transitions as per an aspect of an embodiment of the present disclosure.

FIG. 22 is an example of DCI formats as per an aspect of an embodiment of the present disclosure.

FIG. 37 shows an example embodiment of prefixed DCI fields for a PS-DCI.

DETAILED DESCRIPTION OF EMBODIMENTS

Figure 1:
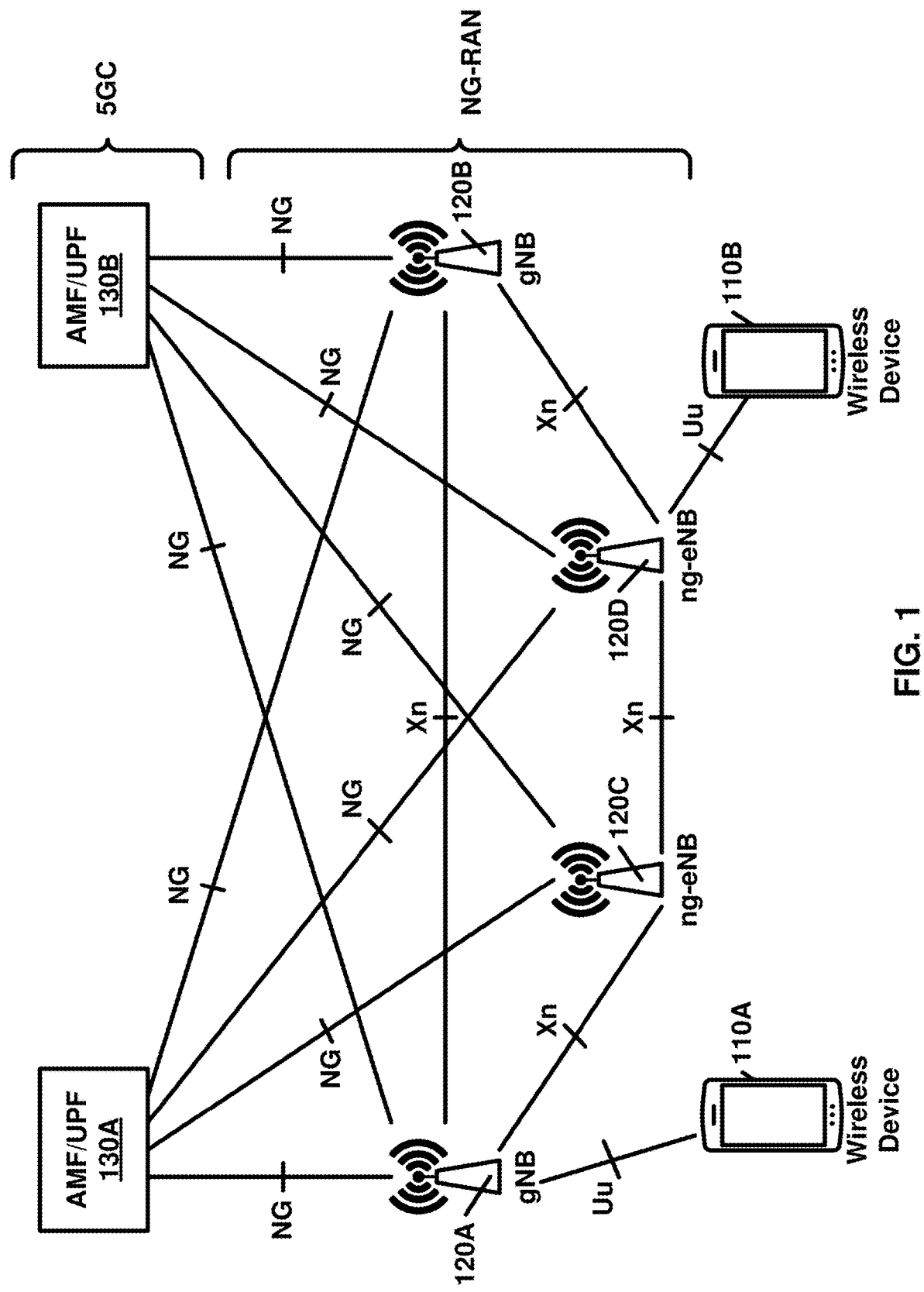
FIG. 1 is a diagram of an example RAN architecture as per an aspect of an embodiment of the present disclosure.

Example embodiments of the present disclosure enable wake-up procedure and power saving operations of a wireless device and/or one or more of base station(s). Embodiments of the technology disclosed herein may be employed in the technical field of multicarrier communication systems operated by one or more of base station(s). More particularly, the embodiments of the technology disclosed herein may relate to a wireless device and/or one or more of base station(s) in a multicarrier communication system.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CRC Cyclic Redundancy Check
CSS Common Search Space
CU Central Unit
DAI Downlink Assignment Index
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RNTI Radio Network Temporary Identifier
RRC Radio Resource Control
RRM Radio Resource Management
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
STAG secondary Timing Advance Group
TA Timing Advance
TAG Timing Advance Group
TAI Tracking Area Identifier
TAT Time Alignment Timer
TB Transport Block
TCI Transmission Configuration Indication
TC-RNTI Temporary Cell-Radio Network Temporary Identifier
TDD Time Division Duplex
TDMA Time Division Multiple Access
TRP Transmission Reception Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using pi-over-two Binary Phase Shift Keying ($\pi/2$-BPSK), Binary Phase Shift Keying (BPSK), Quadrature Phase Shift Keying (QPSK), 16-QAM, 64-QAM, 256-QAM, 1024-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QOS) flow management and mapping to data radio bearers, support of UEs in RRC_INACTIVE state, distribution function for Non-Access Stratum (NAS) messages, RAN sharing, dual connectivity or tight inter-working between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between 3rd Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
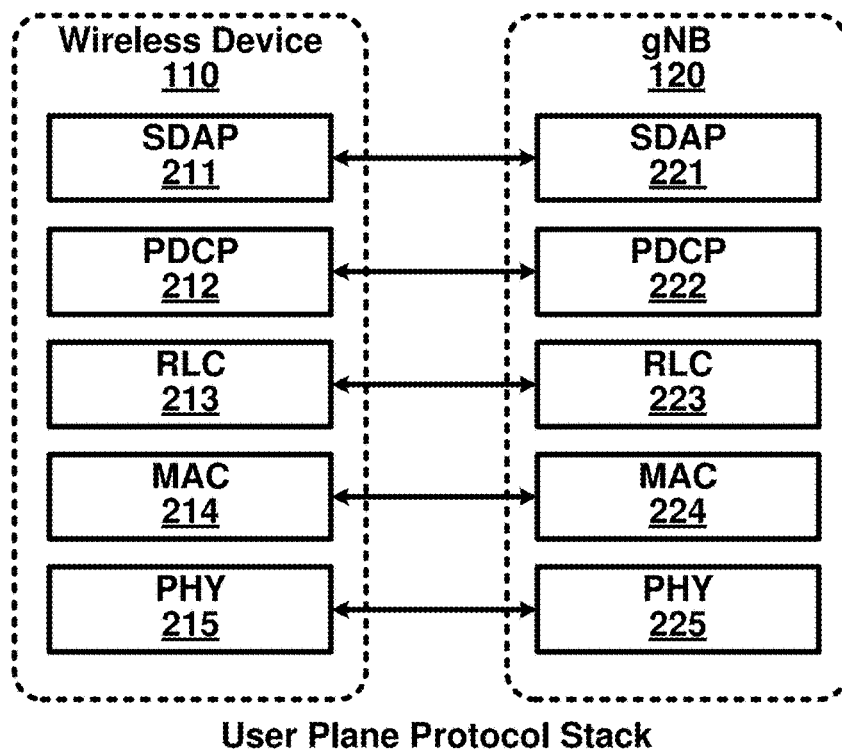
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
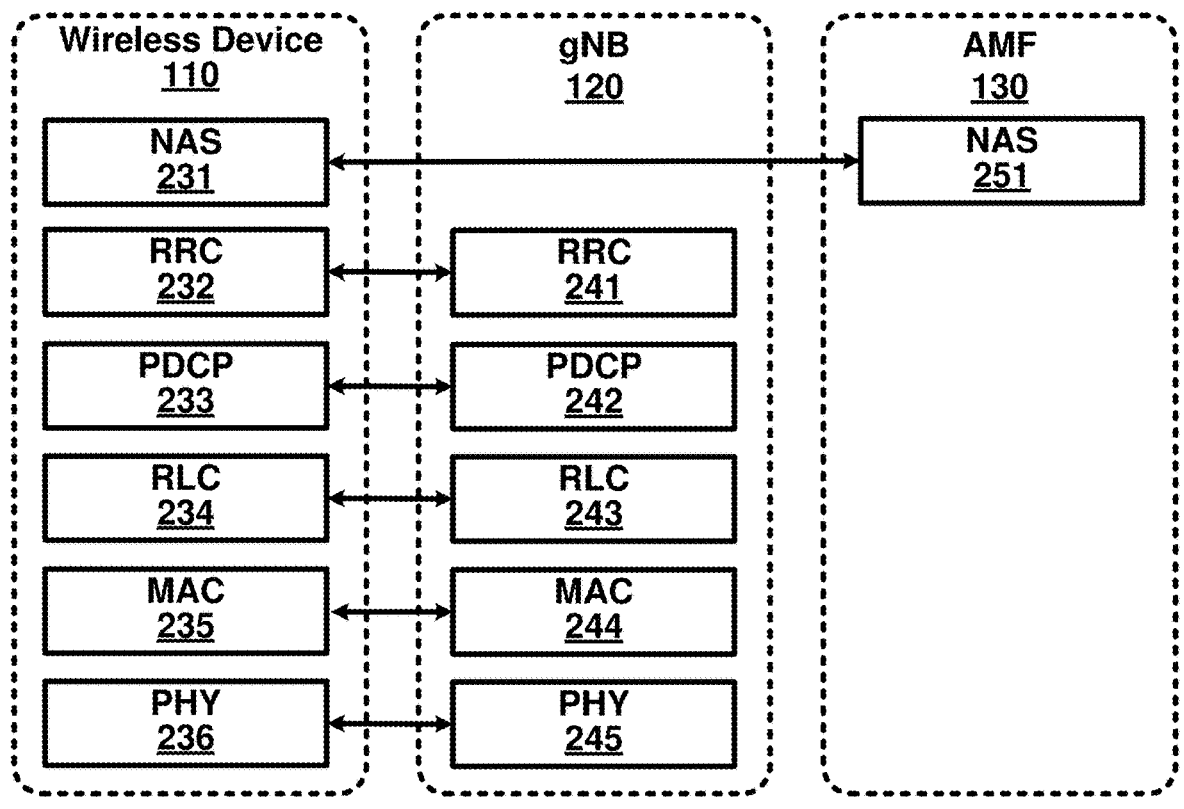
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. Note that the same control plane protocol stack is considered between a wireless device and ng-eNB. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/ pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
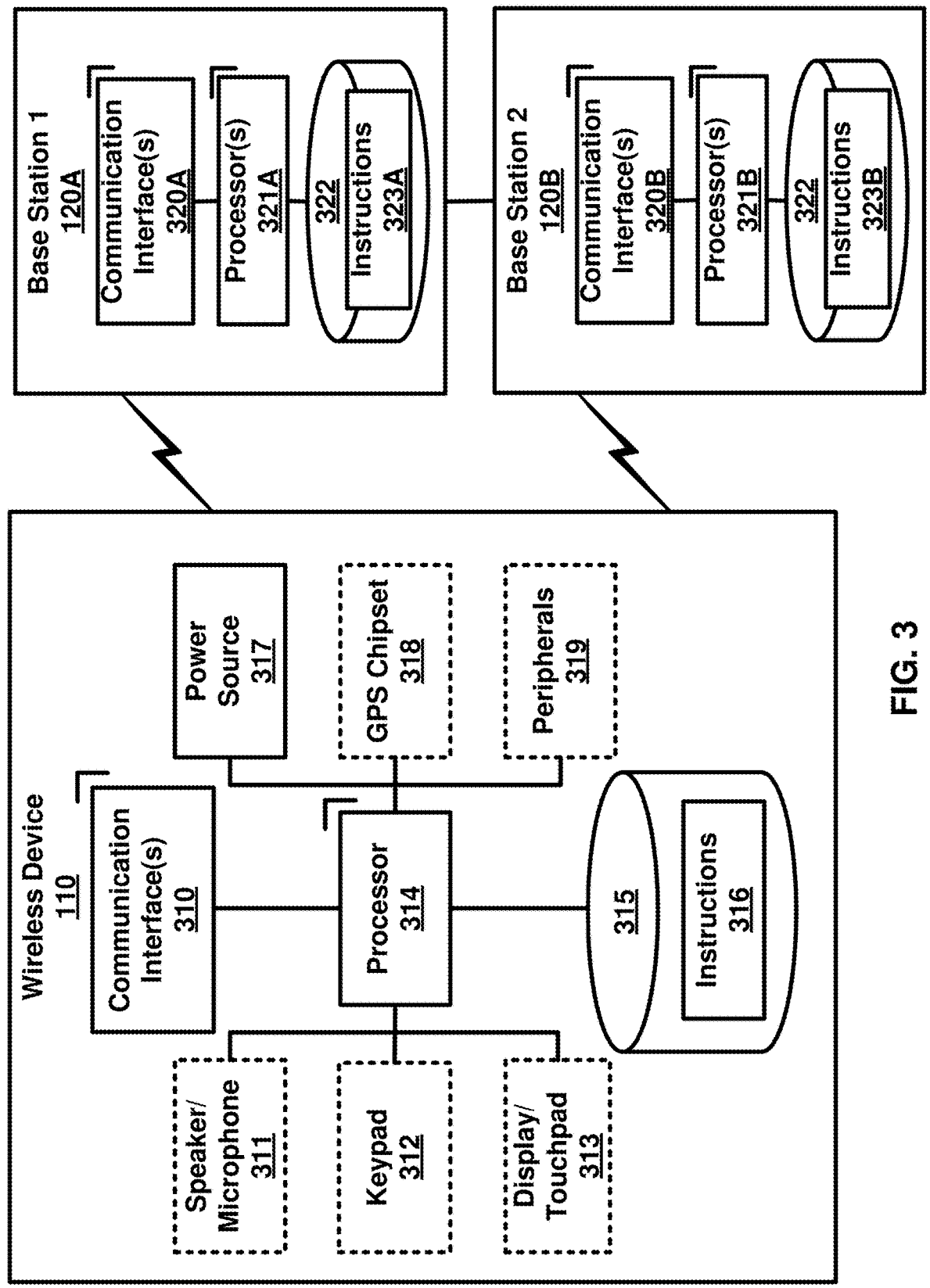
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, cNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SIs. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signalling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signalling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
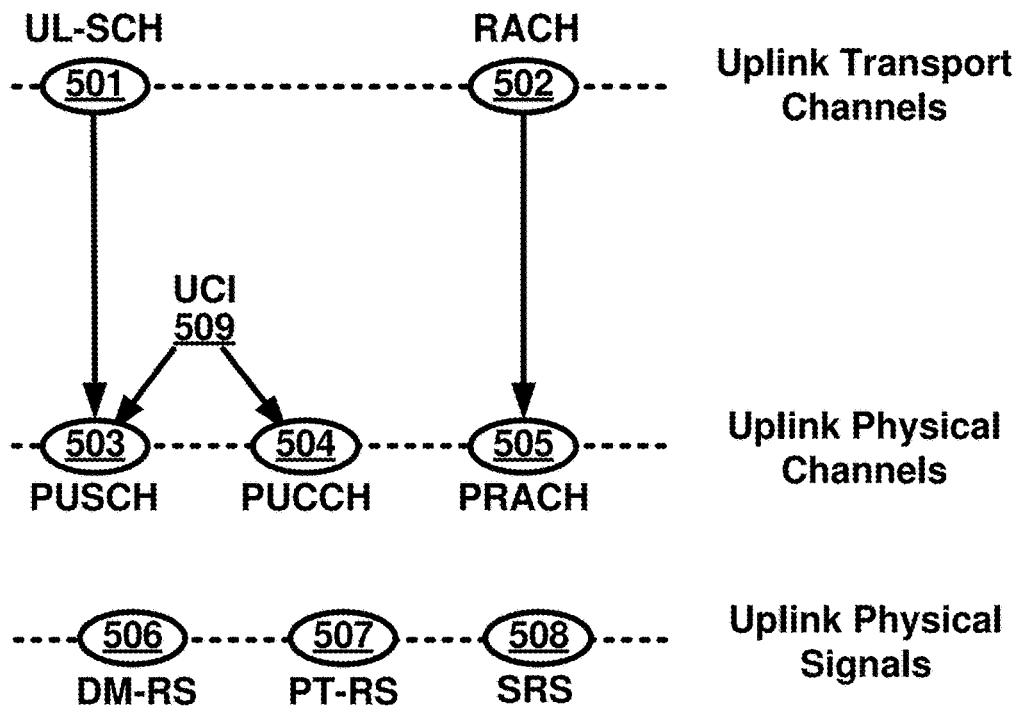
FIG. 5A is a diagram of an example uplink channel mapping and example uplink physical signals as per an aspect of an embodiment of the present disclosure.
Figure 5B:
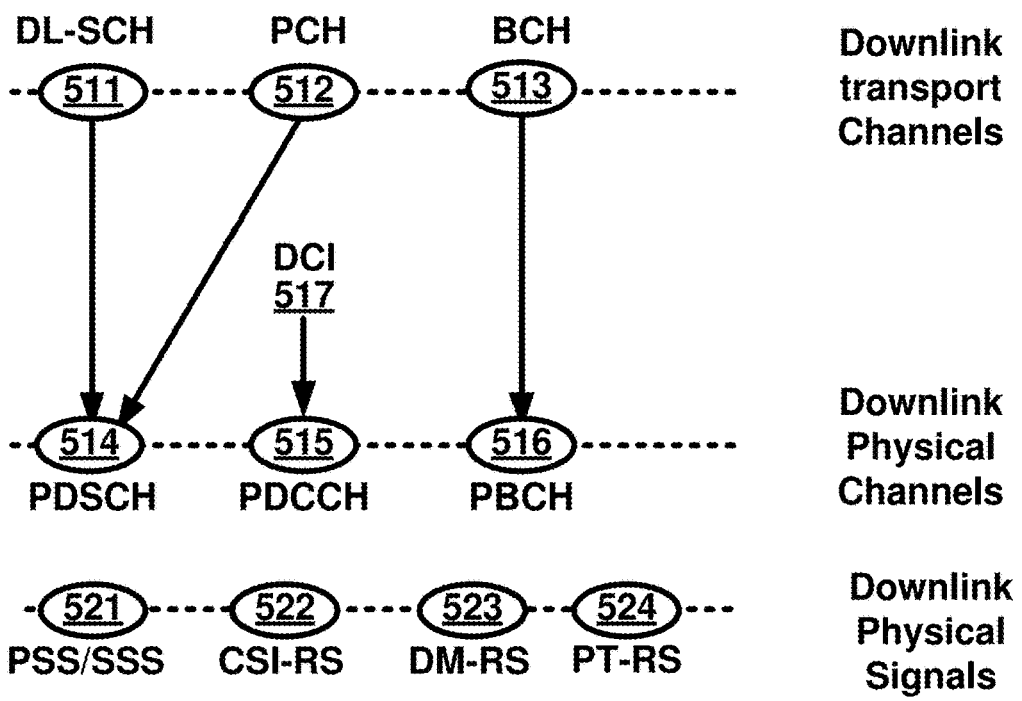
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SS/PBCH blocks when the downlink CSI-RS 522 and SS/PBCH blocks are spatially quasi co-located and resource elements associated with the downlink CSI-RS 522 are the outside of PRBs configured for SS/PBCH blocks.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
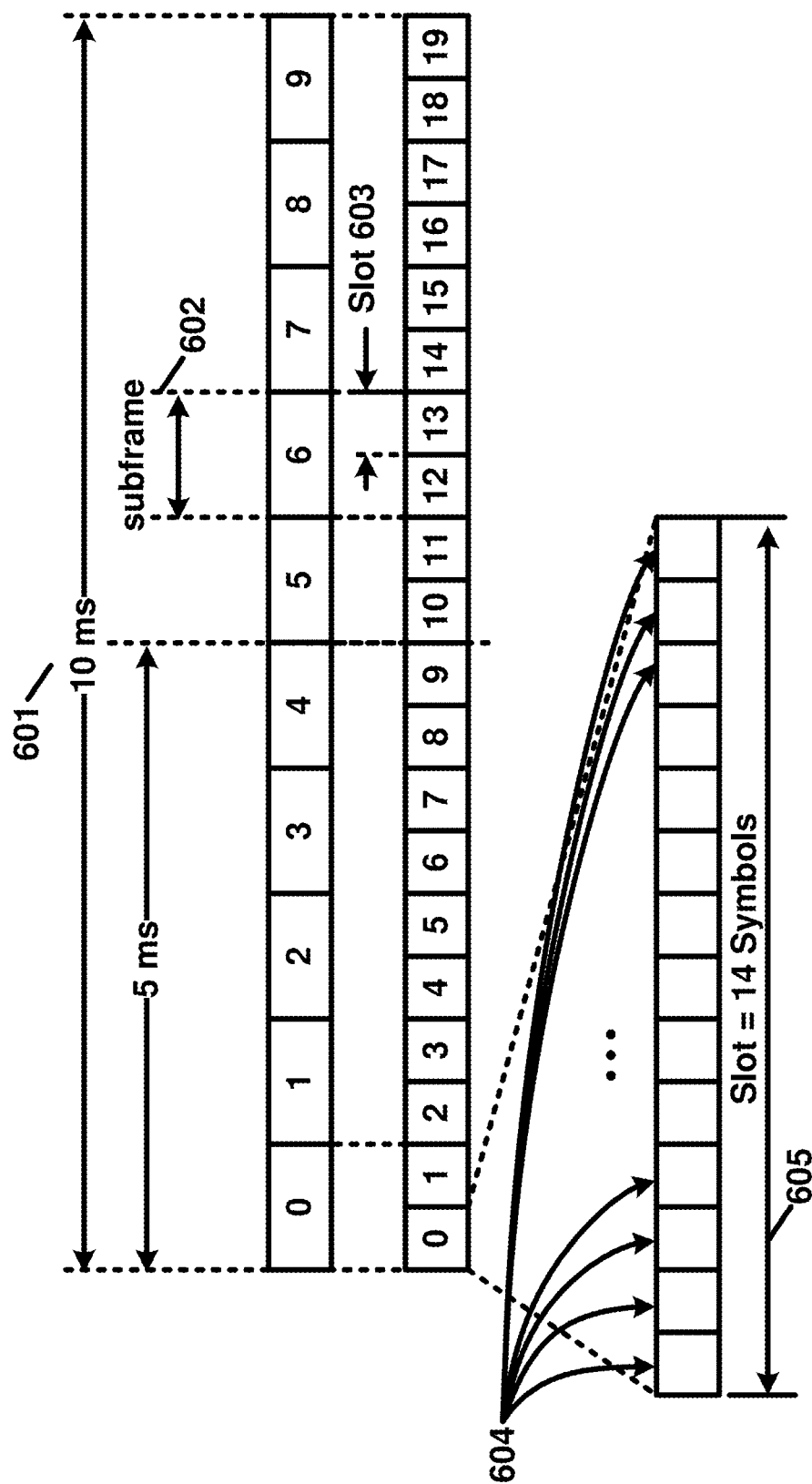
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz. 30 kHz, 60 kHz. 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
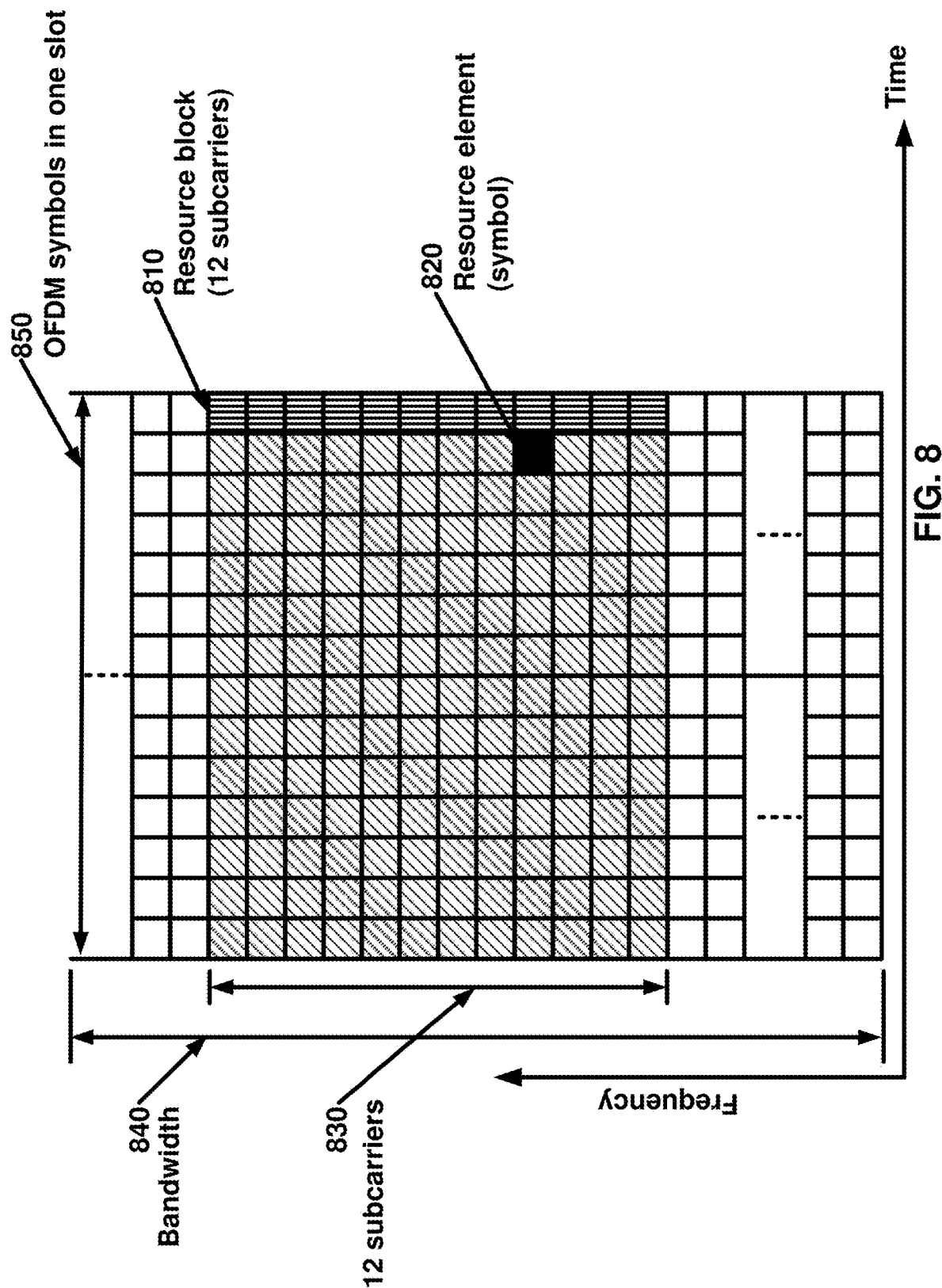
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; and/or a size of a bandwidth part of a carrier. In an example, a carrier may comprise multiple bandwidth parts. A first bandwidth part of a carrier may have different frequency location and/or bandwidth from a second bandwidth part of the carrier. In an example, there is one or more of active bandwidth part among the configured bandwidth parts where a size of RBG can be determined based on one or more of active bandwidth part(s).

In an example, a gNB may transmit a downlink control information comprising a downlink or uplink resource block assignment to a wireless device or a set of commands. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
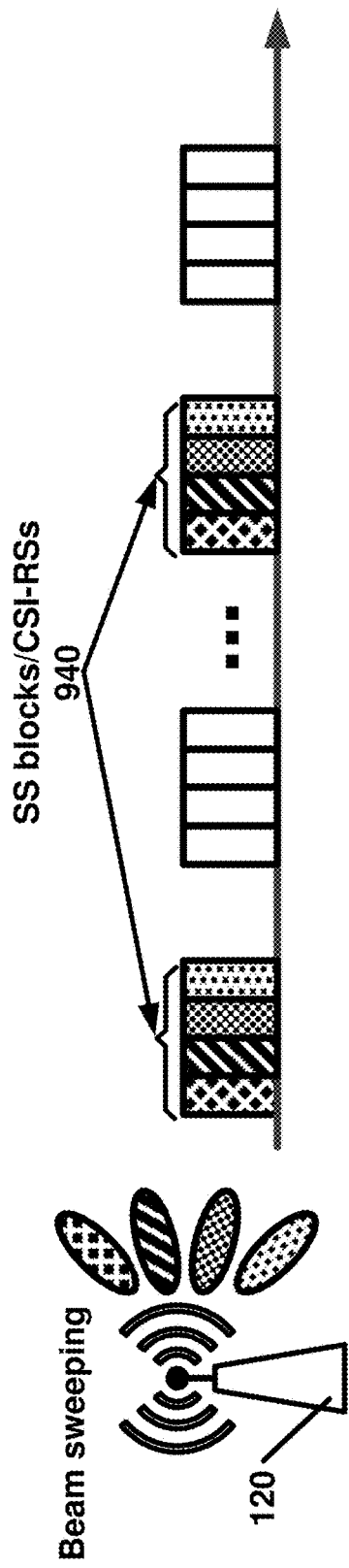
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
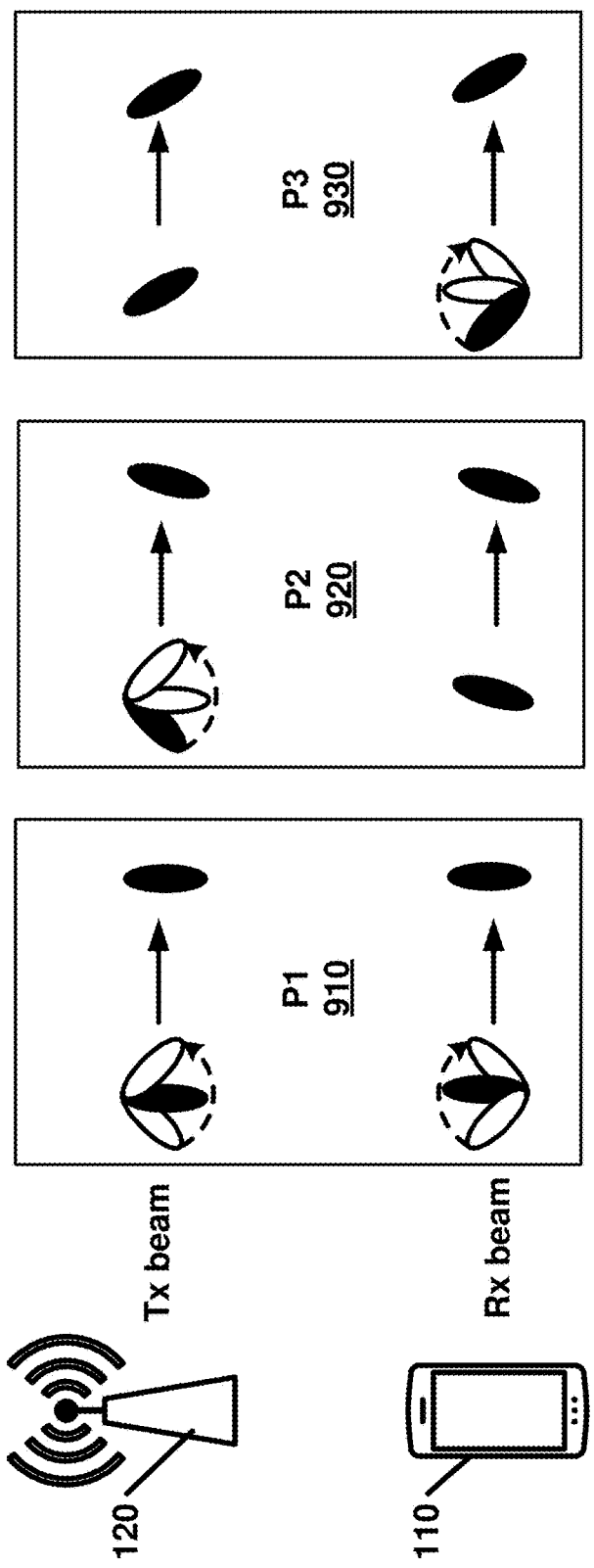
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
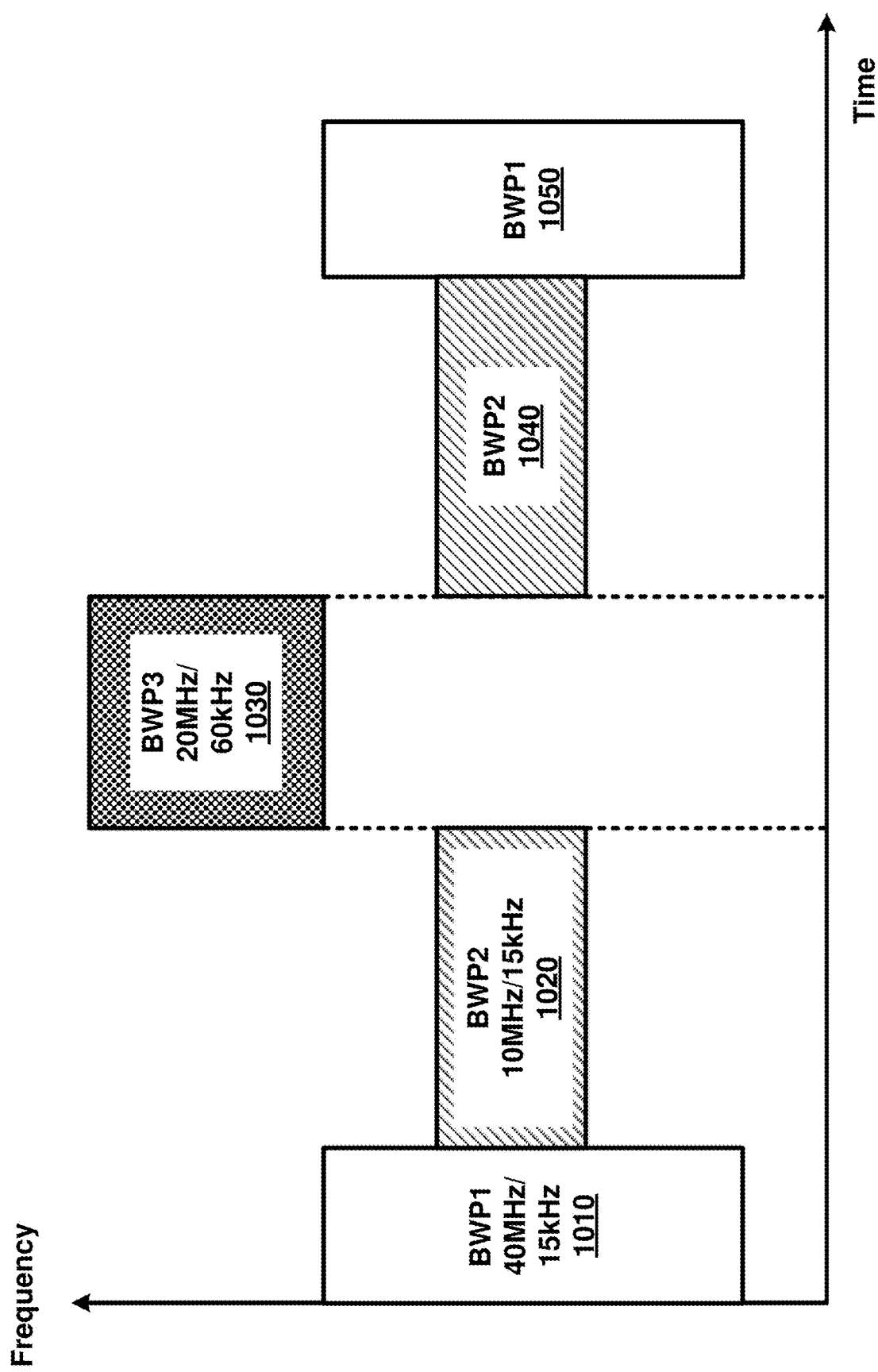
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 KHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base station may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
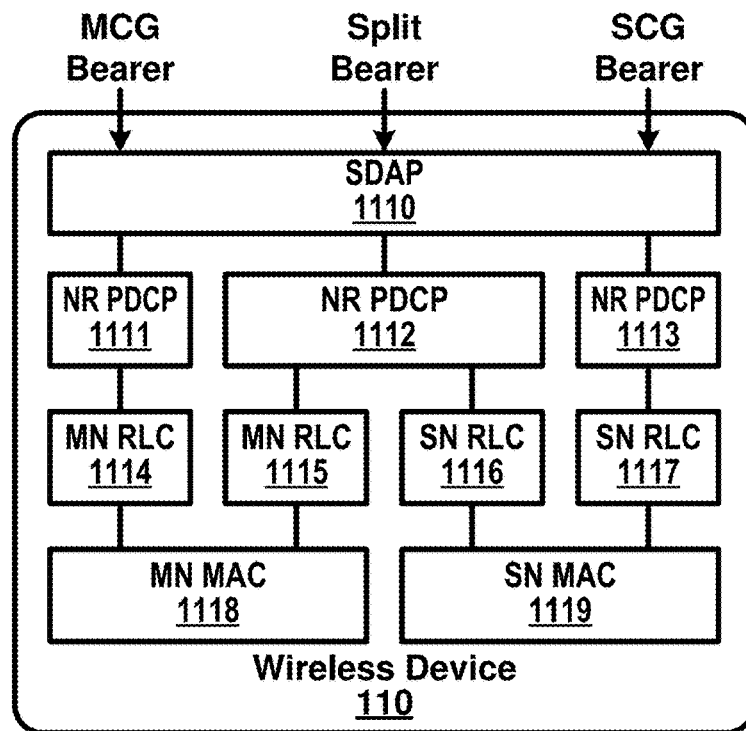
FIG. 11A, and FIG. 11B are diagrams of an example multi connectivity as per an aspect of an embodiment of the present disclosure.
Figure 11B:
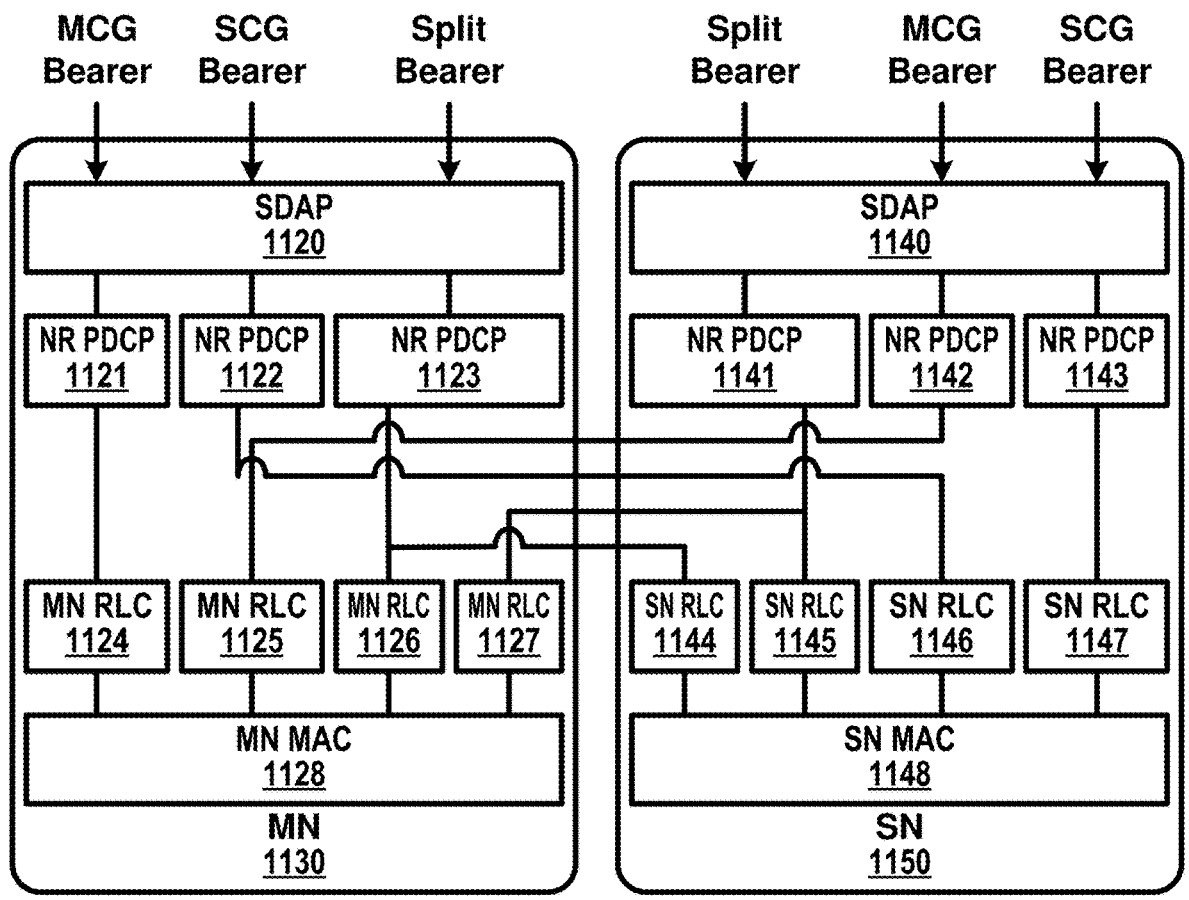

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain Radio Resource Management (RRM) measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
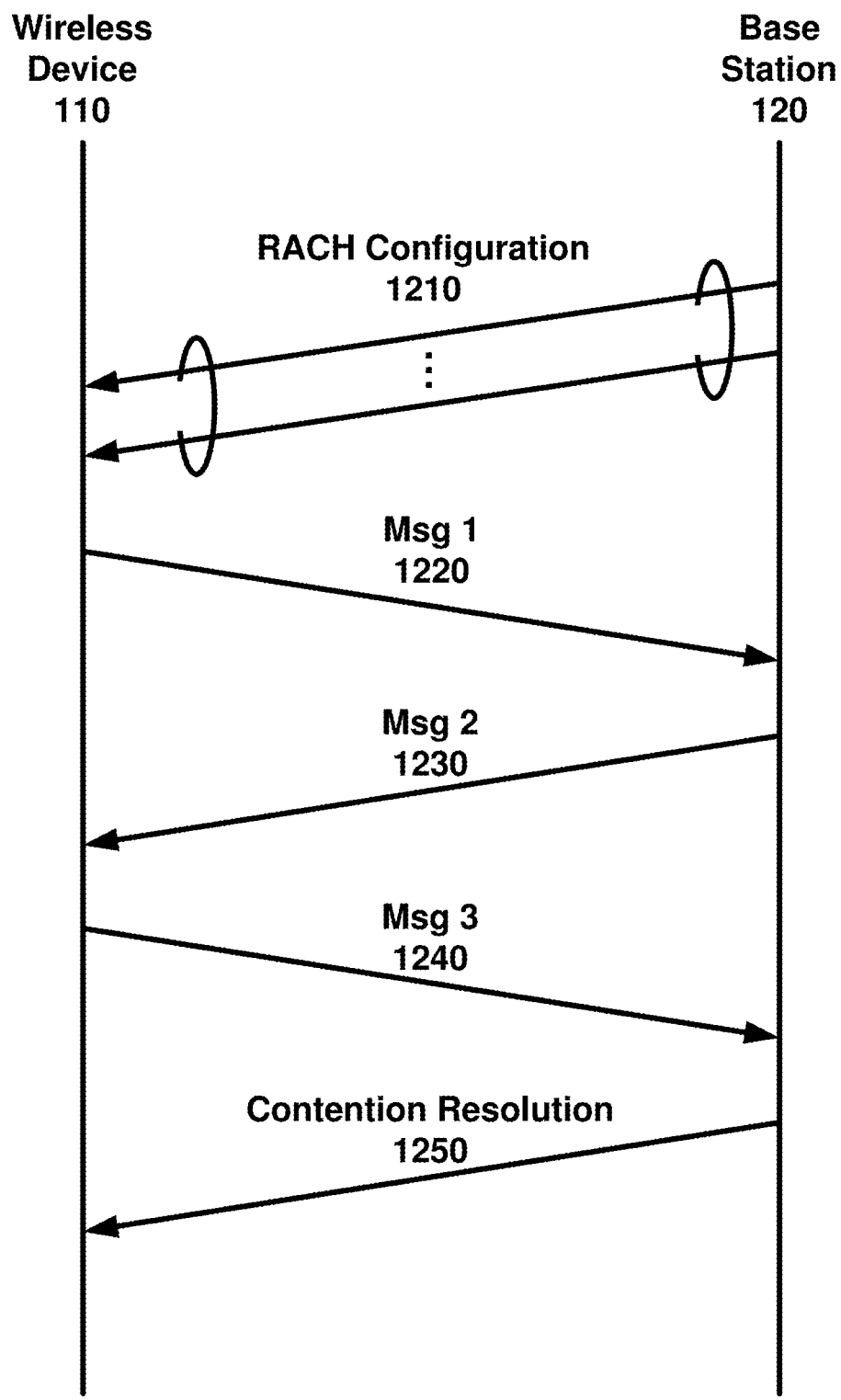
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
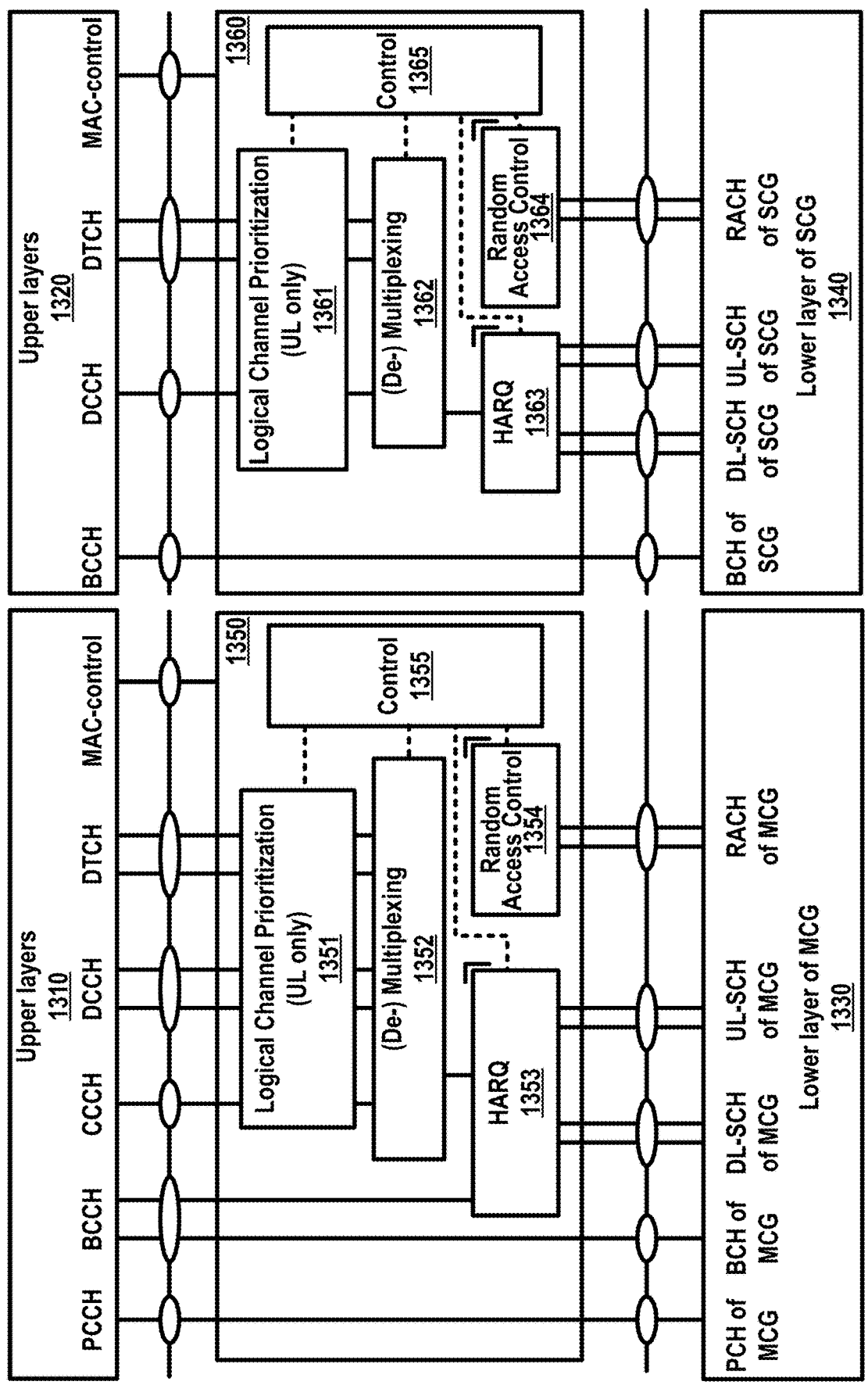
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
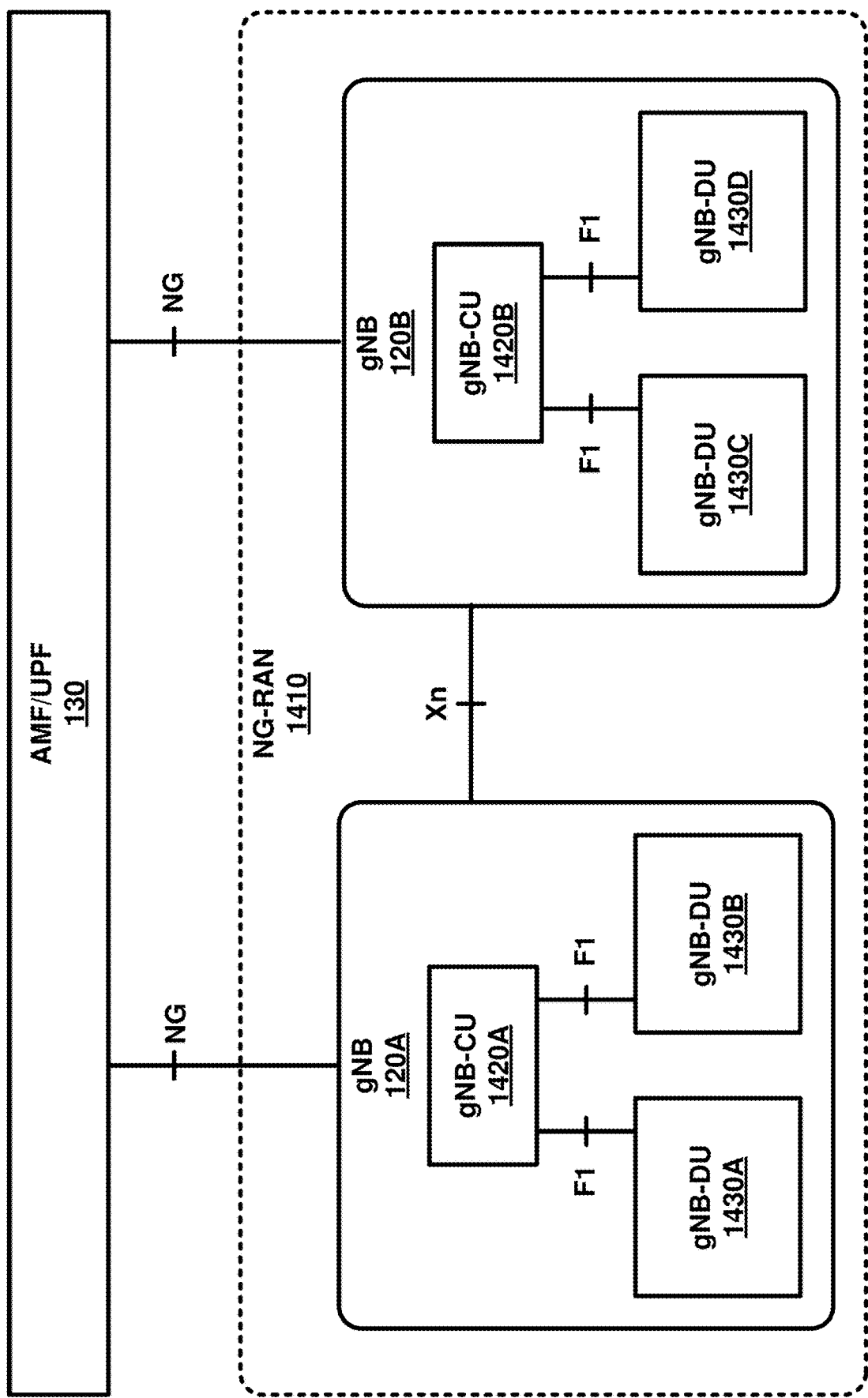
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
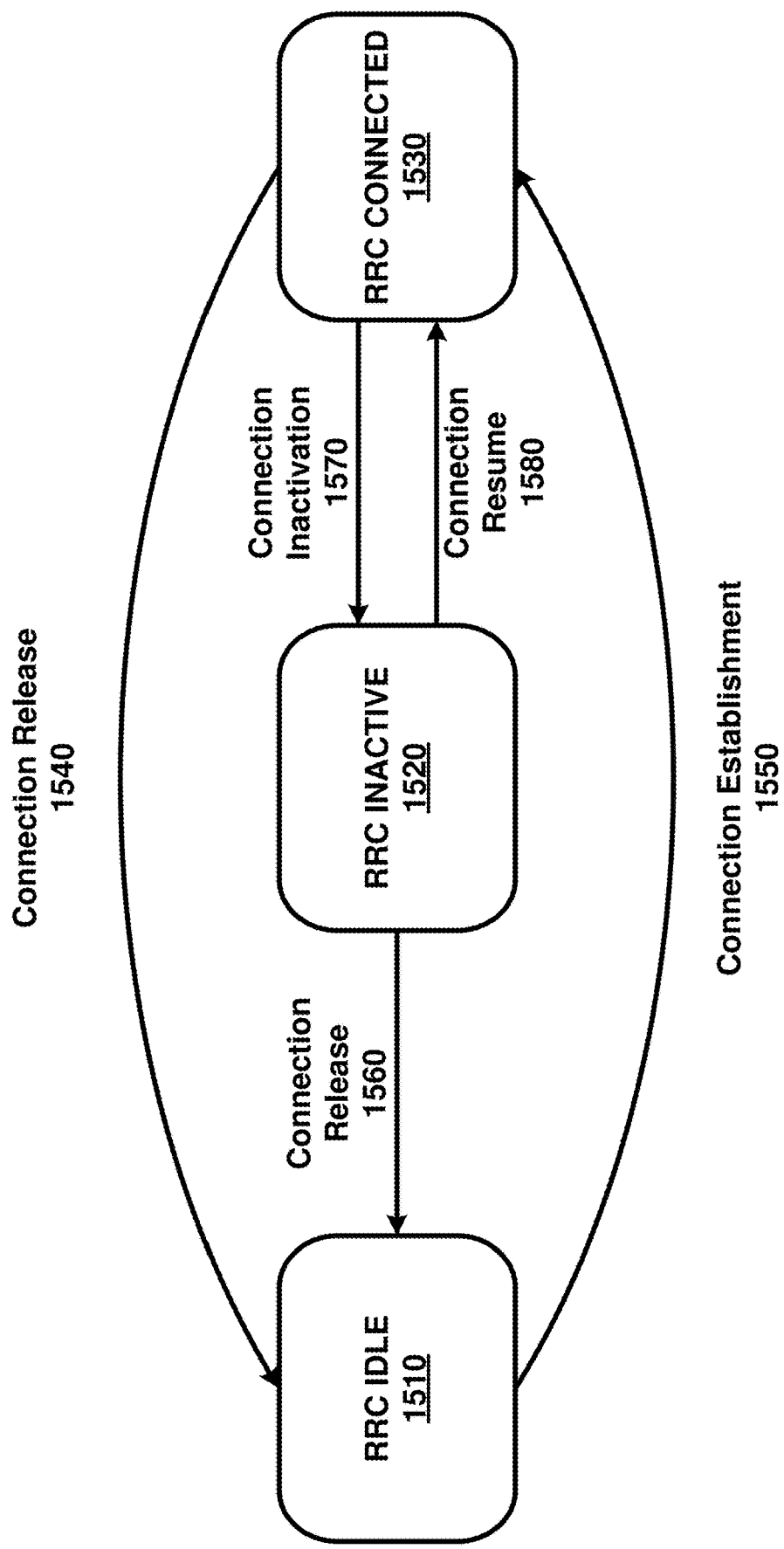
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

A gNB may transmit one or more MAC PDUs to a wireless device. In an example, a MAC PDU may be a bit string that is byte aligned (e.g., a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., a multiple of eight bits) in length. In an example, a MAC SDU may be included in a MAC PDU from the first bit onward.

In an example, a MAC CE may be a bit string that is byte aligned (e.g., a multiple of eight bits) in length.

In an example, a MAC subheader may be a bit string that is byte aligned (e.g., a multiple of eight bits) in length. In an example, a MAC subheader may be placed immediately in front of a corresponding MAC SDU, MAC CE, or padding.

In an example, a MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subhearder and a MAC SDU; a MAC subheader and a MAC CE; and/or a MAC subheader and padding. In an example, the MAC SDU may be of variable size. In an example, a MAC subhearder may correspond to a MAC SDU, a MAC CE, or padding.

In an example, when a MAC subheader corresponds to a MAC SDU, a variable-sized MAC CE, or padding, the MAC subheader may comprise: an R field with a one bit length; an F field with a one bit length; an LCID field with a multi-bit length; and/or an L field with a multi-bit length.

Figure 16A:
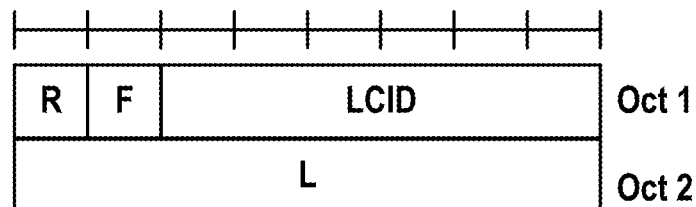
FIG. 16A, FIG. 16B and FIG. 16C are examples of MAC subheaders as per an aspect of an embodiment of the present disclosure.
Figure 16B:
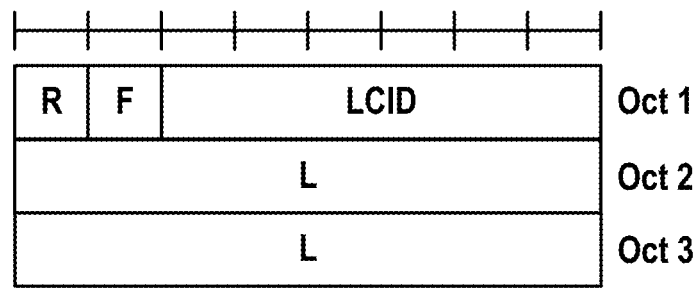

FIG. 16A shows an example of a MAC subheader with an R field, an F field, an LCID field, and an L field. In the example MAC subheader of FIG. 16A, the LCID field may be six bits in length, and the L field may be eight bits in length. FIG. 16B shows example of a MAC subheader with an R field, a F field, an LCID field, and an L field. In the example MAC subheader of FIG. 16B, the LCID field may be six bits in length, and the L field may be sixteen bits in length.

Figure 16C:
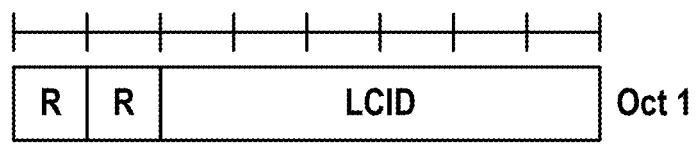

In an example, when a MAC subheader corresponds to a fixed sized MAC CE or padding, the MAC subheader may comprise: an R field with a two bit length and an LCID field with a multi-bit length. FIG. 16C shows an example of a MAC subheader with an R field and an LCID field. In the example MAC subheader of FIG. 16C, the LCID field may be six bits in length, and the R field may be two bits in length.

Figure 17A:
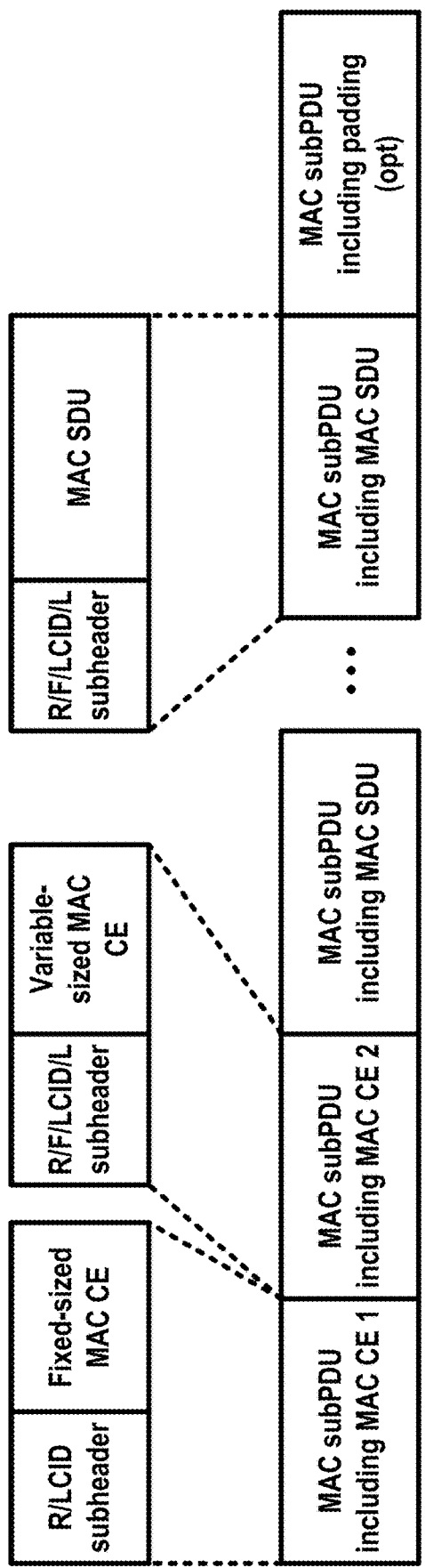
FIG. 17A and FIG. 17B are examples of MAC PDUs as per an aspect of an embodiment of the present disclosure.

FIG. 17A shows an example of a DL MAC PDU. In the example of FIG. 17A, multiple MAC CEs, such as MAC CE 1 and 2, may be placed together. A MAC subPDU comprising a MAC CE may be placed before any MAC subPDU comprising a MAC SDU or a MAC subPDU comprising padding.

Figure 17B:
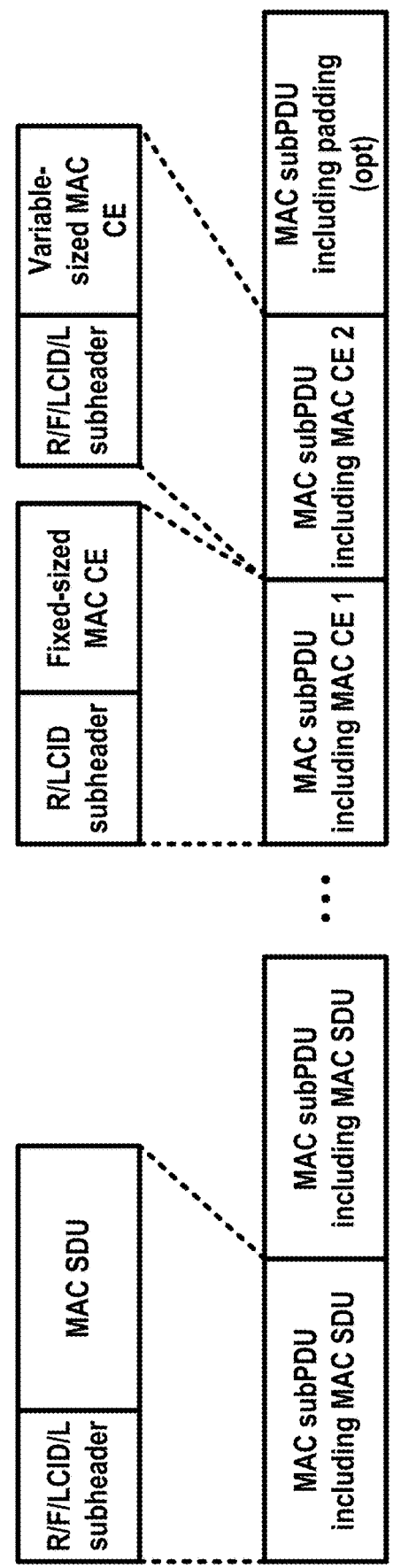

FIG. 17B shows an example of a UL MAC PDU. In the example of FIG. 17B, multiple MAC CEs, such as MAC CE 1 and 2, may be placed together. A MAC subPDU comprising a MAC CE may be placed after all MAC subPDUs comprising a MAC SDU. In addition, the MAC subPDU may be placed before a MAC subPDU comprising padding.

In an example, a MAC entity of a gNB may transmit one or more MAC CEs to a MAC entity of a wireless device. FIG. 18 shows an example of multiple LCIDs that may be associated with the one or more MAC CEs. In the example of FIG. 18, the one or more MAC CEs comprise at least one of: a SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a UE contention resolution identity MAC CE; a timing advance command MAC CE; a DRX command MAC CE; a Long DRX command MAC CE; an SCell activation/deactivation MAC CE (1 Octet); an SCell activation/deactivation MAC CE (4 Octet); and/or a duplication activation/deactivation MAC CE. In an example, a MAC CE, such as a MAC CE transmitted by a MAC entity of a gNB to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the gNB one or more MAC CEs. FIG. 19 shows an example of the one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry PHR MAC CE; a multiple entry PHR MAC CE; a short truncated BSR; and/or a long truncated BSR. In an example, a MAC CE may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells).

When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a gNB may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a gNB may activate or deactivate at least one of the one or more SCells. Upon configuration of an SCell, the SCell may be deactivated unless an SCell state associated with the SCell is set to "activated" or "dormant".

In an example, a wireless device may activate/deactivate an SCell in response to receiving an SCell Activation/Deactivation MAC CE.

In an example, a gNB may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising: SRS transmissions on the SCell; CQI/PMI/RI/CRI reporting for the SCell; PDCCH monitoring on the SCell; PDCCH monitoring for the SCell; and/or PUCCH transmissions on the SCell.

In an example, in response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivation- Timer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

In an example, when an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell.

In an example, when at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivationTimer) associated with the activated SCell.

In an example, when an SCell is deactivated, if there is an ongoing random access procedure on the SCell, a wireless device may abort the ongoing random access procedure on the SCell.

Figure 20A:
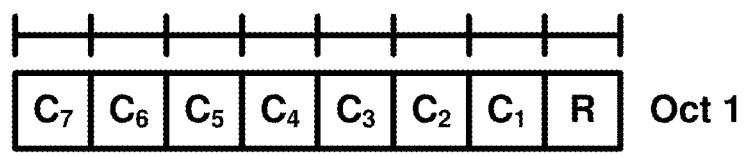
FIG. 20A is an example of an SCell Activation/Deactivation MAC CE of one octet as per an aspect of an embodiment of the present disclosure.

FIG. 20A shows an example of an SCell Activation/Deactivation MAC CE of one octet. A first MAC PDU subheader with a first LCID (e.g., '111010' as shown in FIG. 18) may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g., one).

Figure 20B:
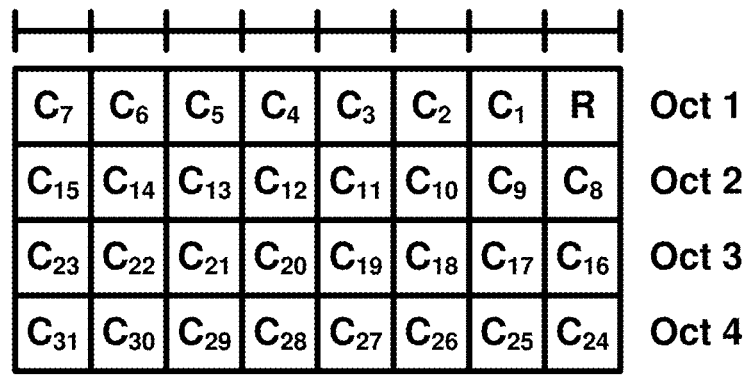
FIG. 20B is an example of an SCell Activation/Deactivation MAC CE of four octets as per an aspect of an embodiment of the present disclosure.

FIG. 20B shows an example of an SCell Activation/Deactivation MAC CE of four octets. A second MAC PDU subheader with a second LCID (e.g., '111001' as shown in FIG. 18) may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 20A and/or FIG. 20B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 20A and FIG. 20B, an R field may indicate a reserved bit. The R field may be set to zero.

When configured with CA, a base station and/or a wireless device may employ a hibernation mechanism for an SCell to improve battery or power consumption of the wireless device and/or to improve latency of SCell activation/addition. When the wireless device hibernates the SCell, the SCell may be transitioned into a dormant state. In response to the SCell being transitioned into a dormant state, the wireless device may: stop transmitting SRS on the SCell; report CQI/PMI/RI/PTI/CRI for the SCell according to a periodicity configured for the SCell in a dormant state; not transmit on UL-SCH on the SCell; not transmit on RACH on the SCell; not monitor the PDCCH on the SCell; not monitor the PDCCH for the SCell; and/or not transmit PUCCH on the SCell. In an example, reporting CSI for an SCell and not monitoring the PDCCH on/for the SCell, when the SCell is in a dormant state, may provide the base station an always-updated CSI for the SCell. With the always-updated CSI, the base station may employ a quick and/or accurate channel adaptive scheduling on the SCell once the SCell is transitioned back into active state, thereby speeding up the activation procedure of the SCell. In an example, reporting CSI for the SCell and not monitoring the PDCCH on/for the SCell, when the SCell is in dormant state, may improve battery or power consumption of the wireless device, while still providing the base station timely and/or accurate channel information feedback. In an example, a PCell/PSCell and/or a PUCCH secondary cell may not be configured or transitioned into dormant state.

When configured with one or more SCells, a gNB may activate, hibernate, or deactivate at least one of the one or more SCells. In an example, a gNB may transmit one or more RRC messages comprising parameters indicating at least one SCell being set to an active state, a dormant state, or an inactive state, to a wireless device.

In an example, when an SCell is in an active state, the wireless device may perform: SRS transmissions on the SCell; CQI/PMI/RI/CRI reporting for the SCell; PDCCH monitoring on the SCell; PDCCH monitoring for the SCell; and/or PUCCH/SPUCCH transmissions on the SCell.

In an example, when an SCell is in an inactive state, the wireless device may: not transmit SRS on the SCell; not report CQI/PMI/RI/CRI for the SCell; not transmit on UL-SCH on the SCell; not transmit on RACH on the SCell; not monitor PDCCH on the SCell; not monitor PDCCH for the SCell; and/or not transmit PUCCH/SPUCCH on the SCell.

In an example, when an SCell is in a dormant state, the wireless device may: not transmit SRS on the SCell; report CQI/PMI/RI/CRI for the SCell; not transmit on UL-SCH on the SCell; not transmit on RACH on the SCell; not monitor PDCCH on the SCell; not monitor PDCCH for the SCell; and/or not transmit PUCCH/SPUCCH on the SCell.

When configured with one or more SCells, a gNB may activate, hibernate, or deactivate at least one of the one or more SCells. In an example, a gNB may transmit one or more MAC control elements comprising parameters indicating activation, deactivation, or hibernation of at least one SCell to a wireless device.

In an example, a gNB may transmit a first MAC CE (e.g., activation/deactivation MAC CE, as shown in FIG. 20A or FIG. 20B) indicating activation or deactivation of at least one SCell to a wireless device. In FIG. 20A and/or FIG. 20B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 20A and FIG. 20B, an R field may indicate a reserved bit. In an example, the R field may be set to zero.

In an example, a gNB may transmit a second MAC CE (e.g., hibernation MAC CE) indicating activation or hibernation of at least one SCell to a wireless device. In an example, the second MAC CE may be associated with a second LCID different from a first LCID of the first MAC CE (e.g., activation/deactivation MAC CE). In an example, the second MAC CE may have a fixed size. In an example, the second MAC CE may consist of a single octet containing seven C-fields and one R-field. FIG. 21A shows an example of the second MAC CE with a single octet. In another example, the second MAC CE may consist of four octets containing 31 C-fields and one R-field. FIG. 21B shows an example of the second MAC CE with four octets. In an example, the second MAC CE with four octets may be associated with a third LCID different from the second LCID for the second MAC CE with a single octet, and/or the first LCID for activation/deactivation MAC CE. In an example, when there is no SCell with a serving cell index greater than 7, the second MAC CE of one octet may be applied, otherwise the second MAC CE of four octets may be applied.

In an example, when the second MAC CE is received, and the first MAC CE is not received, $C_i$ may indicate a dormant/activated status of an SCell with SCell index i if there is an SCell configured with SCell index i, otherwise the MAC entity may ignore the $C_i$ field. In an example, when $C_i$ is set to "1", the wireless device may transition an SCell associated with SCell index i into a dormant state. In an example, when $C_i$ is set to "0", the wireless device may activate an SCell associated with SCell index i. In an example, when $C_i$ is set to "0" and the SCell with SCell index i is in a dormant state, the wireless device may activate the SCell with SCell index i. In an example, when $C_i$ is set to "0" and the SCell with SCell index i is not in a dormant state, the wireless device may ignore the $C_i$ field.

In an example, when both the first MAC CE (activation/deactivation MAC CE) and the second MAC CE (hibernation MAC CE) are received, two $C_i$ fields of the two MAC CEs may indicate possible state transitions of the SCell with SCell index i if there is an SCell configured with SCell index i, otherwise the MAC entity may ignore the $C_i$ fields. In an example, the $C_i$ fields of the two MAC CEs may be interpreted according to FIG. 21C.

When configured with one or more SCells, a gNB may activate, hibernate, or deactivate at least one of the one or more SCells. In an example, a MAC entity of a gNB and/or a wireless device may maintain an SCell deactivation timer (e.g., sCellDeactivationTimer) per configured SCell (except the SCell configured with PUCCH/SPUCCH, if any) and deactivate the associated SCell upon its expiry.

In an example, a MAC entity of a gNB and/or a wireless device may maintain an SCell hibernation timer (e.g., sCellHibernationTimer) per configured SCell (except the SCell configured with PUCCH/SPUCCH, if any) and hibernate the associated SCell upon the SCell hibernation timer expiry if the SCell is in active state. In an example, when both the SCell deactivation timer and the SCell hibernation timer are configured, the SCell hibernation timer may take priority over the SCell deactivation timer. In an example, when both the SCell deactivation timer and the SCell hibernation timer are configured, a gNB and/or a wireless device may ignore the SCell deactivation timer regardless of the SCell deactivation timer expiry.

In an example, a MAC entity of a gNB and/or a wireless device may maintain a dormant SCell deactivation timer (e.g., dormantSCellDeactivationTimer) per configured SCell (except the SCell configured with PUCCH/SPUCCH, if any), and deactivate the associated SCell upon the dormant SCell deactivation timer expiry if the SCell is in dormant state.

In an example, when a MAC entity of a wireless device is configured with an activated SCell upon SCell configuration, the MAC entity may activate the SCell. In an example, when a MAC entity of a wireless device receives a MAC CE(s) activating an SCell, the MAC entity may activate the SCell. In an example, the MAC entity may start or restart the SCell deactivation timer associated with the SCell in response to activating the SCell. In an example, the MAC entity may start or restart the SCell hibernation timer (if configured) associated with the SCell in response to activating the SCell. In an example, the MAC entity may trigger PHR procedure in response to activating the SCell.

In an example, when a MAC entity of a wireless device receives a MAC CE(s) indicating deactivating an SCell, the MAC entity may deactivate the SCell. In an example, in response to receiving the MAC CE(s), the MAC entity may: deactivate the SCell; stop an SCell deactivation timer associated with the SCell; and/or flush all HARQ buffers associated with the SCell.

In an example, when an SCell deactivation timer associated with an activated SCell expires and an SCell hibernation timer is not configured, the MAC entity may: deactivate the SCell; stop the SCell deactivation timer associated with the SCell; and/or flush all HARQ buffers associated with the SCell.

In an example, when a first PDCCH on an activated SCell indicates an uplink grant or downlink assignment, or a second PDCCH on a serving cell scheduling an activated SCell indicates an uplink grant or a downlink assignment for the activated SCell, or a MAC PDU is transmitted in a configured uplink grant or received in a configured downlink assignment, the MAC entity may: restart the SCell deactivation timer associated with the SCell; and/or restart the SCell hibernation timer associated with the SCell if configured. In an example, when an SCell is deactivated, an ongoing random access procedure on the SCell may be aborted.

In an example, when a MAC entity is configured with an SCell associated with an SCell state set to dormant state upon the SCell configuration, or when the MAC entity receives MAC CE(s) indicating transitioning the SCell into a dormant state, the MAC entity may: transition the SCell into a dormant state; transmit one or more CSI reports for the SCell; stop an SCell deactivation timer associated with the SCell; stop an SCell hibernation timer associated with the SCell if configured; start or restart a dormant SCell deactivation timer associated with the SCell; and/or flush all HARQ buffers associated with the SCell. In an example, when the SCell hibernation timer associated with the activated SCell expires, the MAC entity may: hibernate the SCell; stop the SCell deactivation timer associated with the SCell; stop the SCell hibernation timer associated with the SCell; and/or flush all HARQ buffers associated with the SCell. In an example, when a dormant SCell deactivation timer associated with a dormant SCell expires, the MAC entity may: deactivate the SCell; and/or stop the dormant SCell deactivation timer associated with the SCell. In an example, when an SCell is in dormant state, ongoing random access procedure on the SCell may be aborted.

FIG. 22 shows DCI formats for an example of 20 MHZ FDD operation with 2 Tx antennas at the base station and no carrier aggregation in an LTE system. In a NR system, the DCI formats may comprise at least one of: DCI format 0_0/0_1 indicating scheduling of PUSCH in a cell; DCI format 1_0/1_1 indicating scheduling of PDSCH in a cell; DCI format 2_0 notifying a group of UEs of slot format; DCI format 2_1 notifying a group of UEs of PRB(s) and OFDM symbol(s) where a UE may assume no transmission is intended for the UE; DCI format 2_2 indicating transmission of TPC commands for PUCCH and PUSCH; and/or DCI format 2_3 indicating transmission of a group of TPC commands for SRS transmission by one or more UEs. In an example, a gNB may transmit a DCI via a PDCCH for scheduling decision and power-control commends. More specifically, the DCI may comprise at least one of: downlink scheduling assignments, uplink scheduling grants, power-control commands. The downlink scheduling assignments may comprise at least one of: PDSCH resource indication, transport format, HARQ information, and control information related to multiple antenna schemes, a command for power control of the PUCCH used for transmission of ACK/NACK in response to downlink scheduling assignments. The uplink scheduling grants may comprise at least one of: PUSCH resource indication, transport format, and HARQ related information, a power control command of the PUSCH.

In an example, the different types of control information correspond to different DCI message sizes. For example, supporting spatial multiplexing with noncontiguous allocation of RBs in the frequency domain may require a larger scheduling message in comparison with an uplink grant allowing for frequency-contiguous allocation only. The DCI may be categorized into different DCI formats, where a format corresponds to a certain message size and usage.

In an example, a UE may monitor one or more PDCCH candidates to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, the one or more PDCCH candidates that a UE monitors may be defined in terms of PDCCH UE-specific search spaces. A PDCCH UE-specific search space at CCE aggregation level L∈{1, 2, 4, 8} may be defined by a set of PDCCH candidates for CCE aggregation level L. In an example, for a DCI format, a UE may be configured per serving cell by one or more higher layer parameters a number of PDCCH candidates per CCE aggregation level L.

In an example, in non-DRX mode operation, a UE may monitor one or more PDCCH candidate in control resource set q according to a periodicity of $W_{PDCCH, q}$ symbols that may be configured by one or more higher layer parameters for control resource set q.

In an example, the information in the DCI formats used for downlink scheduling may be organized into different groups, with the field present varying between the DCI formats, including at least one of: resource information, consisting of: carrier indicator (0 or 3 bits), RB allocation; HARQ process number; MCS, NDI, and RV (for the first TB); MCS, NDI and RV (for the second TB); MIMO related information; PDSCH resource-element mapping and QCI; Downlink assignment index (DAI); TPC for PUCCH; SRS request (1 bit), triggering one-shot SRS transmission; ACK/NACK offset; DCI format 0/1A indication, used to differentiate between DCI format 1A and 0; and padding if necessary. The MIMO related information may comprise at least one of: PMI, precoding information, transport block swap flag, power offset between PDSCH and reference signal, reference-signal scrambling sequence, number of layers, and/or antenna ports for the transmission.

In an example, the information in the DCI formats used for uplink scheduling may be organized into different groups, with the field present varying between the DCI formats, including at least one of: resource information, consisting of: carrier indicator, resource allocation type, RB allocation; MCS, NDI (for the first TB); MCS, NDI (for the second TB); phase rotation of the uplink DMRS; precoding information; CSI request, requesting an aperiodic CSI report; SRS request (2 bit), used to trigger aperiodic SRS transmission using one of up to three preconfigured settings; uplink index/DAI; TPC for PUSCH; DCI format 0/1A indication; and padding if necessary.

In an example, a gNB may perform cyclic redundancy check (CRC) scrambling for a DCI, before transmitting the DCI via a PDCCH. The gNB may perform CRC scrambling by bit-wise addition (or Modulo-2 addition or exclusive OR (XOR) operation) of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, SRS-TPC-RNTI, INT-RNTI, SFI-RNTI, P-RNTI, SI-RNTI, RA-RNTI, and/or MCS-C-RNTI) with the CRC bits of the DCI. The wireless device may check the CRC bits of the DCI, when detecting the DCI. The wireless device may receive the DCI when the CRC is scrambled by a sequence of bits that is the same as the at least one wireless device identifier.

In a NR system, in order to support wide bandwidth operation, a gNB may transmit one or more PDCCH in different control resource sets. A gNB may transmit one or more RRC message comprising configuration parameters of one or more control resource sets. At least one of the one or more control resource sets may comprise at least one of: a first OFDM symbol; a number of consecutive OFDM symbols; a set of resource blocks; a CCE-to-REG mapping; and a REG bundle size, in case of interleaved CCE-to-REG mapping.

A base station (gNB) may configure a wireless device (UE) with uplink (UL) bandwidth parts (BWPs) and downlink (DL) BWPs to enable bandwidth adaptation (BA) on a PCell. If carrier aggregation is configured, the gNB may further configure the UE with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the UE to operate on the SCell upon the SCell being activated.

In paired spectrum (e.g. FDD), a gNB and/or a UE may independently switch a DL BWP and an UL BWP. In unpaired spectrum (e.g. TDD), a gNB and/or a UE may simultaneously switch a DL BWP and an UL BWP.

In an example, a gNB and/or a UE may switch a BWP between configured BWPs by means of a DCI or a BWP inactivity timer. When the BWP inactivity timer is configured for a serving cell, the gNB and/or the UE may switch an active BWP to a default BWP in response to an expiry of the BWP inactivity timer associated with the serving cell. The default BWP may be configured by the network.

In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve UE battery consumption. BWPs other than the one active UL BWP and the one active DL BWP that the UE may work on may be deactivated. On deactivated BWPs, the UE may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time.

In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by a BWP inactivity timer (e.g., bwp-InactivityTimer). In an example, the BWP switching may be controlled by a MAC entity in response to initiating a Random Access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL.

Figure 23:
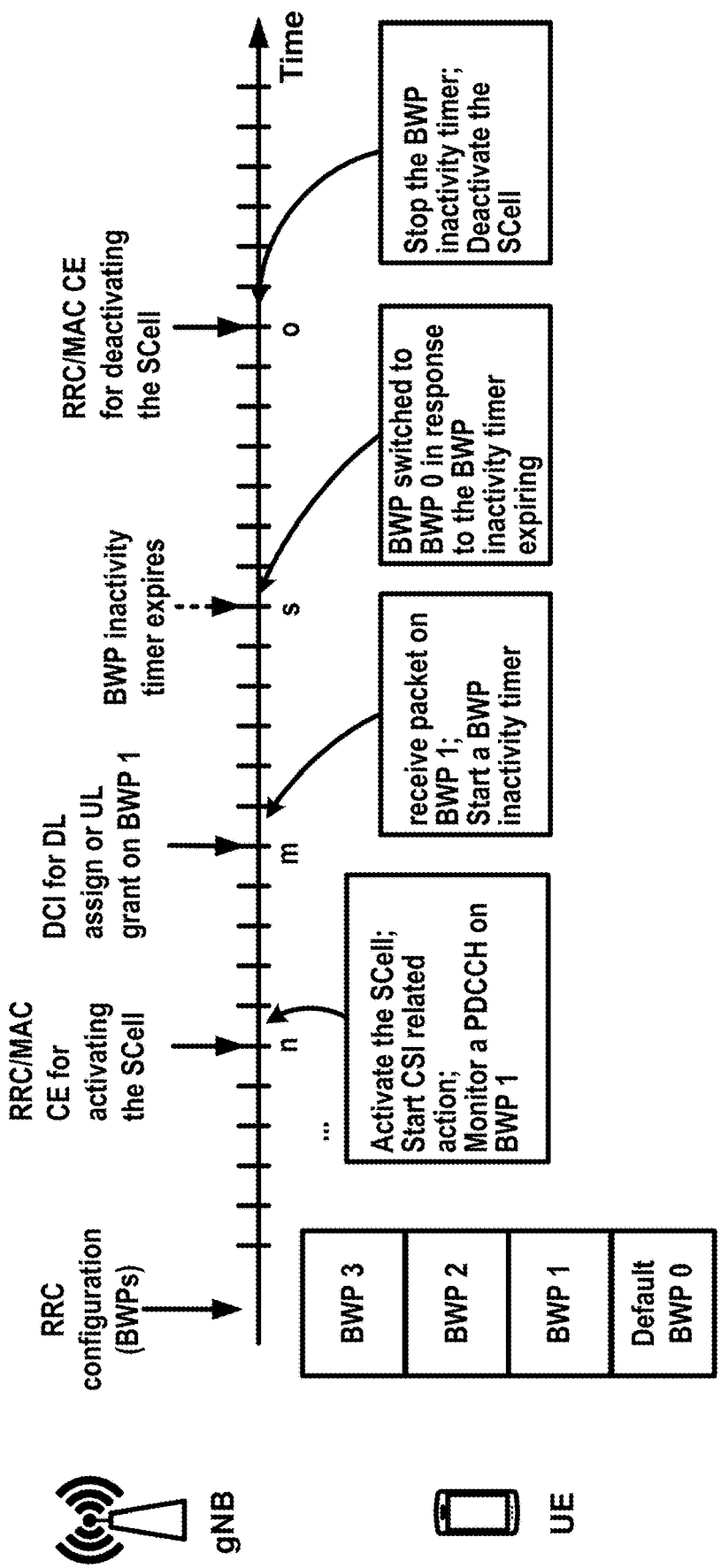
FIG. 23 is an example of BWP management on an SCell as per an aspect of an embodiment of the present disclosure.

FIG. 23 shows an example of BWP switching on an SCell. In an example, a UE may receive RRC message comprising parameters of a SCell and one or more BWP configuration associated with the SCell. The RRC message may comprise: RRC connection reconfiguration message (e.g., RRCReconfiguration); RRC connection reestablishment message (e.g., RRCRestablishment); and/or RRC connection setup message (e.g., RRCSetup). Among the one or more BWPs, at least one BWP may be configured as the first active BWP (e.g., BWP 1 in FIG. 23), one BWP as the default BWP (e.g., BWP 0 in FIG. 23). The UE may receive a MAC CE to activate the SCell at $n^{th}$ slot. The UE may start a SCell deactivation timer (e.g., sCellDeactivationTimer), and start CSI related actions for the SCell, and/or start CSI related actions for the first active BWP of the SCell. The UE may start monitoring a PDCCH on BWP 1 in response to activating the SCell.

In an example, the UE may start restart a BWP inactivity timer (e.g., bwp-InactivityTimer) at mt slot in response to receiving a DCI indicating DL assignment on BWP 1. The UE may switch back to the default BWP (e.g., BWP 0) as an active BWP when the BWP inactivity timer expires, at $s^{th}$ slot. The UE may deactivate the SCell and/or stop the BWP inactivity timer when the sCellDeactivationTimer expires.

Employing the BWP inactivity timer may further reduce UE's power consumption when the UE is configured with multiple cells with each cell having wide bandwidth (e.g., 1 GHz). The UE may only transmit on or receive from a narrow-bandwidth BWP (e.g., 5 MHz) on the PCell or SCell when there is no activity on an active BWP.

In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-)initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a Random Access procedure associated with this serving cell is not ongoing, a UE may perform the BWP switching to a BWP indicated by the PDCCH.

In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

In an example, for a primary cell, a UE may be provided by a higher layer parameter Default-DL-BWP a default DL BWP among the configured DL BWPs. If a UE is not provided a default DL BWP by the higher layer parameter Default-DL-BWP, the default DL BWP is the initial active DL BWP.

In an example, a UE may be provided by higher layer parameter bwp-InactivityTimer, a timer value for the primary cell. If configured, the UE may increment the timer, if running, every interval of 1 millisecond for frequency range 1 or every 0.5 milliseconds for frequency range 2 if the UE may not detect a DCI format 1_1 for paired spectrum operation or if the UE may not detect a DCI format 1_1 or DCI format 0_1 for unpaired spectrum operation during the interval.

In an example, if a UE is configured for a secondary cell with higher layer parameter Default-DL-BWP indicating a default DL BWP among the configured DL BWPs and the UE is configured with higher layer parameter bwp-InactivityTimer indicating a timer value, the UE procedures on the secondary cell may be same as on the primary cell using the timer value for the secondary cell and the default DL BWP for the secondary cell.

In an example, if a UE is configured by higher layer parameter Active-BWP-DL-SCell a first active DL BWP and by higher layer parameter Active-BWP-UL-SCell a first active UL BWP on a secondary cell or carrier, the UE may use the indicated DL BWP and the indicated UL BWP on the secondary cell as the respective first active DL BWP and first active UL BWP on the secondary cell or carrier.

In an example, a wireless device may transmit one or more uplink control information (UCI) via one or more PUCCH resources to a base station. The one or more UCI may comprise at least one of: HARQ-ACK information; scheduling request (SR); and/or CSI report. In an example, a PUCCH resource may be identified by at least: frequency location (e.g., starting PRB); and/or a PUCCH format associated with initial cyclic shift of a base sequence and time domain location (e.g., starting symbol index). In an example, a PUCCH format may be PUCCH format 0, PUCCH format 1, PUCCH format 2, PUCCH format 3, or PUCCH format 4. A PUCCH format 0 may have a length of 1 or 2 OFDM symbols and be less than or equal to 2 bits. A PUCCH format 1 may occupy a number between 4 and 14 of OFDM symbols and be less than or equal to 2 bits. A PUCCH format 2 may occupy 1 or 2 OFDM symbols and be greater than 2 bits. A PUCCH format 3 may occupy a number between 4 and 14 of OFDM symbols and be greater than 2 bits. A PUCCH format 4 may occupy a number between 4 and 14 of OFDM symbols and be greater than 2 bits. The PUCCH resource may be configured on a PCell, or a PUCCH secondary cell.

In an example, when configured with multiple uplink BWPs, a base station may transmit to a wireless device, one or more RRC messages comprising configuration parameters of one or more PUCCH resource sets (e.g., at most 4 sets) on an uplink BWP of the multiple uplink BWPs. Each PUCCH resource set may be configured with a PUCCH resource set index, a list of PUCCH resources with each PUCCH resource being identified by a PUCCH resource identifier (e.g., pucch-Resourceid), and/or a maximum number of UCI information bits a wireless device may transmit using one of the plurality of PUCCH resources in the PUCCH resource set.

In an example, when configured with one or more PUCCH resource sets, a wireless device may select one of the one or more PUCCH resource sets based on a total bit length of UCI information bits (e.g., HARQ-ARQ bits, SR, and/or CSI) the wireless device will transmit. In an example, when the total bit length of UCI information bits is less than or equal to 2, the wireless device may select a first PUCCH resource set with the PUCCH resource set index equal to "0". In an example, when the total bit length of UCI information bits is greater than 2 and less than or equal to a first configured value, the wireless device may select a second PUCCH resource set with the PUCCH resource set index equal to "1". In an example, when the total bit length of UCI information bits is greater than the first configured value and less than or equal to a second configured value, the wireless device may select a third PUCCH resource set with the PUCCH resource set index equal to "2". In an example, when the total bit length of UCI information bits is greater than the second configured value and less than or equal to a third value (e.g., 1706), the wireless device may select a fourth PUCCH resource set with the PUCCH resource set index equal to "3".

In an example, a wireless device may determine, based on a number of uplink symbols of UCI transmission and a number of UCI bits, a PUCCH format from a plurality of PUCCH formats comprising PUCCH format 0, PUCCH format 1, PUCCH format 2, PUCCH format 3 and/or PUCCH format 4. In an example, the wireless device may transmit UCI in a PUCCH using PUCCH format 0 if the transmission is over 1 symbol or 2 symbols and the number of HARQ-ACK information bits with positive or negative SR (HARQ-ACK/SR bits) is 1 or 2. In an example, the wireless device may transmit UCI in a PUCCH using PUCCH format 1 if the transmission is over 4 or more symbols and the number of HARQ-ACK/SR bits is 1 or 2. In an example, the wireless device may transmit UCI in a PUCCH using PUCCH format 2 if the transmission is over 1 symbol or 2 symbols and the number of UCI bits is more than 2. In an example, the wireless device may transmit UCI in a PUCCH using PUCCH format 3 if the transmission is over 4 or more symbols, the number of UCI bits is more than 2 and PUCCH resource does not include an orthogonal cover code. In an example, the wireless device may transmit UCI in a PUCCH using PUCCH format 4 if the transmission is over 4 or more symbols, the number of UCI bits is more than 2 and the PUCCH resource includes an orthogonal cover code.

In an example, in order to transmit HARQ-ACK information on a PUCCH resource, a wireless device may determine the PUCCH resource from a PUCCH resource set. The PUCCH resource set may be determined as mentioned above. The wireless device may determine the PUCCH resource based on a PUCCH resource indicator field in a DCI (e.g., with a DCI format 1_0 or DCI for 1_1) received on a PDCCH. A 3-bit PUCCH resource indicator field in the DCI may indicate one of eight PUCCH resources in the PUCCH resource set. The wireless device may transmit the HARQ-ACK information in a PUCCH resource indicated by the 3-bit PUCCH resource indicator field in the DCI.

In an example, the wireless device may transmit one or more UCI bits via a PUCCH resource of an active uplink BWP of a PCell or a PUCCH secondary cell. Since at most one active uplink BWP in a cell is supported for a wireless device, the PUCCH resource indicated in the DCI is naturally a PUCCH resource on the active uplink BWP of the cell.

In an example, DRX operation may be used by a wireless device (UE) to improve UE battery lifetime. In an example, in DRX, UE may discontinuously monitor downlink control channel, e.g., PDCCH or EPDCCH. In an example, the base station may configure DRX operation with a set of DRX parameters, e.g., using RRC configuration. The set of DRX parameters may be selected based on the application type such that the wireless device may reduce power and resource consumption. In an example, in response to DRX being configured/activated, a UE may receive data packets with an extended delay, since the UE may be in DRX Sleep/Off state at the time of data arrival at the UE and the base station may wait until the UE transitions to the DRX ON state.

In an example, during a DRX mode, the UE may power down most of its circuitry when there are no packets to be received. The UE may monitor PDCCH discontinuously in the DRX mode. The UE may monitor the PDCCH continuously when a DRX operation is not configured. During this time the UE listens to the downlink (DL) (or monitors PDCCHs) which is called DRX Active state. In a DRX mode, a time during which UE doesn't listen/monitor PDCCH is called DRX Sleep state.

Figure 24:
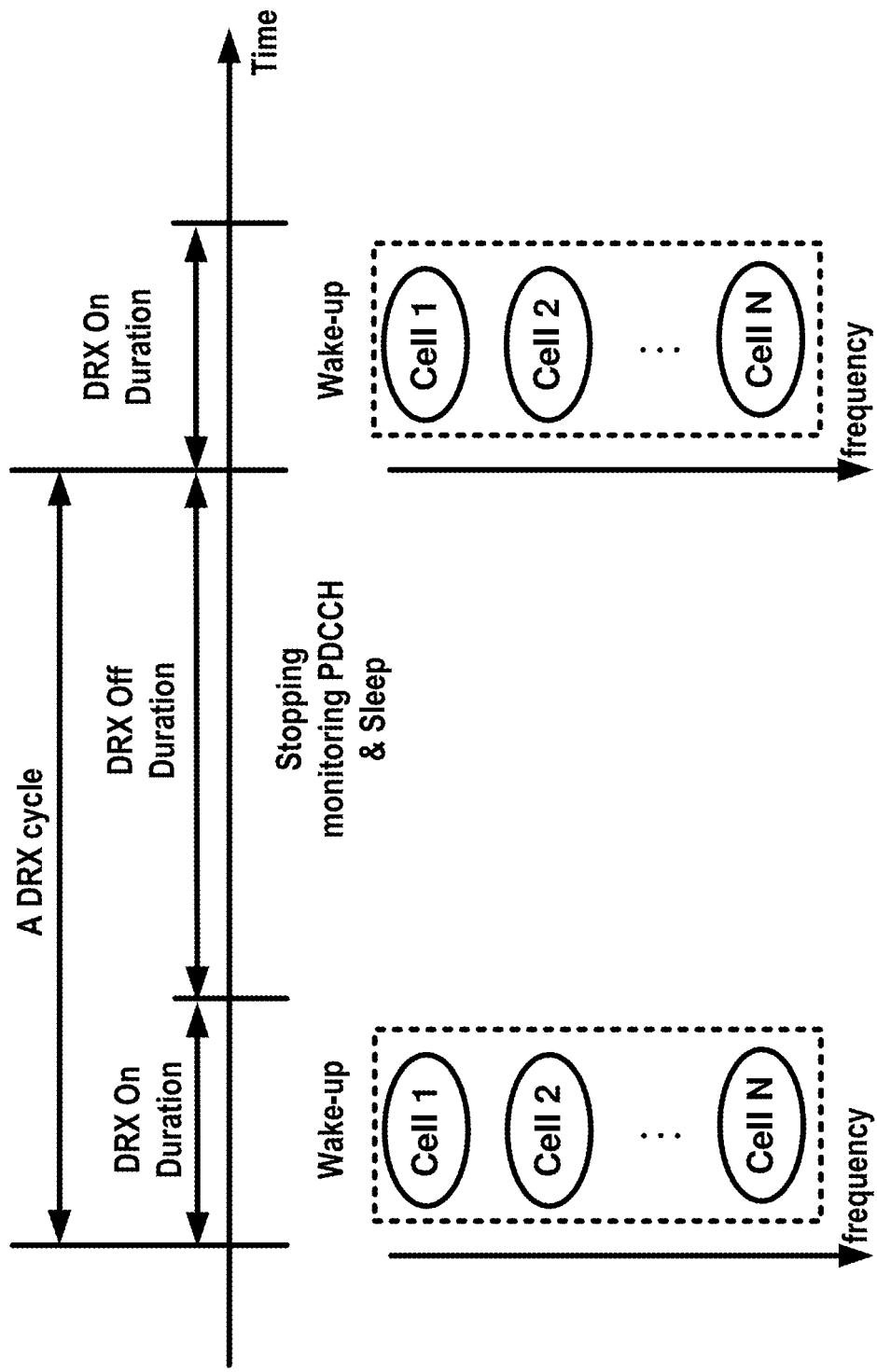
FIG. 24 is an example of discontinuous reception (DRX) operation as per an aspect of an embodiment of the present disclosure.

FIG. 24 shows an example of the embodiment. A gNB may transmit an RRC message comprising one or more DRX parameters of a DRX cycle. The one or more parameters may comprise a first parameter and/or a second parameter. The first parameter may indicate a first time value of the DRX Active state (e.g., DRX On duration) of the DRX cycle. The second parameter may indicate a second time of the DRX Sleep state (e.g., DRX Off duration) of the DRX cycle. The one or more parameters may further comprise a time duration of the DRX cycle. During the DRX Active state, the UE may monitor PDCCHs for detecting one or more DCIs on a serving cell. During the DRX Sleep state, the UE may stop monitoring PDCCHs on the serving cell. When multiple cells are in active state, the UE may monitor all PDCCHs on (or for) the multiple cells during the DRX Active state. During the DRX off duration, the UE may stop monitoring all PDCCH on (or for) the multiple cells. The UE may repeat the DRX operations according to the one or more DRX parameters.

In an example, DRX may be beneficial to the base station. In an example, if DRX is not configured, the wireless device may be transmitting periodic CSI and/or SRS frequently (e.g., based on the configuration). With DRX, during DRX OFF periods, the UE may not transmit periodic CSI and/or SRS. The base station may assign these resources to the other UEs to improve resource utilization efficiency.

In an example, the MAC entity may be configured by RRC with a DRX functionality that controls the UE's downlink control channel (e.g., PDCCH) monitoring activity for a plurality of RNTIs for the MAC entity. The plurality of RNTIs may comprise at least one of: C-RNTI; CS-RNTI; INT-RNTI; SP-CSI-RNTI; SFI-RNTI; TPC-PUCCH-RNTI; TPC-PUSCH-RNTI; Semi-Persistent Scheduling C-RNTI; eIMTA-RNTI; SL-RNTI; SL-V-RNTI; CC-RNTI; or SRS-TPC-RNTI. In an example, in response to being in RRC_CONNECTED, if DRX is configured, the MAC entity may monitor the PDCCH discontinuously using the DRX operation; otherwise the MAC entity may monitor the PDCCH continuously.

In an example, RRC may control DRX operation by configuring a plurality of timers. The plurality of timers may comprise: a DRX On duration timer (e.g., drx-onDurationTimer); a DRX inactivity timer (e.g., drx-InactivityTimer); a downlink DRX HARQ RTT timer (e.g., drx-HARQ-RTT-TimerDL); an uplink DRX HARQ RTT Timer (e.g., drx-HARQ-RTT-TimerUL); a downlink retransmission timer (e.g., drx-RetransmissionTimerDL); an uplink retransmission timer (e.g., drx-RetransmissionTimerUL); one or more parameters of a short DRX configuration (e.g., drx-ShortCycle and/or drx-ShortCycleTimer)) and one or more parameters of a long DRX configuration (e.g., drx-LongCycle). In an example, time granularity for DRX timers may be in terms of PDCCH subframes (e.g., indicated as psf in the DRX configurations), or in terms of milliseconds.

In an example, in response to a DRX cycle being configured, the Active Time may include the time while at least one timer is running. The at least one timer may comprise drx-onDuration Timer, drx-InactivityTimer, drx-RetransmissionTimerDL, drx-Retransmission TimerUL, or mac-ContentionResolution Timer.

In an example, drx-Inactivity-Timer may specify a time duration for which the UE may be active after successfully decoding a PDCCH indicating a new transmission (UL or DL or SL). In an example, this timer may be restarted upon receiving PDCCH for a new transmission (UL or DL or SL). In an example, the UE may transition to a DRX mode (e.g., using a short DRX cycle or a long DRX cycle) in response to the expiry of this timer.

In an example, drx-ShortCycle may be a first type of DRX cycle (e.g., if configured) that needs to be followed when UE enters DRX mode. In an example, a DRX-Config IE indicates the length of the short cycle.

In an example, drx-ShortCycleTimer may be expressed as multiples of shortDRX-Cycle. The timer may indicate the number of initial DRX cycles to follow the short DRX cycle before entering the long DRX cycle.

In an example, drx-onDurationTimer may specify the time duration at the beginning of a DRX Cycle (e.g., DRX ON). In an example, drx-onDurationTimer may indicate the time duration before entering the sleep mode (DRX OFF).

In an example, drx-HARQ-RTT-TimerDL may specify a minimum duration from the time new transmission is received and before the UE may expect a retransmission of a same packet. In an example, this timer may be fixed and may not be configured by RRC.

In an example, drx-RetransmissionTimerDL may indicate a maximum duration for which UE may be monitoring PDCCH when a retransmission from the eNodeB is expected by the UE.

In an example, in response to a DRX cycle being configured, the Active Time may comprise the time while a Scheduling Request is sent on PUCCH and is pending.

In an example, in response to a DRX cycle being configured, the Active Time may comprise the time while an uplink grant for a pending HARQ retransmission can occur and there is data in the corresponding HARQ buffer for synchronous HARQ process.

In an example, in response to a DRX cycle being configured, the Active Time may comprise the time while a PDCCH indicating a new transmission addressed to the C-RNTI of the MAC entity has not been received after successful reception of a Random Access Response for the preamble not selected by the MAC entity.

In an example, DRX may be configured for a wireless device. A DL HARQ RTT Timer may expire in a subframe and the data of the corresponding HARQ process may not be successfully decoded. The MAC entity may start the drx-Retransmission TimerDL for the corresponding HARQ process.

In an example, DRX may be configured for a wireless device. An UL HARQ RTT Timer may expire in a subframe. The MAC entity may start the drx-RetransmissionTimerUL for the corresponding HARQ process.

In an example, DRX may be configured for a wireless device. A DRX Command MAC control element or a Long DRX Command MAC control element may be received. The MAC entity may stop drx-onDurationTimer and stop drx-InactivityTimer.

In an example, DRX may be configured for a wireless device. In an example, drx-InactivityTimer may expire or a DRX Command MAC control element may be received in a subframe. In an example, in response to Short DRX cycle being configured, the MAC entity may start or restart drx-ShortCycleTimer and may use Short DRX Cycle. Otherwise, the MAC entity may use the Long DRX cycle.

In an example, DRX may be configured for a wireless device. In an example, drx-ShortCycleTimer may expire in a subframe. The MAC entity may use the Long DRX cycle.

In an example, DRX may be configured for a wireless device. In an example, a Long DRX Command MAC control element may be received. The MAC entity may stop drx-ShortCycleTimer and may use the Long DRX cycle.

In an example, DRX may be configured for a wireless device. In an example, if the Short DRX Cycle is used and [(SFN*10)+subframe number] modulo (drx-ShortCycle)= (drxStartOffset) modulo (drx-ShortCycle), the wireless device may start drx-onDurationTimer.

In an example, DRX may be configured for a wireless device. In an example, if the Long DRX Cycle is used and [(SFN*10)+subframe number] modulo (drx-longCycle) =drxStartOffset, the wireless device may start drx-onDurationTimer.

Figure 25:
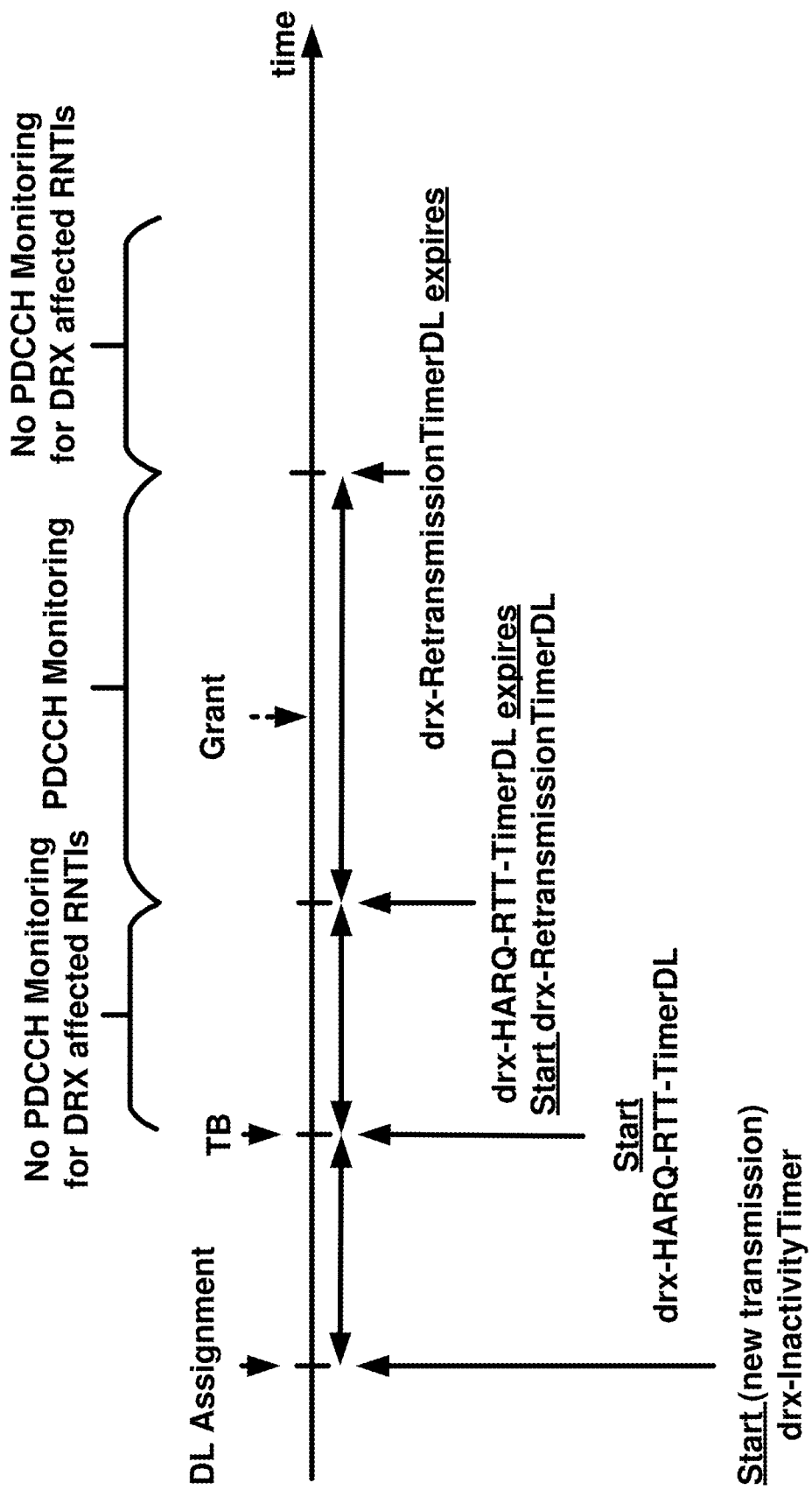
FIG. 25 is an example of DRX operation as per an aspect of an embodiment of the present disclosure.

FIG. 25 shows example of DRX operation in a legacy system. A base station may transmit an RRC message comprising configuration parameters of DRX operation. A base station may transmit a DCI for downlink resource allocation via a PDCCH, to a UE. the UE may start the drx-InactivityTimer during which, the UE may monitor the PDCCH. After receiving a transmission block (TB) when the drx-InactivityTimer is running, the UE may start a HARQ RTT Timer (e.g., drx-HARQ-RTT-TimerDL), during which, the UE may stop monitoring the PDCCH. The UE may transmit a NACK to the base station upon unsuccessful receiving the TB. When the HARQ RTT Timer expires, the UE may monitor the PDCCH and start a HARQ retransmission timer (e.g., drx-RetransmissionTimerDL). When the HARQ retransmission timer is running, the UE may receive a second DCI indicating a DL grant for the retransmission of the TB. If not receiving the second DCI before the HARQ retransmission timer expires, the UE may stop monitoring the PDCCH.

Figure 26A:
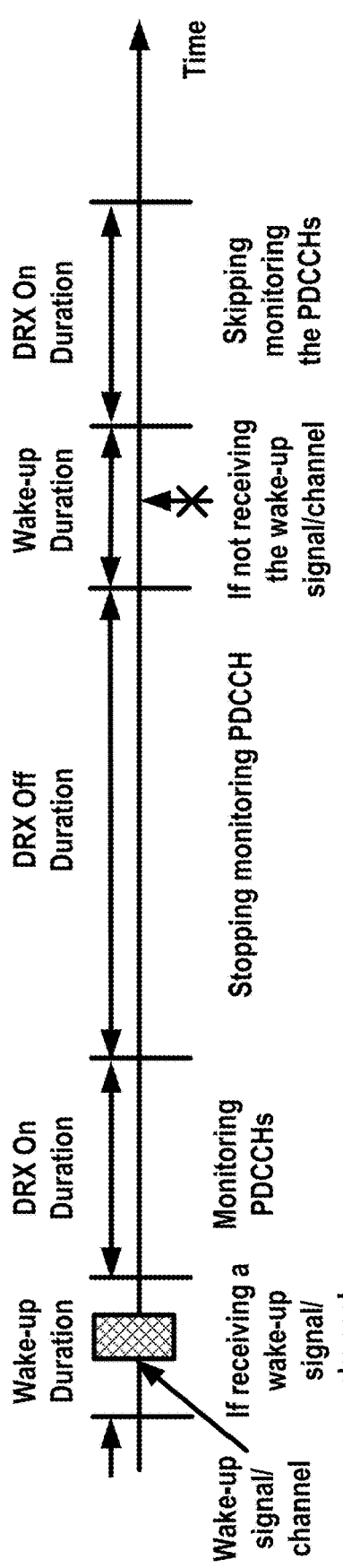
FIG. 26A is an example of a wake-up signal/channel based power saving operation as per an aspect of an embodiment of the present disclosure.
Figure 26B:
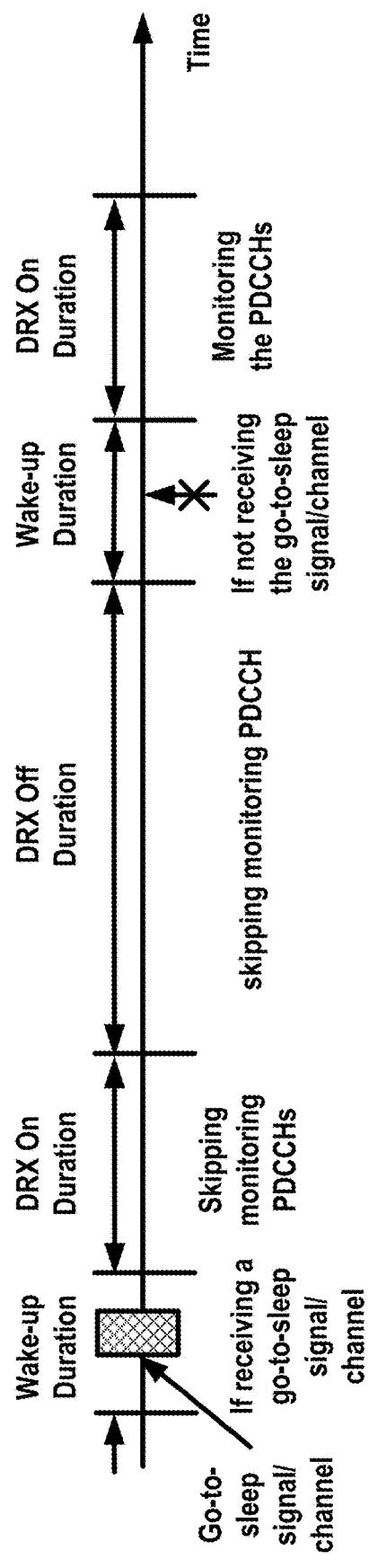
FIG. 26B is an example of a go-to-sleep signal/channel based power saving operation as per an aspect of an embodiment of the present disclosure.

In an LTE/LTE-A or 5G system, when configured with DRX operation, a UE may monitor PDCCH for detecting one or more DCIs during the DRX Active time of a DRX cycle. The UE may stop monitoring PDCCH during the DRX sleep/Off time of the DRX cycle, to save power consumption. In some cases, the UE may fail to detect the one or more DCIs during the DRX Active time, since the one or more DCIs are not addressed to the UE. For example, a UE may be an URLLC UE, or a NB-IoT UE, or an MTC UE. The UE may not always have data to be received from a gNB, in which case, waking up to monitor PDCCH in the DRX active time may result in useless power consumption. A wake-up mechanism combined with DRX operation may be used to further reduce power consumption specifically in a DRX active time. FIG. 26A and FIG. 26B show examples of the wake-up mechanism.

In FIG. 26A, a gNB may transmit one or more messages comprising parameters of a wake-up duration (or a power saving duration), to a UE. The wake-up duration may be located a number of slots (or symbols) before a DRX On duration of a DRX cycle. The number of slots (or symbols), or, referred to as a gap between a wakeup duration and a DRX on duration, may be configured in the one or more RRC messages or predefined as a fixed value. The gap may be used for at least one of: synchronization with the gNB; measuring reference signals; and/or retuning RF parameters. The gap may be determined based on a capability of the UE and/or the gNB. In an example, the wake-up mechanism may be based on a wake-up signal. The parameters of the wake-up duration may comprise at least one of: a wake-up signal format (e.g., numerology, sequence length, sequence code, etc.); a periodicity of the wake-up signal; a time duration value of the wake-up duration; a frequency location of the wake-up signal. In LTE Re.15 specification, the wake-up signal for paging may comprise a signal sequence (e.g., Zadoff-Chu sequence) generated based on a cell identification (e.g., cell ID) as:

$$w(m) = \theta_{n_f,n_s}(m) \cdot e^{-\frac{j\pi un(n+1)}{131}}.$$

In the example, m=0, 1, . . . , 132M−1, and n=m mod 132.
In an example, $$\theta_{n_f,n_s}(m) = \begin{cases} 1, & \text{if } c_{n_1,n_s}(2m) = 0 \text{ and } c_{n_f,n_s}(2m+1) = 0 \\ -1 & \text{if } c_{n_1,n_s}(2m) = 0 \text{ and } c_{n_f,n_s}(2m+1) = 1 \\ j, & \text{if } c_{n_1,n_s}(2m) = 1 \text{ and } c_{n_f,n_s}(2m+1) = 0 \\ 1-j, & \text{if } c_{n_1,n_s}(2m) = 1 \text{ and } c_{n_f,n_s}(2m+1) = 1 \end{cases}, \text{ where}$$

$$u = (N_{ID}^{cell} \bmod 126) + 3 \cdot N_{ID}^{cell}$$

may be a cell ID of the serving cell. M may be a number of subframes in which the WUS may be transmitted, 1≤M≤$M_{WUSmax}$, where $M_{WUSmax}$ is the maximum number of subframes in which the WUS may be transmitted. $C_{nf,ns}(i)$, i=0, 1, . . . , 2·132M−1 may be a scrambling sequence (e.g., a length-31 Gold sequence), which may be initialized at start of transmission of the WUS with:

$$c_{init\_WUS} = (N_{ID}^{cell} + 1)\left(\left(10n_{f\_start\_PO} + \left\lfloor\frac{n_{s\_start\_PO}}{2}\right\rfloor\right) \bmod 2048 + 1\right)2^9 + N_{ID}^{cell},$$

where $n_{f\_start\_PO}$ is the first frame of a first paging occasion to which the WUS is associated, and $n_{s\_start\_PO}$ is a first slot of the first paging occasion to which the WUS is associated.

In an example, the parameters of the wake-up duration may be pre-defined without RRC configuration. In an example, the wake-up mechanism may be based on a wake-up channel (e.g., a PDCCH, or a DCI). The parameters of the wake-up duration may comprise at least one of: a wake-up channel format (e.g., numerology, DCI format, PDCCH format); a periodicity of the wake-up channel; a control resource set and/or a search space of the wake-up channel. When configured with the parameters of the wake-up duration, the UE may monitor the wake-up signal or the wake-up channel during the wake-up duration. A UE may monitor the wake-up signal or the wake-up channel during a first few slots of DRX OnDuration. In response to receiving the wake-up signal/channel, the UE may wake-up to monitor PDCCHs as expected according to the DRX configuration. In an example, in response to receiving the wake-up signal/channel, the UE may monitor PDCCHs in the DRX active time (e.g., when drx-onDuration Timer is running). The UE may go back to sleep if not receiving PDCCHs in the DRX active time. The UE may keep in sleep during the DRX off duration of the DRX cycle. In an example, if the UE doesn't receive the wake-up signal/channel during the wake-up duration, the UE may skip monitoring PDCCHs during the DRX active time. This mechanism may reduce power consumption for PDCCH monitoring during the DRX active time. The wake-up signal/channel may comprise a list of power states, a power state for a cell. The UE may transition to the indicated power state of the cell in response to the wake-up signal/channel. In the example, during the wake-up duration, a UE may monitor the wake-up signal/channel only. During the DRX off duration, the UE may stop monitoring PDCCHs and the wake-up signal/channel. During the DRX active duration, the UE may monitor PDCCHs except of the wake-up signal/channel, if receiving the wake-up signal/channel in the wake-up duration. In an example, the gNB and/or the UE may apply the wake-up mechanism in paging operation when the UE is in an RRC_idle state or an RRC_inactive state, or in a connected DRX operation (C-DRX) when the UE is in an RRC_CONNECTED state.

In an example, a wake-up mechanism may be based on a go-to-sleep signal/channel. FIG. 26B shows an example. A gNB may transmit one or more messages comprising parameters of a wake-up duration (or a power saving duration), to a UE. The one or more messages may comprise at least one RRC message. The at least one RRC message may comprise one or more cell-specific or cell-common RRC messages (e.g., ServingCellConfig IE, ServingCellConfigCommon IE, MAC-CellGroupConfig IE). The wake-up duration may be located a number of slots (or symbols) before a DRX On duration of a DRX cycle. The number of slots (or symbols) may be configured in the one or more RRC messages or predefined as a fixed value. In an example, the wake-up mechanism may be based on a go-to-sleep signal. The parameters of the wake-up duration may comprise at least one of: a go-to-sleep signal format (e.g., numerology, sequence length, sequence code, etc.); a periodicity of the go-to-sleep signal; a time duration value of the wake-up duration; a frequency location of the go-to-sleep signal. In an example, the wake-up mechanism may be based on a go-to-sleep channel (e.g., a PDCCH, or a DCI). The parameters of the wake-up duration may comprise at least one of: a go-to-sleep channel format (e.g., numerology, DCI format, PDCCH format); a periodicity of the go-to-sleep channel; a control resource set and/or a search space of the go-to-sleep channel. When configured with the parameters of the wake-up duration, the UE may monitor the go-to-sleep signal or the go-to-sleep channel during the wake-up duration. A UE may monitor the go-to-sleep signal or the wake-up channel during a first few slots of DRX OnDuration. In response to receiving the go-to-sleep signal/channel, the UE may go back to sleep and skip monitoring PDCCHs during the DRX active time. The go-to-sleep signal/channel may comprise a list of power states, a power state for a cell. The UE may transition to the indicated power state of the cell in response to the wake-up signal/channel. In an example, if the UE doesn't receive the go-to-sleep signal/channel during the wake-up duration, the UE may monitor PDCCHs during the DRX active time. This mechanism may reduce power consumption for PDCCH monitoring during the DRX active time. In an example, compared with a wake-up signal based wake-up mechanism, a go-to-sleep signal based mechanism may be more robust to detection error. If the UE miss detects the go-to-sleep signal, the consequence is that the UE may wrongly start monitoring PDCCH, which may result in extra power consumption. However, if the UE miss detects the wake-up signal, the consequence is that the UE may miss a DCI which may be addressed to the UE. In the case, missing the DCI may result in communication interruption. In some cases (e.g., URLLC service or V2X service), the UE and/or the gNB may not allow communication interruption compared with extra power consumption.

In existing technologies, a base station may transmit one or more RRC message comprising configuration parameters of one or more bandwidth parts (BWPs) of a cell (e.g. a secondary cell) for a wireless device. The one or more RRC messages may comprise configuration of a default BWP. The default BWP may be activated after a period of cell inactivity (e.g. after expiry of bwp-inactivityTimer). The one or more RRC messages may comprise configuration of a first-active-BWP (e.g. a first active DL BWP, and/or a first active UL BWP of the SCell) of an SCell. The first active BWP may be activated in response to activation of the SCell. The base station may transmit a DCI to a wireless device to switch from one active BWP to another BWP as an active BWP of a cell. In existing technologies, when a base station transmits to a wireless device a MAC activation command to activate an SCell, the first-active downlink BWP and first-active uplink BWP are activated.

In existing technologies, a wireless device activates a BWP when the wireless device transitions from the dormant state to the normal (non-dormant) state. The activated BWP due to the transition to the non-dormant state may be signaled via the DCI and/or MAC signaling. For example, the base station may transmit a DCI/MAC CE to activate a BWP upon transition from the dormant state from the normal state. This may increase signaling overhead and signaling delay. For example, the base station may transmit the second DCI/MAC command comprising a BWP index of the non-dormant BWP. This may lead to large signaling overhead, wherein the overhead may increase with a number of cells configured to the wireless device. Adding additional information of the non-dormant BWP (e.g., a bwp-Id, a BWP index of the non-dormant BWP) for each cell may not be scalable as serving cells increases (e.g., 16 cells, 32 cells). Existing mechanisms may not be scalable and may result in large latency and high overhead, when frequent transitions between the dormant state and the normal state occur. In some other example implementations, the active BWP may not change when an SCell transitions from a dormant to/from a non-dormant state to reduce signaling overhead. This may increase UE battery power consumption due to UE processing the same BWP in dormant state (as a non-dormant state). There is need for enhanced signaling and dormant/non-dormant transition procedures to reduce signaling overhead when a wireless device transitions from a dormant state to a non-dormant state of a secondary cell. Example embodiments implements an RRC signaling and dormant to non-dormant transition procedure for a secondary cell of a wireless device to achieve effective UE power saving and reduce signaling overhead.

In an example, the base station may transmit, via one or more radio resource control (RRC) messages, to a wireless device a BWP index of the first-active BWP (e.g., first active BWP) of the SCell and a BWP index of a BWP as a second BWP for transition to the non-dormant state. The first-active BWP is activated in response MAC activation of the SCell. The second BWP is activated in response to the second command indicating transitioning to the normal (non-dormant) state of the cell. The BWP may be different from a first active BWP, which is activated in response to receiving a MAC CE activating the cell. When the wireless device transitions the cell from the dormant state to the normal state, the wireless device may activate the second BWP as an active BWP of the cell. Based on the activated second BWP (e.g., a second power state active BWP, a PS-active BWP, a non-dormant BWP), the wireless device is quickly ready to communicate with the base station. Example embodiments provides flexibility to configure a non-dormant BWP which is different from the first-active BWP of the SCell. In an example, the first-active BWP may have a lower bandwidth than the non-dormant BWP to provide a higher capacity upon transition from dormant to non-dormant power state. Example embodiments implements an RRC signaling and dormant to non-dormant transition procedures that reduces signaling overhead and reduces delay for transition from dormant to non-dormant state.

In an example, a wireless device may receive one or more radio resource control (RRC) messages comprising configuration parameters. The configuration parameters may indicate a first downlink bandwidth part (BWP) for activation of a secondary cell. The configuration parameters may indicate a second downlink BWP for transitioning from a dormant state to a non-dormant state of the secondary cell. The wireless device may activate the first downlink BWP in response to receiving a MAC CE command indicating activation of the secondary cell. The wireless device may transition the secondary cell from the non-dormant state to the dormant state in some cases. For example, the wireless device may receive a command indicating transition to a dormant state after the activation of the secondary cell, wherein the secondary cell is activated in the non-dormant state. For example, the wireless device may activate the secondary cell in the dormant state. For example, the wireless device may activate the secondary cell in the dormant state based on being configured with a dormant BWP of the secondary cell as the first downlink BWP. The wireless device may receive a DCI comprising a field indicating transitioning the secondary cell from the dormant state to the non-dormant state. The wireless device may activate the second downlink BWP as an active downlink BWP of the secondary cell in response to the field. The wireless device may receive control and data via the second downlink BWP in response to the transitioning the secondary cell to the non-dormant state.

Embodiments may allow dynamic and fast adaptation of a power state transition of one or more cells without incurring additional overhead to activate different BWPs in different power states. Embodiments may allow to activate a first BWP. e.g., configured with a small bandwidth without a search space, in response to transition to a dormant state of a cell without additional overhead to indicate a BWP index for the first BWP. Embodiments may allow to activate a second BWP, e.g., configured with a large (e.g., full) bandwidth with one or more search spaces, in response to transition to a normal state of the cell without additional overhead to indicate a BWP index for the second BWP.

In existing technologies, a wireless device may stop monitoring for a DCI in a cell in a response to a command indicating a transition of the cell from a normal state to a dormant state. The wireless device may maintain the cell in the dormant state until a second command indicates transitioning the cell from the dormant state to the normal state. The wireless device may receive the second command indicating transitioning the cell to the normal state, wherein an active DL or UL BWP may be a default DL (or default UL BWP). The wireless device may activate the default DL BWP with low traffic based on a bwp-inactivity Timer of the cell. A base station may configure the default DL BWP with a small bandwidth to provide power saving of the wireless device. When the base station triggers a power state transition for the wireless device to the normal state, the base station may expect a high volume of incoming traffic for the wireless device. In an example, the wireless device may transition to the normal state while keeping the active DL BWP. The base station, to increase a bandwidth of the cell, may need to transmit a third command indicating switching BWP from the default DL BWP to a first DL BWP, wherein the first DL BWP may be configured with a larger bandwidth compared to the default DL BWP. This may lead additional overhead and latency in transitioning between power states of the cell with the BWP switching. To support fast BWP adaptation with low overhead, there is a need to enhance BWP adaptation in conjunction with a power state transition (e.g., from the dormant to the normal state).

In an example, a wireless device may receive one or more RRC messages comprising one or more parameters for a first PS-active BWP of a cell. A base station may configure one of one or more BWPs configured to the cell as the first PS-active BWP of the cell. The wireless device may switch to the first PS-active BWP for the cell in response to transitioning the cell switches from a dormant state to a normal state (or from a power state to another power state, or from a DRX off to DRX OnDuration or from a first power state to a second power state). In an example, the first PS-active BWP is a downlink BWP, wherein the first PS-active BWP is one of one or more downlink BWPs configured to the cell. In an example, the first PS-active BWP may be different from a default BWP. For example, the default BWP is a downlink BWP, wherein the one or more downlink BWPs comprises the default BWP. For example, a first PS-active BWP may comprise a large bandwidth (e.g., full bandwidth of the cell). The wireless device may more widely open up its RF capabilities and be able to process the data as quickly as possible when the cell is in the normal (e.g., non-dormant) state.

In an example, the first PS-active BWP may be configured as a same BWP to the default BWP. The wireless device may switch from the dormant state to the normal state during a DRX operation, for example, in response to receiving a scheduling DCI on a second cell of a cell group (e.g., a DRX group), wherein the cell belongs to the cell group. The wireless device may stay on a small bandwidth BWP such as the default BWP in such a case. The wireless device may reduce power consumption in such a case as there may be no successive scheduling DCIs with small and infrequent traffic condition.

In an example, a wireless device receives a dynamic indication such as one or more DCIs, one or more reference signals, and/or one or more MAC-CE signaling to update a first PS-active BWP of a cell. A base station/network may dynamically update the first PS-active BWP of the cell based on a condition, such as the amount of traffic/queue, the on-going use cases of the wireless device, the mobility of the wireless device, the number of cells activated to the wireless device, and/or the like, being changed. The wireless device may dynamically and quickly adapt its bandwidth and bandwidth parts based on configuration parameters corresponding to the first PS-active BWP. This may allow the wireless device to efficiently utilize its battery power resources.

In existing technologies, a wireless device may receive one or more MAC-CEs indicating one or more cells to transition to a dormant state (e.g., a dormant SCell, a power saving state, a first power state). A base station may transmit at least one DCI comprising a resource assignment for a PDSCH and transmit, in the resources of the resource assignment, the one or more MAC CEs. This existing technique may be an inefficient use of physical resources because, in order to transmit the one or more MAC CEs, the network has to first transmit the at least one DCI comprising the resource assignment. This may lead higher overhead and latency. Dynamic and faster adaptation of power state with lower overhead is necessary. In an example, a wireless device may receive an additional DCI indicating a power state transition. A wireless device may have one or more capabilities such as a number of supported DCI formats, the number of supported blind decodings, and/or the like. The wireless device may need additional capability or increase its capability (e.g., increase the number of supported blind decodings) to support the additional DCI. An enhanced mechanism for a DCI based power state transition mechanism without incurring additional UE capability is needed.

In an example, a base station may transmit a power saving (PS)-DCI indicating a power state transition for a first cell (e.g., between a first power state and a second power state, between a dormant state and a non-dormant state, between a dormant state and a normal state, or between a DRX off state and a DRX active state), wherein a size of a PS-DCI is same as a first DCI comprising a resource assignment for downlink or uplink data. In an example, the wireless device may use a second RNTI to CRC scramble the PS-DCI. The wireless device may use a first RNTI to CRC scramble the first DCI. For example, the wireless may a first DCI format for a PS-DCI and a second DCI format for a first DCI while keeping a same size between the first and second DCI. For example, the first DCI format and the PS-DCI format may share one or more first DCI fields. The PS-DCI format may comprise one or more second DCI fields, such as one or more bits of indication of a power state of one or more cells. The first DCI format may comprise one or more third DCI fields such as HARQ process ID. The first DCI format and the second DCI format may have a same DCI size.

In an example, a wireless device may use a same RNTI for a PS-DCI indicating a power state transition for a first cell and a first DCI comprising a resource assignment. For example, the wireless device may differentiate a PS-DCI and a first DCI based on one or more DCI fields of the DCI. For example, the wireless device may determine a DCI as a PS-DCI if the DCI has one or more DCI fields with prefixed values. The wireless device may assume that the combination of the one or more DCI fields with the fixed values is not used for a DCI comprising a resource assignment. For example, the one or more DCI fields may comprise HARQ process number, redundancy version, modulation and coding scheme, and frequency resource allocation. The wireless device may interpret other DCI fields on a PS-DCI to derive additional information such as duration of a power state. The wireless device may support dynamic power saving adaptation without additional capability. The network may reduce additional overhead to transmit a power saving adaptation signal and utilize the common framework between scheduling and power saving adaptation.

In existing technologies, for a cell in a dormant state (e.g., a dormant SCell, the cell in a power saving state, or the cell in DRX off state), the wireless device may not perform measurements and related procedure (e.g., reporting, recovery), such as a beam management/reporting (e.g., a physical layer reference signal receive power (L1-RSRP)), a new beam candidate measurement/reporting (e.g., beam recovery procedure), or a radio link measurement (e.g., radio link monitoring (RLM)) and RLM failure (e.g., radio link failure (RLF)) handling (e.g., hand-over). The lack of measurements/reporting during the dormant state of the cell may lead to a large wake-up/transition latency for the cell with potential recovery at the transition/wake-up. For example, the wireless device and a base station/network may not be aligned in terms of one or more of the best/candidate beams to use for communication (e.g., beams with highest L1-RSRP), and the wireless device may take some time to sync up when the wireless device switches from the dormant state to the normal state. There is a need to enhance the measurement and reporting in a dormant state or a power saving state of a cell.

Figure 28:
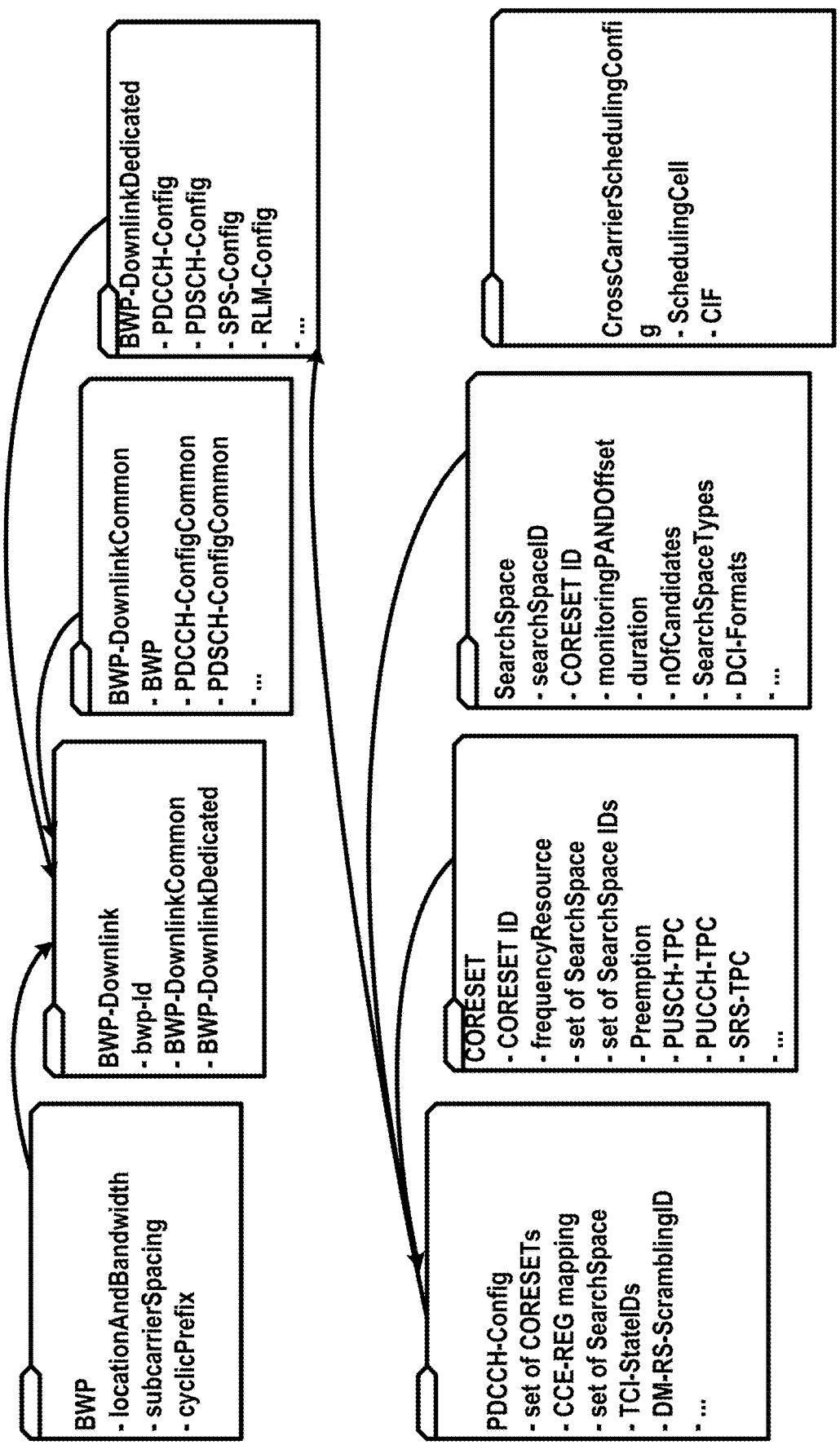
FIG. 28 shows an example RRC parameters related to a BWP.

In an example, a wireless device may continue performing one or more measurements and related procedure (e.g., reporting, recovery) such as L1-RSRP, RLM, beam recovery, or hand-over for a dormant cell (e.g., a cell in a power saving state, a dormant cell). The wireless device may perform the one or more measurements on a BWP with a small bandwidth and/or with coarser granularity of measurement reference signals on the dormant cell. In an example, a wireless device may receive RRC messages indicating one or more parameters for a dormant BWP and BWP-related parameters (example parameters are shown in FIG. 28) for a cell. The wireless device may apply the one or more parameters in response to a command indicating transition to the dormant state or the power saving state for the cell. A base station may configure the dormant BWP with a small bandwidth or coarser granularity of measurement reference signals. The wireless device may reduce power consumption for the measurements based on the dormant BWP activation. The wireless device may reduce latency for preparing and synchronizing with the base station for fully active state (e.g., aligned beams, appropriate TCIs for one or more CORESETs) in response to switching to a normal state for the cell.

A first power state of the specification may refer a first power saving state, a dormant state, a sleep mode, PS1, or DRX off state. A second power state of the specification may refer a second power saving state, a non-dormant state, a normal state, a wake-up mode, PS2, a DRX active state, a DRX OnDuration, or a DRX ActiveTime.

In an example, a wireless device may switch an active BWP of a cell from a first BWP to a second BWP in response to a command indicating transitioning a power state (e.g., a first power state/a second power state, a dormant/a non-dormant state, a dormant/a normal state, a power saving state/a normal state) for the cell. For example, a cell during DRX OnDuration (i.e., DRX ActiveTime) is considered as the cell is in a second power state and the cell during DRX Off duration is considered as the cell is in a first power state. For example, a wireless device may receive one or more RRC messages. The one or more RRC messages may comprise one or more set of parameters indicating a BWP index for a PS-active BWP for a first cell. The PS-active BWP may be associated with one BWP from one of one or more configured BWPs to the first cell. For example, the BWP index for the PS-active BWP may indicate a BWP index of the one or more configured BWPs to the first cell. In the example, the wireless device may activate the first PS-active BWP as an active BWP of the first cell in response to a command or a timer triggering transition the first cell from the dormant state to the normal state (or from an inactive state to an active state, or to a normal state from a sleep mode).

Figure 27:
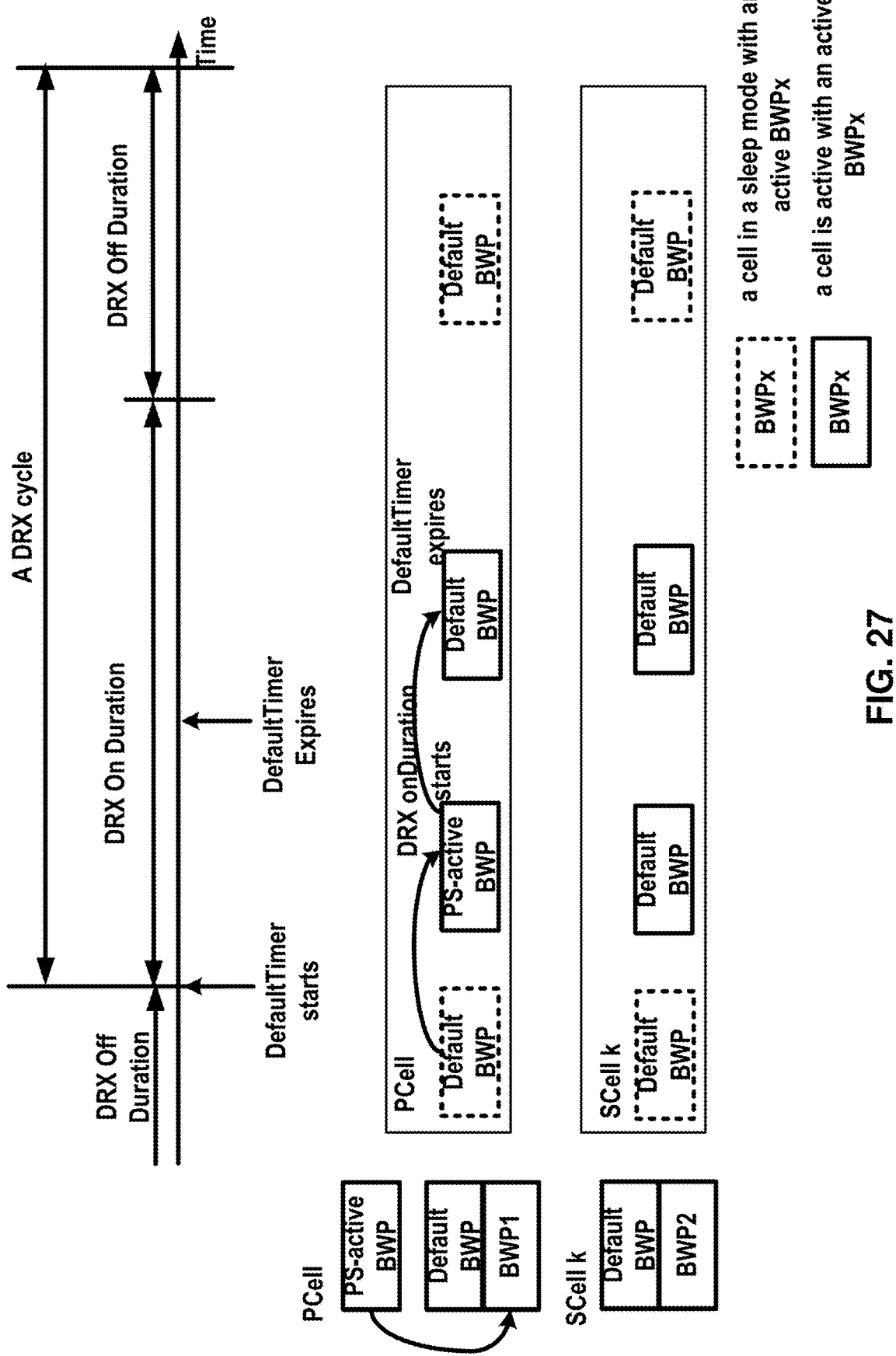
FIG. 27 shows an example embodiment of a PS-active BWP.

FIG. 27 illustrates an example. In the example, there are multiple serving cells configured to a wireless device (e.g., PCell and SCell k in a cell group). The base station may configure BWP1 as a PS-active BWP for the PCell. For example, the base station may configure a BWP index of BWP1 for the PS-active BWP. For example, the base station may indicate the BWP is the PS-active BWP by configuration one or more parameters for the BWP1. For example, the wireless device may determine the BWP1 as the PS-active BWP based on a rule. For example, the wireless device may determine a BWP with a lowest index, wherein the BWP is different from the default BWP and the BWP is different from a dormant BWP, among one or more BWPs configured for the PCell. The example illustrates that the BWP1 is indicated as the PS-active BWP. The wireless device may switch to the PS-active BWP (BWP1 of PCell in FIG. 27) or activate the PS-active BWP (BWP1) in response to a power state transition from a first power state to a second power state (e.g., from a dormant to a normal state, or from a DRX off state to DRX active state) for PCell. The PCell may be a primary cell or a secondary cell.

The wireless device may maintain a current active DL and/or UL bandwidth part for a cell if a PS-active BWP is not configured. For example, when the wireless device receives a command indicating transition of SCellk to the normal state, the wireless device may maintain the active DL/UL BWP without switching a BWP. For example, when the PS-active BWP is not configured for a cell, the wireless device may not expect to receive the command indicating the transition to the normal state for the cell. The wireless device may maintain the cell in the normal state without changing a power state of the cell. In FIG. 27, the wireless device switches between a default BWP and a BWP1 of PCell in response to a power state change based on a DRX configuration and a bwp-inactivityTimer (DefaultTimer). For example, when the wireless device starts DRX On Duration (e.g., DRX active time), the wireless device considers that a power transition indication is given to the PCell. The wireless device activates the PS-active BWP (BWP1) in response to the transition. In response to an expiry of the bwp-inactivity Timer (DeafultTimer expires), the wireless device activates the default BWP for the PCell. The wireless device maintains the default BWP through a remaining of DRX cycle as there is no event indicating transition of a power state. The wireless device maintains an active BWP of SCellk (e.g., default BWP) regardless of DRX active state or DRX off state as the SCellk is not configured with a PS-active BWP. The wireless device may perform a go-to-sleep operation during the DRX off state. The wireless device may perform a wake-up operation during the DRX active state. The PCell may be a primary cell or a secondary cell. The SCellk may be a primary cell or a secondary cell. The PCell and SCellk may belong to a same DRX group.

In an example, a wireless device may receive one or more RRC messages comprising one or more parameters to configure a dormant BWP for a cell. In the example, the one or more parameters may comprise a bandwidth part index of one BWP from one or more configured bandwidths for the cell. In the example, the one or more parameters may comprise parameters needed to define a BWP. A wireless device may maintain at least one active DL and/or UL BWP for a cell when the cell becomes a dormant state (e.g., from a normal state to a dormant state, from PS2 to PS1, from a sleep mode to a dormant state). For example, a wireless device may determine the active DL BWP for a cell in the dormant state as a dormant BWP. In determining a BWP index for an active DL BWP of the cell in the dormant state, different examples are described. For example, a default BWP (if configured) may be defined as the active DL BWP of a cell in a dormant state (e.g., a dormant BWP). For example, a current active DL BWP of a cell may be a dormant BWP for the cell in response to transitioning the cell to a dormant state (or a power saving state). For example, the wireless device may assume a default BWP (if configured) is used as an active BWP of a cell in response to transitioning the cell to a dormant state if a dormant BWP is not configured in a dormant state of a cell. For example, the wireless device may assume a current active DL BWP is used for dormant BWP (e.g., maintain an active DL BWP in response to transitioning to the dormant state) if a default BWP and a dormant BWP are not provided.

In an example, a wireless device may receive a first set of parameters for a first BWP and a second set of parameters for a second BWP. The first BWP and the second BWP may share at least same configuration parameters defining a bandwidth part (e.g., locationAndBandwidth, subcarrierSpacing, and cyclicPrefix). FIG. 28 illustrates an example of configurations related to a bandwidth part supported by existing systems. A wireless device receives one or more BWP-Downlink configurations. A BWP-Downlink may comprise a bwp-Id, BWP-DownlinkCommon, or BWP-DownlinkDedicated. BWP-DownlinkCommon may comprise a BWP configuration, PDCCH-ConfigCommon, or PDSCH-ConfigCommon. A PDCCH-ConfigCommon may comprise a set of parameters for receiving a DCI comprising a resource assignment for a common data or a common DCI. A PDSCH-ConfigCommon may comprise a set of parameters needed for receiving a broadcast data and/or a unicast data. BWP-DownlinkDedicated may comprise a set of parameters for PDCCH-Config, PDSCH-Config, SPS-Config and/or RLM-RS configurations. PDCCH-Config may comprise a set of parameters for CORESETs, SearchSpace (SS) sets, and related scrambling information and beam information to receive a DCI. PDSCH-Config may comprise a list of time-domain resource allocation entries, rate matching patterns, and/or scrambling information for a downlink data. The parameters of a BWP configuration may comprise locationAndBandwidth (e.g., frequency location and bandwidth of a BWP), subcarrier spacing, and/or cyclic prefix (e.g., numerology of a BWP).

The first BWP and the second BWP may share same parameters of the BWP configuration. The first set of parameters and the second set of parameters may share same parameters for the BWP configuration. The first set of parameters and the second set of parameters may share a bwp-Id in BWP-downlink or BWP-uplink. The first BWP and the second BWP may share the same bwp-Id. The first BWP and the second BWP may represent a first power state of the BWP indicated by the bwp-Id and a second power state of the BWP respectively. The wireless device may not switch between the first BWP and the second BWP in response to a command indicating a bandwidth part index, wherein the bandwidth part index of the first BWP and the bandwidth part index of the second BWP is the same. The wireless device may switch between the first BWP and the second BWP in response to a command indicating a transition between power states (e.g., a power saving switching command based on a DCI, MAC-CE and/or a timer, transition from a dormant state to a normal state or vice versa). In an example, the wireless device may switch to/activate the first BWP in response to an indication to transition to the first power state (e.g., a dormant state, PS1, a power saving state). The wireless device may switch to/activate the second BWP in response to an indication to transition the second power state (e.g., a normal state, PS2, a non-dormant state).

A wireless device may perform different set of functionalities between a first and a second power state. For example, the wireless device may not monitor for a DCI comprising a resource assignment for a cell, when the cell is in the first power state or in a dormant state. The wireless device may monitor for one or more DCIs comprising resource assignments for the cell, when the cell is in the second power state or in a normal state. For example, the wireless device may be configured with reduced monitoring occasions in the first power state compared to ones in the second power state. The wireless device may monitor for a DCI comprising a resource assignment for a cell in either the first power state or the second power state. The wireless device may monitor reduced number of search space candidates in the first power state compared to the second power state.

Figure 29:
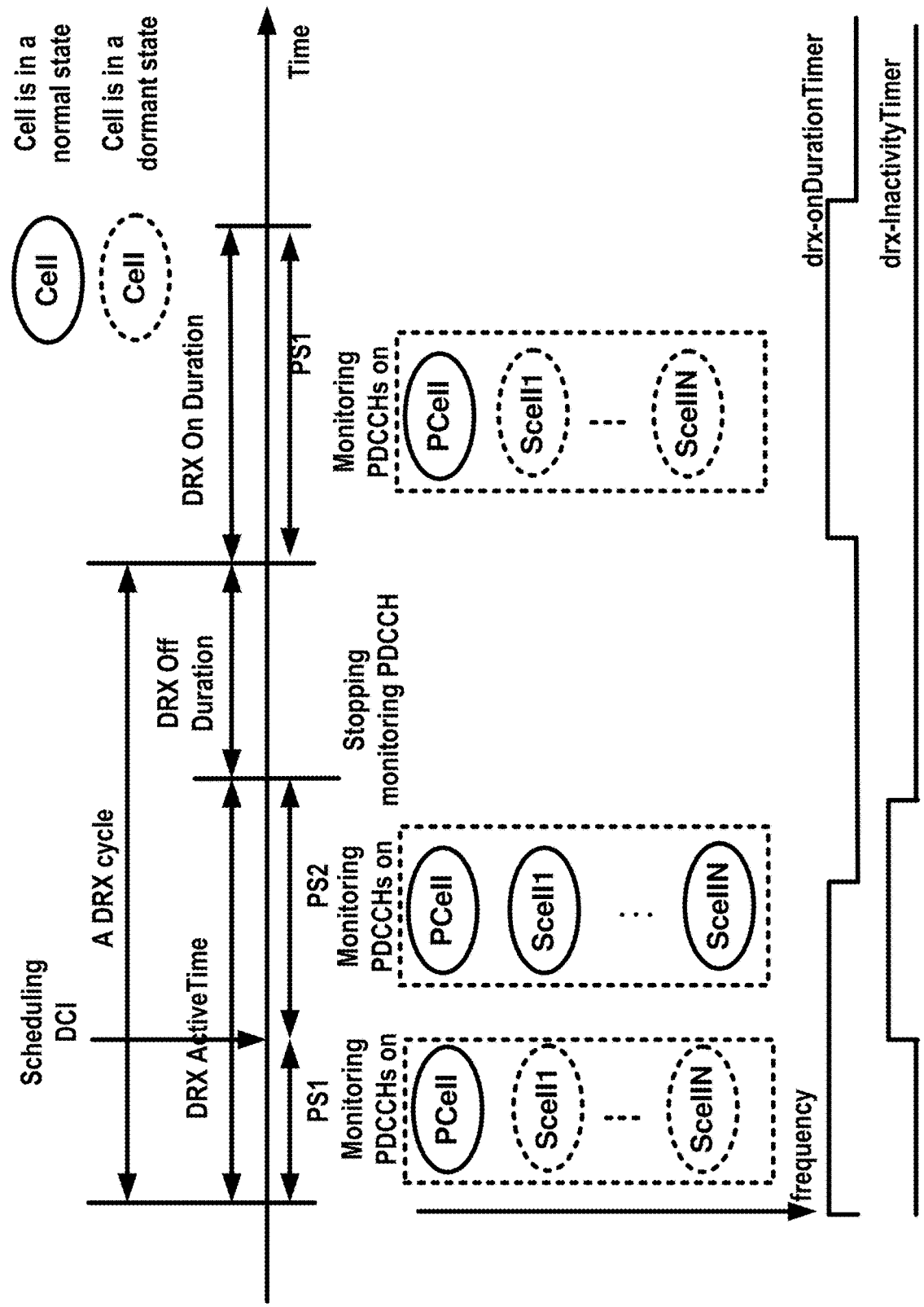
FIG. 29 shows an example DRX procedure with a dormant state.

In an example, a wireless device may switch/transition from the first to the second power state during DRX OnDuration in response to an event, such as a drx-inactivityTimer start, receiving a scheduling DCI, transmission of an uplink data or SR, or receiving a command to switch a power state or state. FIG. 29 illustrates an example DRX operation with a dormant cell (or a dormant state of a cell) operation in accordance with embodiments of the present disclosure. As shown in FIG. 29, at the beginning of a DRX active time signaled by a drx-onDurationTimer, one or more SCells for a wireless device may be in a dormant state. The wireless device transitions the one or more SCells from the dormant state to an active state during the DRX active time. For example, the wireless device transitions the one or more SCells from the dormant state to the active state during the DRX active time based on receiving a DCI indicating an uplink or a downlink grant (e.g., Scheduling DCI in FIG. 29). The wireless device may monitor for the DCI on the PCell. The wireless device may start drx-inactivity Timer in response to receiving the DCI for the downlink or the uplink transmission. In an example, a wireless device may determine the first power state (e.g., a first power saving state, a dormant state, a power saving state, a sleep mode, PS1 shown in FIG. 29) in response to receiving a wake-up signal or not receiving a go-to-sleep signal for a cell. The wireless device may maintain a sleep for a cell in response to receiving a go-to-sleep or not receiving a wake-up signal.

The wireless may transition/switch to the second power state (e.g., a second power saving state, a non-dormant state, a wake-up mode, a normal state, PS2 shown in FIG. 29) for the cell from the first state (e.g., a sleep mode) in response to an event, such as a drx-inactivityTimer start, receiving a scheduling DCI, transmission of an uplink data or SR, or receiving a command to switch a power state or state. FIG. 29 illustrates that the wireless device transitions the one or more SCells to PS2 in response to receiving the scheduling DCI. Though not shown in FIG. 29, the wireless device may transition between the first power state and the second power state of a cell based on one or more DCIs comprising a field to indicate transition the power state of the cell. In an example, a wireless may receive a command of power state transition (e.g., a DCI comprising a field to indicate transition from a first power state to a second power state of a cell (or vice versa)) with or without DRX configuration.

In an example, a power state may apply for a cell group. For example, a first power state may correspond to a DRX active time, while a drx-InactivityTimer is not running. A second power state may correspond to the DRX active time, while the drx-InactivityTimer is running. The power state may apply to one or more cells belonging to the cell group, or a DRX group, wherein a DRX configuration is shared among cells of the DRX group. In an example, a wireless device may receive configuration parameters of one or more first cells to wake-up on the first power state of a cell group or a DRX group (e.g., the cell group is in a first DRX OnDuration or the cell group is in a dormant state or the cell group is in a power saving state). The wireless device may transition the one or more first cells to a normal state and/or maintain the one or more first cells in the normal state. The one or more first cells may be a PCell, PCell and a subset of SCells or all cells in the cell group. The wireless device may wake-up the indicated cells (if configured) during the first power state (e.g., PS1). The wireless device may maintain a sleep mode or a dormant state for one or more second cells, wherein the one or more second cells belong to the cell group and the one or more first cells do not comprise each cell of the one or more second cells. The wireless device may wake-up the one or more second cells in response to an event of transition to the second power state (e.g., PS2). The wireless device may transition the one or more second cells to the normal state in response to the event.

This may allow a base station to determine one or more first cells, wherein a wireless device may maintain the one or more first cells in a normal state so that the wireless device is able to receive control/data from the base station via the one or more first cells, among cells of a cell group. The base station may balance a scheduling flexibility and a UE power consumption to the determine the one or more first cells. The one or more first cells to wake-up on PS1 (e.g., maintained in the normal state) may be indicated via a DCI or RS of wake-up signal or power saving signal. For example, a base station may transmit a wake-up signal via a DCI, wherein the DCI may comprise indications of a power state of each cell of a plurality of cells in a cell group. Based on the indication, the wireless device may determine one or more first cells, wherein the indication indicates a normal state for the one or more first cells. Based on the indication, the wireless device may determine one or more second cells, wherein the indication indicates a dormant state for the one or more second cells. When the base station does not indicate any power state for a cell, the wireless device may maintain existing power state for the cell (e.g., the normal state for the cell not configured with a dormant BWP).

In the example, the wireless device may switch to a BWP (e.g., a BWP switching) based on configuration parameters. For example, the wireless device may activate a PS-active BWP of a first cell as an active BWP of the first cell, wherein the one or more first cells comprise the first cell, in response to transitioning the cell group to the first power state (e.g., configured as a normal state in PS1). For example, the wireless device may activate a dormant BWP of a second cell as an active BWP of the second cell, wherein the one or more second cells comprise the second cell, in response to the transitioning the cell group to the first power state. The wireless device may activate a PS-active BWP of the second cell as an active BWP of the second cell, in response to transitioning the cell group to the second power state.

Figure 30:
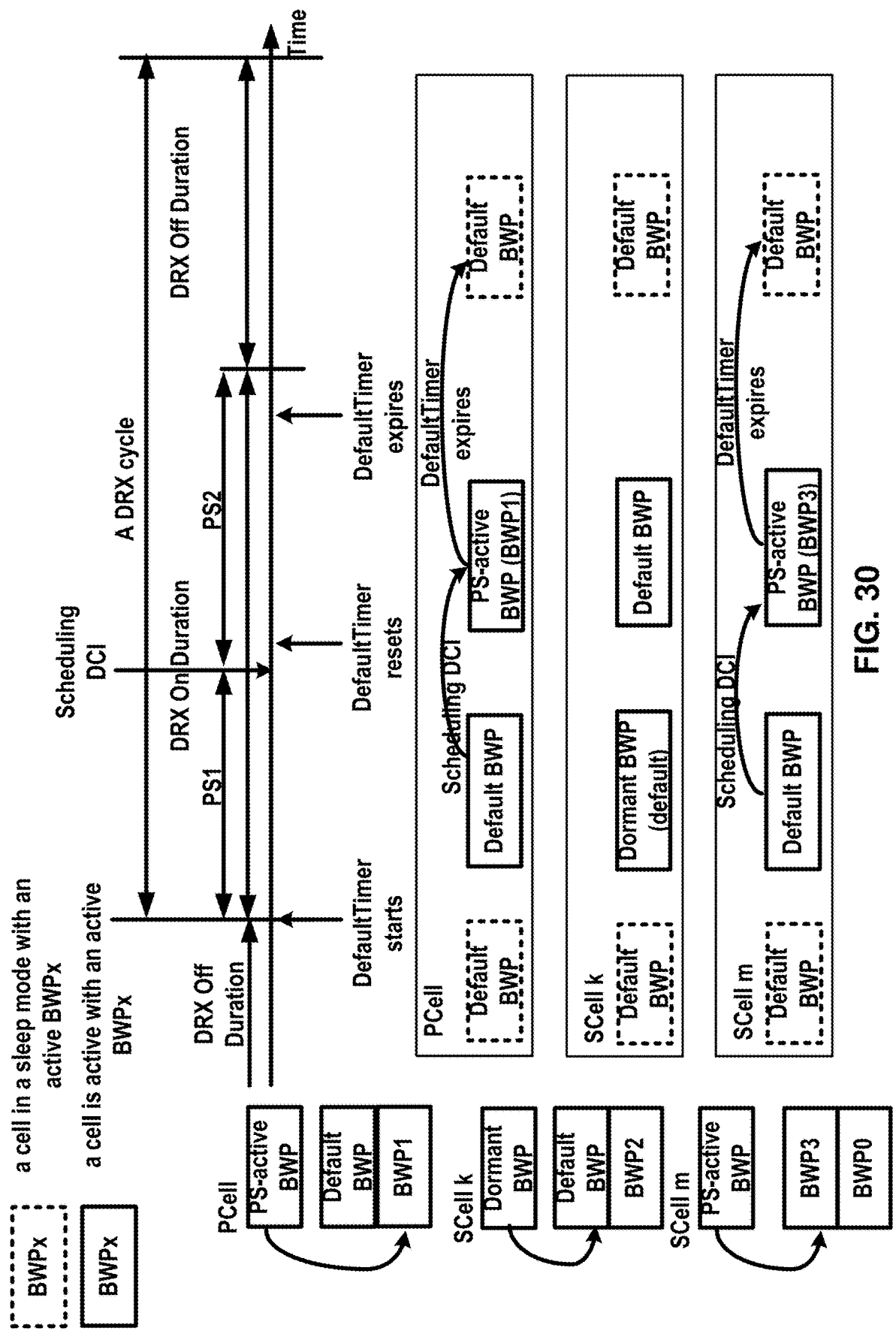
FIG. 30 shows an example embodiment of a dormant BWP and a PS-active BWP.

FIG. 30 illustrates an example. FIG. 30 illustrates a power state transition of a DRX group. For example, the DRX group is in a first power state (PS1) during DRX On Duration without drx-InactivityTimer is running. The DRX group is in a second power state (PS2) during DRX On Duration with drx-InactivityTimer is running. The wireless device may start the drx-Inactivity Timer in response to receiving a scheduling DCI (e.g., Scheduling DCI) for a downlink or an uplink. The DRX group may comprise PCell, SCell k and SCell m. The wireless device is configured with a PS-active BWP for PCell and SCell m. The wireless device is configured with a dormant BWP for SCell k. During DRX off duration, the wireless device may maintain a sleep mode for PCell, SCell k and SCell m. For example, during DRX off, a default BWP of each cell is maintained. In response to starting of DRX On Duration, the wireless device determines the first power state for the DRX group. The wireless device activates a dormant BWP of a cell as an active BWP of the DRX group, if the dormant BWP is configured for the cell. Otherwise, the wireless device maintains an active BWP of the cell in the first power state. As shown in FIG. 30, the wireless device may activate the dormant BWP (a default BWP of SCell k) as the active BWP of SCell k in response to the starting of the DRX On Duration (e.g., starting of PS1). In response to transition to the second power state based on the scheduling DCI, the wireless device activate a PS-active BWP of a cell as an active BWP of the cell if configured. Otherwise, the wireless device maintains an active BWP of the cell. FIG. 30 illustrates that the wireless device activates BWP1 for PCell and BWP3 for SCell m in response to the transitioning to the PS2 based on the scheduling DCI. The wireless device maintains an active BWP of SCell k (e.g., the dormant BWP, the default BWP) as no PS-active BWP for SCell k is configured. In response to an expiry of a bwp-inactivityTimer (e.g., DefaultTimer expires), the wireless device activates a default BWP of the cell.

The wireless device switches to a dormant BWP in PS1 (if configured) for a cell if the cell is not indicated as a wake-up cell by the configuration or by a DCI. In the example, the wireless device switches to a dormant BWP for SCell m as SCell m is not indicated as a wake-up cell in PS1. The device monitors CORESETs/SSs of PCell and SCell k (indicated as wake-up cells) during PS1. The wireless device may transition to PS-active BWP (BWP1) for PCell. The wireless device may continue the most recent active BWP for other cells on the transition to PS2 in response to not receiving a configuration for the other cells. The wireless device may switch to a default BWP in response to bwp-inactivity Timer expiry.

In an example, a wireless device may receive one or more radio resource control messages comprising configuration parameters of a cell, wherein the configuration parameters indicate a first bandwidth part is configured as a first active bandwidth part of the cell, and a second bandwidth part is configured as a second active bandwidth part of the cell. The wireless may activate the first bandwidth part in response to receiving a first command indicating activation of the cell from a deactivated state. The wireless device may monitor a first downlink control channel for the first bandwidth part in response to activating the first bandwidth part. The wireless device may transit to a second power state (e.g., a non-dormant state, a normal state, a PS2, a non-power saving state) of the cell from a first power state (e.g., a dormant state, a power-saving state, PS1) in response to receiving a second command to transition the cell from the second state to the first power state. The wireless device may activate the second bandwidth part in response to the second command and may monitor a second DCI for the second bandwidth part in responding to activating and may receive a DCI on the second bandwidth part in response to receiving a DCI.

For example, a wireless device may receive one or more RRC messages. The one or more RRC messages may comprise one or more set of parameters indicating a BWP index for a PS-active BWP for a first cell. The PS-active BWP may be associated with one BWP from one of one or more configured BWPs to the first cell. For example, the BWP index for the PS-active BWP may indicate a BWP index of the one or more configured BWPs to the first cell. In the example, the wireless device may activate the first PS-active BWP as an active BWP of the first cell in response to a command or a timer triggering transition the first cell from the dormant state to the normal state (or from an inactive state to an active state, or to a normal state from a sleep mode).

Figure 31:
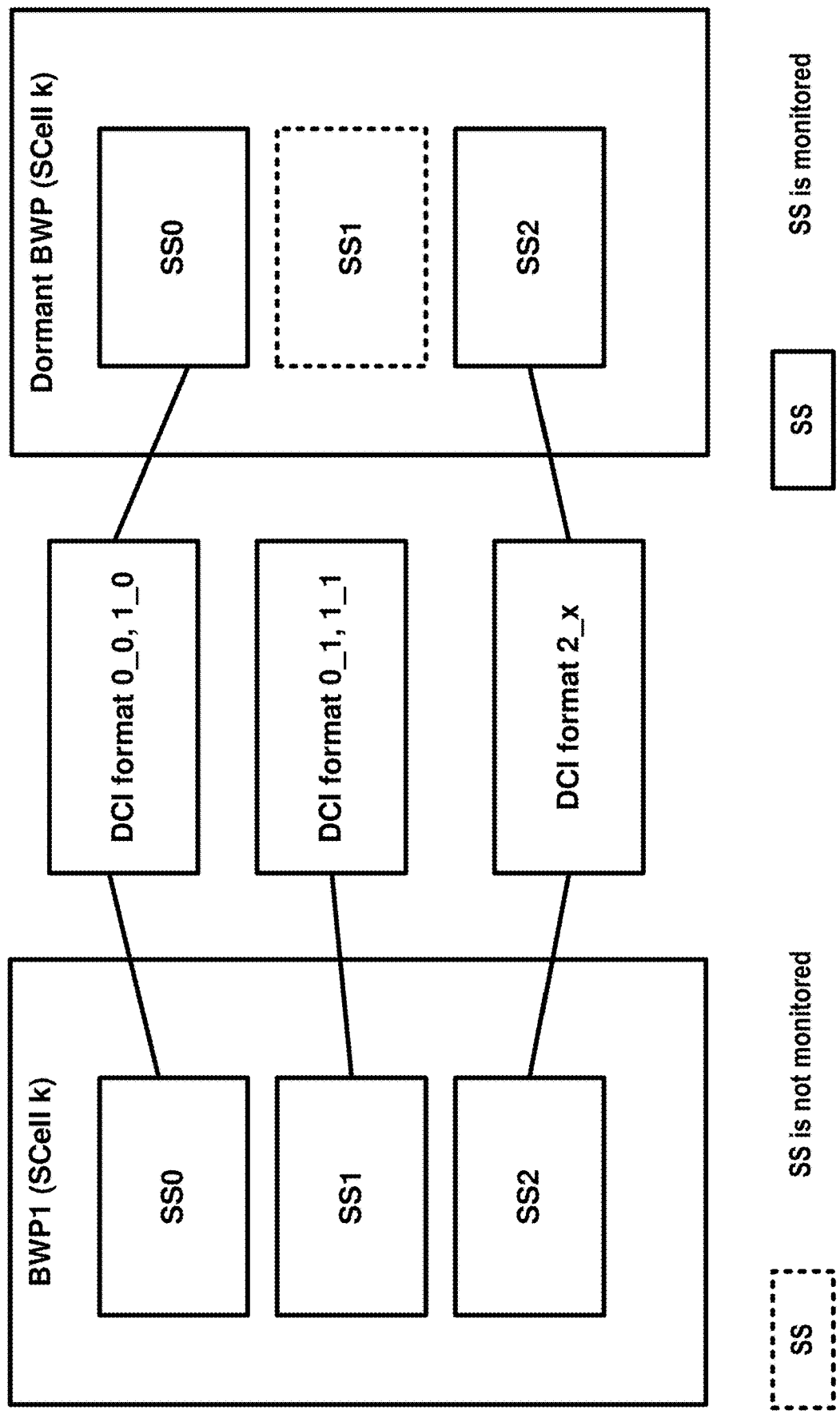
FIG. 31 shows an example embodiment of reduced DCI formats in a dormant state.

In an example, a wireless device may receive a set of configuration parameters of one or more first DCI formats monitored on a dormant BWP of a cell. The wireless device may be configured with a limited number of DCI format(s) associated with the dormant BWP of the cell. The wireless device may monitor one or more first search spaces (SSs), from one or more second SSs of a second BWP of the cell, wherein the cell is in a dormant state. The wireless device may be indicated that the second BWP is used for the dormant BWP for the cell. The wireless device may be configured with the one or more second SSs for the second BWP of the cell. The wireless device may receive a DCI with one from the first DCI formats in the one or more first SSs, wherein the cell is the dormant state or an active BWP of the cell is the dormant BWP or in the dormant BWP. FIG. 31 shows an example. A wireless device receives configuration parameters indicating a BWP1 is associated with a dormant BWP and indicating to monitor a fallback DCI format (DCI format 0_0, 1_0) and a group common DCI (DCI format 2_x, e.g., format 2_3, format 2_0) in the dormant BWP. The wireless device may determine association between the BWP1 and the dormant BWP based on a bwp-Id configured for the dormant BWP. The bwp-Id parameter of the dormant BWP may indicate a bwp-Id corresponding to the BWP1.

The wireless device may monitor SS0 and SS2 only in a dormant state of SCell k while the wireless device may monitor SS0, SS1 and SS2 in a normal state of SCell k based on an example shown FIG. 30. The wireless device may skip monitoring a DCI based on a DCI format on a dormant BWP (e.g., a dormant cell), when the configuration to monitor the DCI format in the dormant BWP is not provided to the wireless device for the cell. In an example, a wireless device may be configured with a set of DCI format(s) that the wireless device may skip monitoring a DCI in a dormant state of a cell. In an example, a wireless device may skip monitoring a DCI with a DCI format related to a data scheduling/transmission (e.g., DCI format 0_0, 1_0, DCI format 1_1, 0_1) in a dormant state of a cell or in a dormant BWP. The wireless device may continue monitoring a second DCI not comprising a resource assignment for downlink or uplink data in the dormant BWP. In an example, a wireless may skip monitoring a DCI with a non-fallback DCI format in a dormant BWP. The wireless device may continue monitoring a second DCI based on a fallback DCI format in the dormant BWP.

In an example, a wireless device may receive a set of configuration parameters of one or more first RNTIs monitored on a dormant BWP of a cell. The wireless device may monitor one or more first SSs from one or more second SSs of a second BWP of the cell. The wireless device may be indicated that the second BWP is used for the dormant BWP in response to transition the cell to a dormant state. The wireless device may be configured with the one or more second SSs for the second BWP of the cell. The wireless device may receive a first DCI based on a DCI format with CRC scrambled with one RNTI from the first RNTIs in the one or more first SSs. The wireless device may skip monitoring a second DCI based on a second DCI format with CRC scrambled with a second RNTI, wherein the first RNTIs do not comprise the second RNTI, on a dormant cell (e.g., the configuration of the second RNTI is not provided for the dormant BWP of the cell). In an example, a wireless device may be configured with a set of RNTIs that the wireless device may skip monitoring a DCI in a dormant state of a cell or in a dormant BWP of the cell. The wireless device may continue monitoring a second DCI with a RNTI not from the configured set of RNTIs in the dormant BWP.

In an example, a wireless device may skip monitoring a DCI with any RNTI related to a data transmission (e.g., SI-RNTI, P-RNTI, C-RNTI, CS-RNTI, MCS-C-RNTI) in a dormant state of a cell or in a dormant BWP of the cell. The wireless device may continue monitoring a second RNTI, wherein the second RNTI is for non-data transmission such as SFI-RNTI. In an example, a wireless may skip monitoring a DCI with one or more RNTIs for a unicast scheduling (e.g., C-RNTI, CS-RNTI) in a dormant BWP of a cell. The wireless device may continue monitoring a RNTI, wherein the one or more RNTIs do not comprise the RNTI, in the dormant BWP of the cell. In an example, a wireless may skip monitoring a DCI with one or more RNTIs for a downlink unicast data (e.g., C-RNTI, CS-RNTI). The wireless device may continue monitoring a second DCI based on a RNTI, different from the one or more RNTIs in the dormant BWP of the cell.

In an example, a wireless device may receive one or more configurations comprising a list of time-domain resource allocation or enabling of micro-sleep scheduling for a dormant BWP. For example, a wireless device may receive a list of time-domain resource allocation that may enable a micro-sleep between a PDCCH and the corresponding PDSCH. For example, a wireless device may receive a micro-sleep enabled indication where the wireless device may assume one or more entries of time-domain resource allocation with a sufficient gap between a PDCCH and the corresponding PDSCH will be used in a DCI comprising a resource assignment for the dormant BWP.

In an example, a dormant BWP may be configured with a set of measurement reference signals and/or objects to enable relaxed measurement.

In an example, a wireless device may receive a configuration of a dormant BWP, wherein one or more parameters of a dormant BWP may comprise: a bandwidth part index, and/or a bandwidth part configuration, and/or one or more parameters for CORESET(s) and/or one or more search space sets. In an example, a base station/network may indicate no control channel monitoring on the dormant BWP. In an example, a base station may indicate a reduced set of CORESETs/SSs on a dormant BWP compared to the BWP sharing a same BWP index. In an example, a scaling factor can be configured to a dormant BWP. The wireless device may determine periodicity of search space monitoring based on the scaling factor and the configured search space monitoring periodicity configured to the BWP, wherein the dormant BWP is associated with the BWP. For example, a search space monitoring every slot with scaling factor 2 may be monitored in every two slots. In an example, a base station/network may configure a dormant BWP as an independent BWP with configuration parameters related to a BWP (e.g., PDCCCH-Config. PDSCH-Config). The base station may configure no CORESET and/or SS associated with the dormant BWP so that a wireless device may skip monitoring a DCI on the dormant BWP.

One or more parameters to configure a dormant BWP may include parameters of BWP (e.g., bandwidth, frequency location and numerology), and/or a new BWP ID and/or one or more measurement reference signals and measurement feedback related configurations. A wireless device may not receive a data on a dormant BWP. In an example, a wireless device may switch to a dormant BWP of a cell (e.g., activate the dormant BWP as an active BWP) in response to receiving a command indicating a transition of the cell to a dormant or power saving state via DCI(s), MAC-CE(s) and/or timer(s). In an example, a dormant BWP may be a same BWP (e.g., same frequency location, same bandwidth and same numerology) to a default BWP with different control channel monitoring behavior. In an example, a dormant BWP may be a same BWP to a PS-active BWP with different control channel monitoring behavior.

In an embodiment, for a cell, a dormant BWP of the cell may have a same bandwidth, a same starting and an end frequency region, and a same numerology to those of a PS-active BWP of the cell. The dormant and PS-active BWP of the cell may share the physical resources to avoid bandwidth part adaptation latency.

Figure 32:
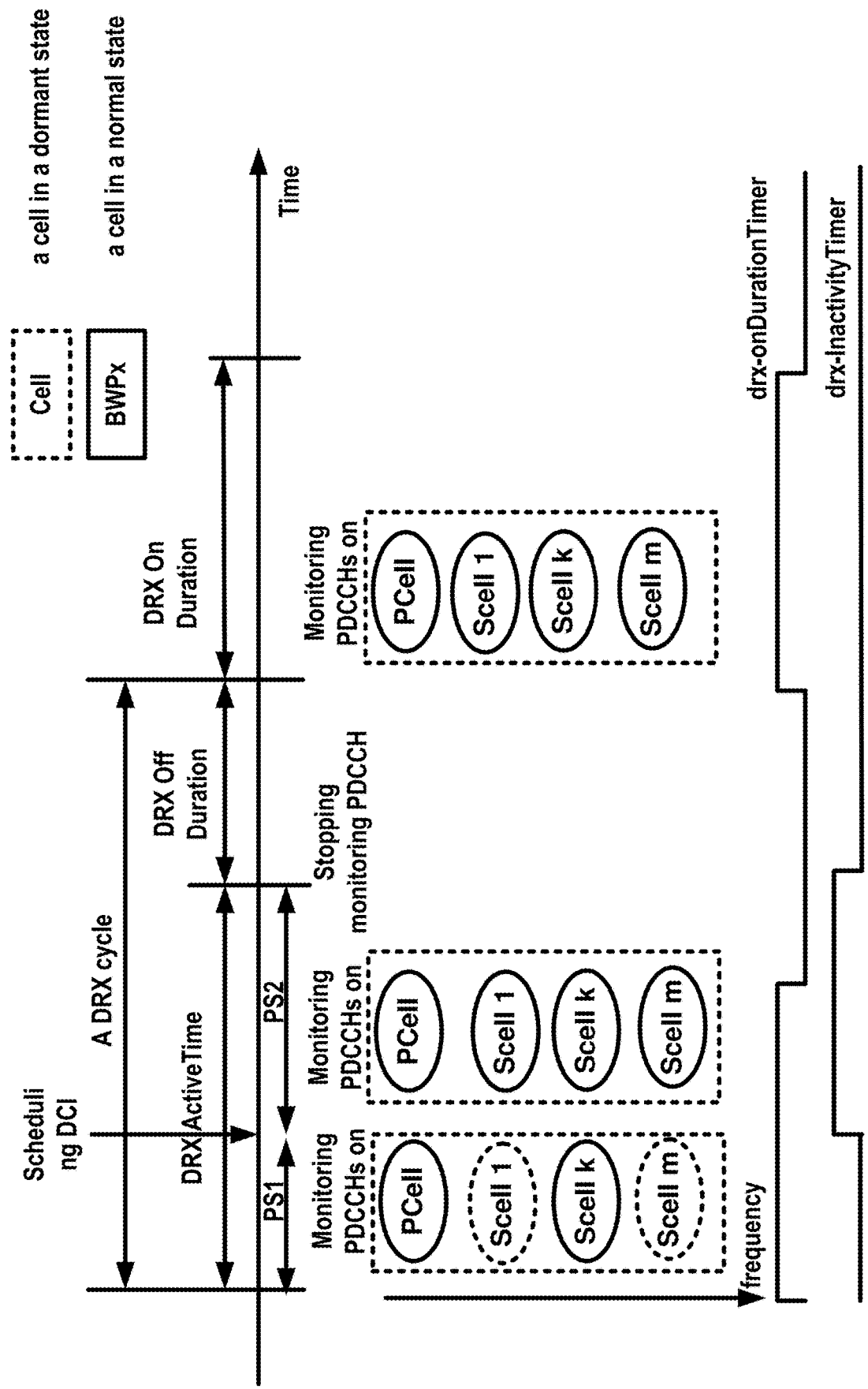
FIG. 32 shows an example DRX procedure with RRC-configured active cells in a first power state.

FIG. 32 illustrates an example. A wireless device switches to a dormant BWP on SCell m on PS1 in response to a configuration that SCell m and SCell 1 not in the list of wake-up cells on PS1. The wireless device may wake-up PCell and SCell k based on the configuration. In response to a scheduling DCI during PS1, the wireless device may switch to PS2, and may switch a power state of SCell 1 and SCell m. In the power state transition, the wireless device changes its state of SCell m and SCell 1 from a dormant to a normal.

Figure 33:
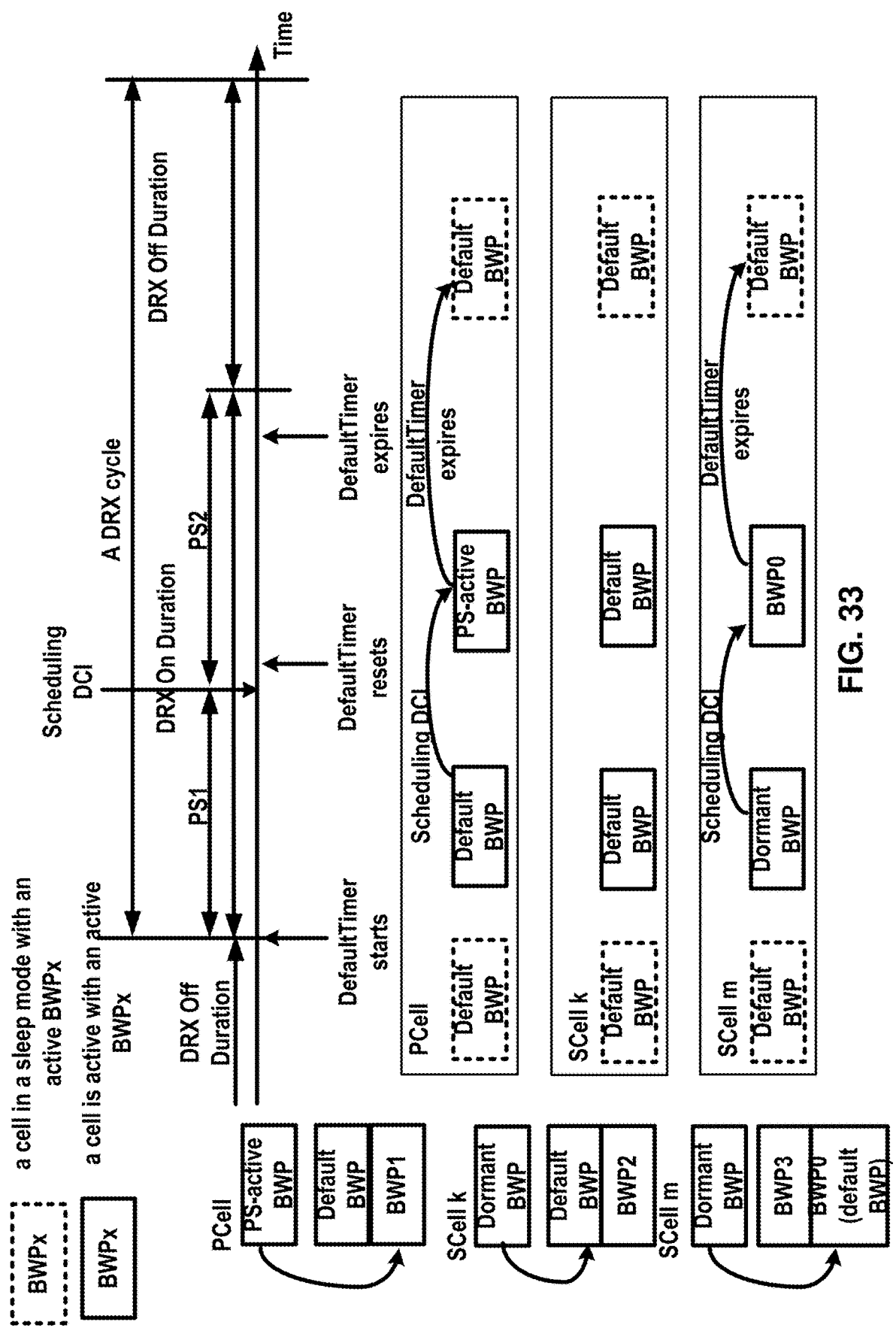
FIG. 33 shows an example embodiment of a PS-active BWP of a cell with one or more cells.

In an example, a network may configure a PS-active BWP by configuring a bandwidth index of a BWP (e.g., BWP1 in FIG. 33 for PCell). FIG. 33 illustrates an example. The base station may configure to a wireless device a PS-active BWP for PCell and SCell m (BWP1 for PCell, BWP3 for SCell m though SCell m is not shown in FIG. 33). The base station may configure to the wireless device a default BWP for SCell k (default BWP. e.g., BWP0). The wireless device may activate BWP1 for PCell, or BWP3 for SCell m in response to a command indicating transition of PCell and SCell m to a PS2 (e.g., a normal state) from PS1 (e.g., a power saving state). In the example, for SCell m, the base station configures BWP0 (default BWP) as a dormant BWP and BWP3 as the PS-active BWP. In response to transition to PS1, the wireless device activates the dormant BWP of the SCell m (e.g., the default BWP). In response to transition to PS2, the wireless device activates the PS-active BWP of the SCell m (e.g., the BWP3).

Figure 34:
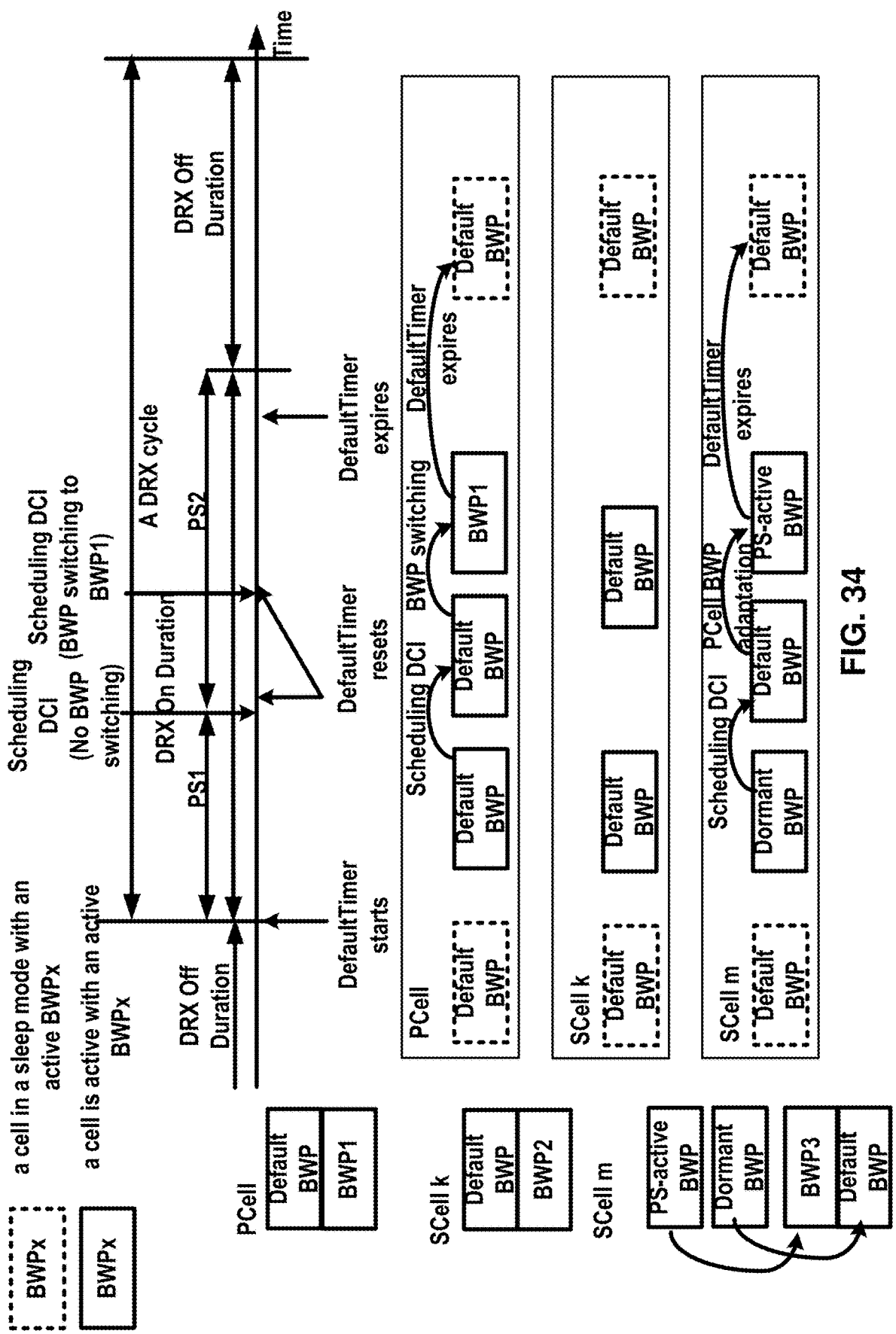
FIG. 34 shows an example embodiment of PS-active BWP being active in response to PCell BWP change.

In an example, a wireless device may switch to a PS-active BWP of a SCell based on an active BWP (e.g., a current active BWP) or an indicated BWP on PCell or another SCell. FIG. 34 illustrates an example. The wireless device may change its state from a dormant to a normal based on the wireless device being configured with a default BWP in PS2 (e.g., power saving state). During PS2 or even during PS1, if the wireless device may receive a command to switch PCell BWP to BWP1, the device may switch to a PS-active BWP of a cell, wherein the cell is configured with the PS-active BWP. The wireless device may not active a PS-active BWP of a SCell until the BWP of a PCell is switch to a first BWP. The first BWP of the PCell may be configured by the base station to a wireless device. A wireless device may switch to PS-active BWP (if configured) on a SCell if PCell BWP is switched to a non-default BWP (e.g., BWP1). The wireless device may receive configurations to map a PS-active BWP of a cell to an acting BWP of PCell or an acting BWP of another cell. In response to a command indicating a transition to the acting BWP of PCell or the another cell, the wireless device may switch to the PS-active BWP of the cell. The wireless device may stay on the same bandwidth part to the most recent active BWP (e.g., maintain an active BWP), when a PS-active BWP is not configured/indicated. A wireless device may recommend a mapping between an acting cell BWP and a SCell PS-active BWP. In FIG. 34, the wireless device maintains an active BWP of a cell in response to transition to a second power state (PS2) based on a scheduling DCI. In response to switching to a BWP1 (e.g., a non default BWP) of the PCell, as an active BWP of the PCell, the wireless device activates a PS-active BWP (e.g., BWP3) of the SCell m. The wireless device transitions the SCell m to a normal state or a non-dormant state in response to activating a non-default or a non-dormant BWP of another cell such as PCell.

Figure 35:
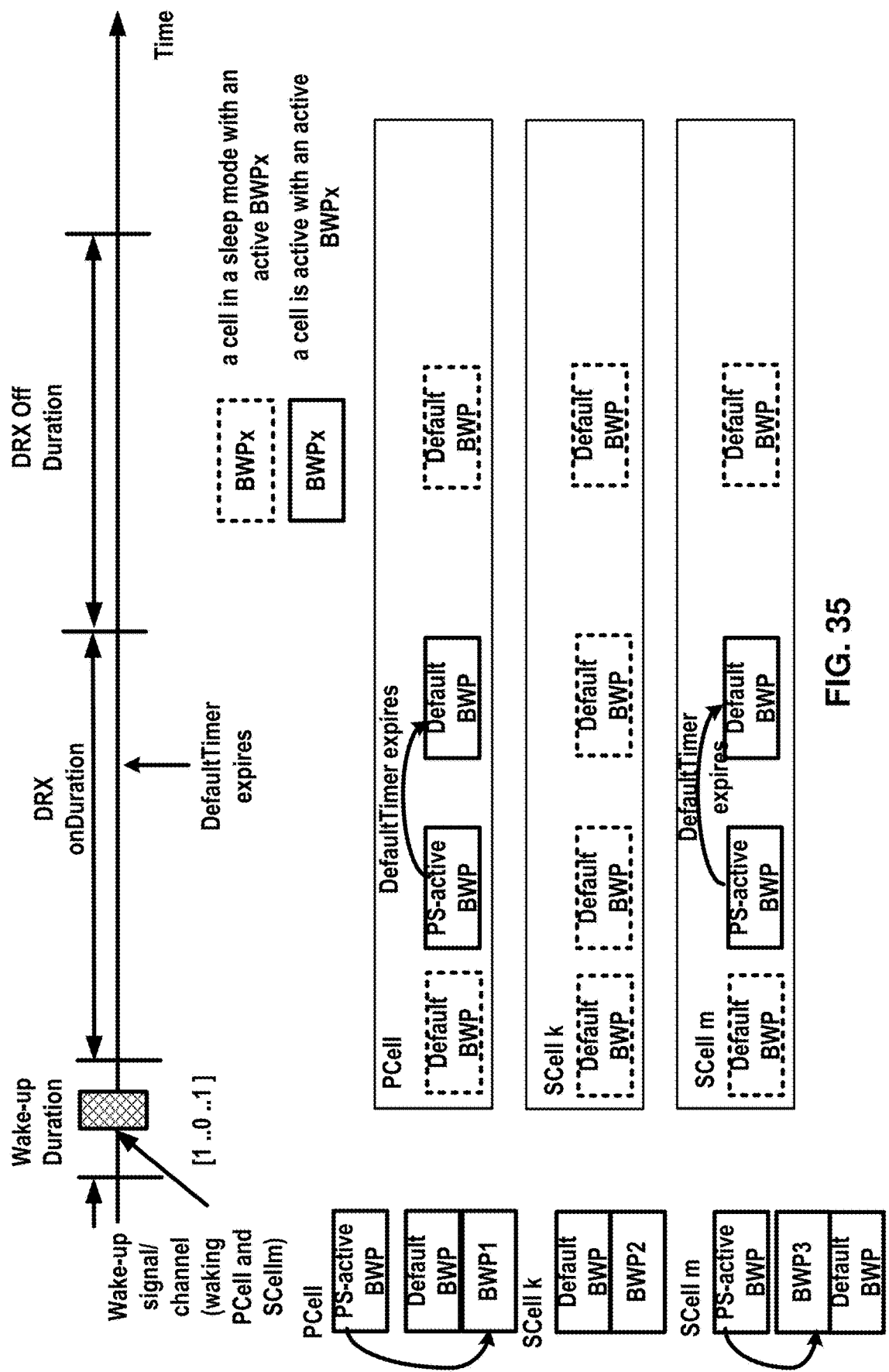
FIG. 35 shows an example embodiment with a wake-up signal.

FIG. 35 illustrates an example based on a wake-up signaling, wherein the signal may comprise a wake-up or go-to-sleep of each cell in a cell group. For example, the wake-up signal of [1 . . . 0 . . . 1] may correspond to PCell . . . SCell k . . . SCell m. The wireless device may wake-up a cell in response to the wake-up state indicated in the wake-up signal. In the example, the wireless device may switch to a PS-active BWP for the cell indicated as the wake-up cell. In the example, the wireless may switch to BWP1 for PCell and BWP3 for SCell m at DRX OnDuration as the BWP1 is configured as the PS-active BWP for the PCell and the BWP3 is configured as the PS-active BWP for the SCell m. The wireless device may switch to a default BWP of a cell as an active BWP of the cell based on an expiry of a bwp-inactivity Timer configured to the cell. In an example, a go-to-sleep indication for a cell may define a first power state, and a wake-up indication for the cell defines a second power state. The wireless device may switch to a PS-active BWP (e.g., activate the PS-active BWP as an active BWP) in response to receiving a wake-up indication for a cell, if the PS-active BWP is configured for the cell. The wireless device may switch to a dormant BWP (e.g., activate the dormant BWP as an active BWP) in response to receiving a go-to-sleep (or not receiving a wake-up indication) for a cell, if the dormant BWP is configured for the cell. The wireless device may switch to a PS-active BWP (if configured) for a cell in response to triggering/starting drx-inactivityTimer. In an example, a wireless device may stop bwp-InactivityTimer in a dormant BWP or in a dormant state to avoid a BWP switching to a default BWP.

In an example, a wireless device may switch to a dormant state of a cell in response to a go-to-sleep indication for the cell or not receiving a wake-up indication for the cell. In an example a dormant state for a cell is defined based on a current active DL or UL BWP or defined based on configuration parameter of a dormant BWP. A wireless device may stop monitoring on a DCI on a dormant state of a cell with keeping the current active DL or UL BWP. In an example, a wireless device may stop monitoring on a DCI with RNTIs for unicast downlink or uplink data, on a dormant state of a cell. The wireless device may continue monitoring on another DCI with RNTIs for non-unicast data or group-common DCIs. In an example, the wireless device may monitor search space sets carrying one or more DCIs with non-unicast RNTIs such as SI-RNTI, P-RNTI, SFI-RNTI, TPC-PUCCH-RNTI, or TCP-PUSCH-RNTI in a dormant state. In an example, a wireless may monitor one or more CORESETs and search space sets configured as beam-failure recovery CORESET in a dormant state or a first power state.

In an example, a wireless device may switch to a default BWP (if configured) in response to switching to a power saving state (e.g., a dormant state). The wireless device may switch to the default BWP and may skip monitoring on the configured search space sets and CORESETs of the default BWP on a first power state or in a dormant state. The wireless device may stay in the current active DL or UL BWP if a default BWP is not configured.

In an example, a wireless device may transition/switch from a first power state to a second power state, and vice versa based on one or more DCIs, one or more reference signals, one or more MAC-CEs, or one or more timers. The embodiments are applied for cases with one or more power states with any type of signaling indication to command a transition.

In an embodiment, a wireless device may perform, on a cell, beam management (e.g., L1-RSRP), radio link monitoring (RLM), radio resource management (RRM) and beam recovery procedure in any power-state except for DRX off state if the cell is activated and the measurement is configured to be performed (e.g., RLM on PCell or PSCell). The wireless device may receive a first set of RS configuration and a second set of RS configuration for a measurement in a BWP or in a cell. The wireless device may apply the first set of RSs in the first power state. The wireless device applies the second set of RSs in the second power state. The wireless may perform an average over measurement samples of a BWP or of a cell over different power states. The wireless device may apply a set of RS configurations in a current DL or UL BWP, when no additional configuration is given for a different power state or for a power saving state. The wireless device may use reference signals associated with TCI (transmission control indicator) of one or more configured control resource sets (CORESETs) for a current active BWP or for a cell, if no additional configuration of reference signals is provided for the BWP or for the cell.

Figure 36:
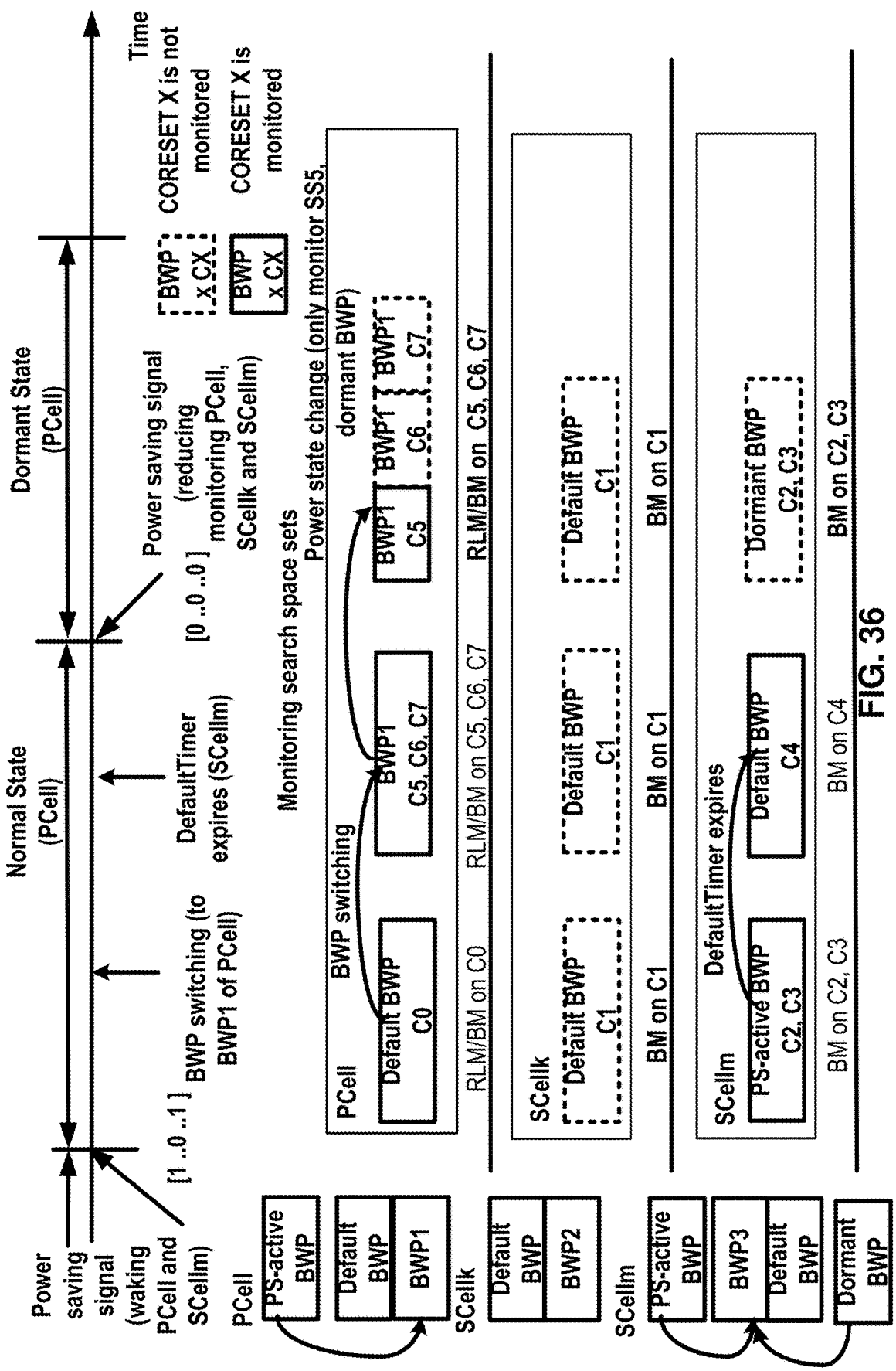
FIG. 36 shows an example embodiment for a measurement in a first power state.

During a duration with a power state (e.g., DRX OnDuration, a dormant state), a wireless device may continue a measurement based on TCI (transmission control indicator) of one or more configured control resource sets (CORESETs) for a BWP or for a cell, wherein additional configuration of reference signals is not available. The BWP for the cell may be a current active DL and/or UL BWP. FIG. 36 illustrates an example. The base station transmits a first command comprising a plurality of bits, wherein each bit indicates transition of a power state for a cell of a plurality of cells configured to the wireless device. For example, the first command comprises a bitmap of [1 . . . 0 . . . 1], wherein the bitmap corresponds to transition of a power state of PCell, . . . , SCellk, . . . , SCellm shown in FIG. 27. In the example, a bit value '1' corresponds to an indication to transition to a normal state of a corresponding cell. The bit value 'O' corresponds to an indication to transition to a dormant state of the corresponding cell. In the example, the first command indicates to transition PCell and SCellm to the normal state. The first command indicates to transition SCellk to the dormant state. PCell may be a primary cell or a secondary cell. SCellk may be a primary cell or a secondary cell. SCellm may be a primary cell or a secondary cell. In response to the first command, the wireless device activates the BWP1 (a PS-active BWP of the PCell) for the PCell. In response to the first command, the wireless device activates the BWP3 (a PS-active BWP of the SCellm) for the SCellm. The wireless device maintains the default BWP as there is no dormant BWP configured for the SCellk in response to receiving the first command indicating transition the SCellk to the dormant state.

The base station transmits a second command comprising a bitmap of [0 . . . 0 . . . 0] indicating transitioning the PCell, SCellk and SCellm to the dormant state. The wireless device maintains an active BWP of the PCell (BWP1) as no dormant BWP is configured for the PCell. The wireless device maintains an active BWP of the SCellk without dormant BWP being configured for SCellk. The wireless device activates/switches to a dormant BWP for the SCellm. In the example, the dormant BWP of the SCellm is configured to have a same bandwidth, numerology and frequency location to those of BWP3.

In the example, a wireless device receives one or more RRC messages comprising: for a PCell, BWP0 (default BWP) comprises CORESET #0 (C0) associated with CSI-RS #0 for TCI, and BWP1 comprises CORESET #5 (C5), CORESET #6 (C6), CORESET #7 (C7) associated with CSI-RS #5, #6 and #7 respectively; for a SCell k, BWP0 (default BWP) comprises CORESET #1 (C1), and BWP2 comprises CORESET #1 (C1); and for a SCell m, BWP0 (default BWP) comprises CORESET #4 (C4), BWP3 comprises CORESET #2 (C2) and CORESET #3 (C3), wherein each CORESET #x is associated with CSI-RS #x for the TCI state. The wireless device performs L1-RSRP and radio link failure as a default mode in response to no additional configuration of reference signals for RLM and BM. The wireless device monitors CSI-RS #5, CSI-RS #6 and CSI-RS #7 for RLM and/or BM measurement on PCell, wherein the wireless device is activated with BWP1. The wireless device may skip monitoring on CORESET #6 and #7 in response to a command to switch PCell power state to a dormant or a power saving. The wireless device may experience more beam failure or RLF, if it measures only the active CORESETs (i.e., CORESET #5). In an example, a wireless device is required to monitor all RSs associated with one or more configured CORESETs in the current active DL or UL BWP regardless of actual monitoring of CORESETs.

In an example, a wireless device may recommend switching to a normal state or a second power state in response to a case, wherein the measurement of RSs associated with CORESETs monitored in the first power state become below a certain threshold (e.g., become a poor quality), wherein the wireless device may operate in a default measurement based on TCIs of CORESETs. This operation may occur in a case when the wireless device may monitor at least one CORE-SET in the first dormant state.

In an example, a wireless may skip monitoring of reference signal(s) associated with one or more CORESETs (e.g., TCIs of CORESTs), wherein the wireless does not monitor the one or more CORESETs in a first power state or in a dormant state or in a current active power state, wherein the wireless device may perform L1-RSRP and/or RLM using one or more default configurations. The wireless device may switch to its power state from the first power state or the dormant state to a second power state or a normal state, in response to a failure indication (e.g., becoming a poor quality, lower than a threshold). The wireless device may inform the switching to the base station, or inform the failure status. In an example, the wireless device may recommend power state change in case of failure detection instead of autonomous switching.

In an example, a wireless device may be configured with a dormant BWP, wherein the dormant BWP may not be the default BWP. The wireless device may quickly provide measurements such as beam measurement, RLM measurements, or CSI feedbacks in response to a transition from a power saving state to a normal state, based on the wireless device being configured with a non-default BWP for the dormant BWP. For example, a wireless device may receive a DCI from CORESET #2 or CORESET #3 in response to a transition to a normal state. The wireless device is indicated with a dormant BWP with more CORESETs and larger bandwidth, to minimize the overhead or latency to switch to a normal state.

In an example, a wireless device may be configured with cross-carrier scheduling on a cell X, wherein the scheduling cell is Y. The wireless device may skip beam measurement or RLM on the cell X if cross-carrier scheduling is configured. In an example, a wireless may perform BM and/or RLM on the cell X if there are one or more reference signals configured to the cell X for the measurement. The wireless device may not perform BM and/or RLM on a cell if additional reference signal(s) is not configured.

In an example, a wireless device may receive a PS-active BWP, wherein the PS-active BWP may be different from a first-active BWP of a cell. The wireless device may apply the first-active BWP in response to receiving a command activating a cell. The wireless device may apply the PS-active BWP in response to a transition from a first power state to a second power state.

In existing technologies, a base station may transmit a command, via a DCI based on a new DCI format, indicating to transition one or more cells between a dormant and a non-dormant state. In an example, the new DCI format may employ a different RNTI than the UE specific C-RNTI. A wireless device may have one or more capabilities such as a number of supported DCI formats, the number of supported blind decodings, and/or the like. The wireless device may require additional capability or increase its processing capability (e.g., increase the number of supported blind decodings) to support the DCI. An enhanced mechanism for a DCI based power state transition mechanism without incurring additional UE capability is needed.

In an example, a base station may transmit a power saving (PS)-DCI indicating a power state transition for a first cell, wherein a size of a PS-DCI is same as a first DCI comprising a resource assignment for downlink or uplink data. In an example, the wireless device may use a same RNTI for a PS-DCI indicating a power state transition for the first cell and the first DCI comprising the resource assignment. For example, the PS-DCI and the first DCI may be based on a DCI format with a single DCI size. For example, the wireless device may differentiate the PS-DCI and the first DCI based on one or more DCI fields of the DCI. By utilizing a shared RNTI (e.g., a C-RNTI) between the PS-DCI and the first DCI (e.g., a scheduling DCI), embodiments increase a number of users supported by a base station or a cell with enhancements of power saving technologies. Using the same RNTI and DCI format for PS-DCI and scheduling DCI reduces UE processing requirements and battery power consumption.

For example, the wireless device may receive a DCI, comprising a frequency domain resource assignment, based on a DCI format 1_1, wherein the DCI format 1_1 is used to schedule a downlink data for a cell or is used as the PS-DCI. The wireless device may determine whether the DCI is for transitioning from a first power state to a second power state for the first cell or the DCI is for scheduling data for a second cell based on a value of the frequency domain resource assignment field. Based on the determining, the wireless device may transition from the first power state to the second power state in response to the determining the transitioning. For example, the wireless device determine the DCI is for the transitioning based on the value of frequency domain resource assignment is being set with a predefined value. Based on the determining, the wireless device may receive the data in response to the determining the scheduling.

This may allow that the wireless device may support dynamic power saving adaptation without additional capability (e.g., a number of supported blind decoding, a number of DCI sizes). This may allow that a base station to continue supporting a same number of users with or without adopting a power saving technique such as cell dormancy. The network may reduce additional overhead to transmit a power saving adaptation signal and utilize the common framework between scheduling and power saving adaptation.

In an example, a wireless device may receive a PS-DCI indicating a transition of a power state, for example, from a first power state (e.g., a dormant state, a power saving state, PS1) to a second power state (e.g., a non-dormant state, a normal state, PS2, a non-dormant state). The wireless device may receive RRC messages comprising a set of parameters for the first and second power state, wherein parameters may include the list of time-domain resource allocation, a set of search spaces, and/or a set of CORESETs. In an example, a DCI size of a PS-DCI is same as a DCI size of one of DCI format(s) configured to the wireless device to monitor a DCI comprising a resource assignment. For example, a PS-DCI indicating a transition to a dormant state may not carry a resource assignment. The base station may prefix one or more DCI fields of a DCI comprising a resource assignment to indicate a PS-DCI. The wireless device may interpret a DCI as a PS-DCI in response to detecting the one or more DCI fields of a DCI with prefixed values. In an example, one or more DCI formats used for scheduling a downlink data may be used for a PS-DCI. FIG. 37 illustrates an example of prefixed values of a few DCI fields of DCI formats. For example, if a DCI format 1_0 is used, HARQ process number, RV, CS, and/or frequency domain RA may be set to prefixed values. One or more fields from listed DCI fields in FIG. 36 may be used to differentiate between the PS-DCI and a scheduling DCI. One example of such fields is shown in FIG. 37. A DCI format 1_1 (i.e., non-fallback DCI) may be used for a PS-DCI by setting a few fields with prefixed values. For example, a HARQ process number field is set as with 1 value in each bit, a redundancy version field is set to '11', and a MCS field is set to '0 . . . 0'. Other constant values may be used instead for each field.

In an example, a frequency resource allocation field is set to '1 . . . 1' when RIV type of resource allocation (e.g., a resource allocation type 1, a compact resource allocation) is used as '1 . . . 1' may not refer a valid resource allocation entry. In case, a bitmap may be used (e.g., a resource allocation type 0, a bitmap based resource allocation), '0 . . . 0' is used which may indicate an invalid entry. In an example, a wireless device may receive a DCI based on a DCI format 1_1 (e.g., a non-fallback DCI) wherein the DCI is CRC scrambled with a C-RNTI (cell radio network temporary identifier). The DCI may comprise a frequency domain resource assignment field. The wireless device may determine, based on a value of the frequency domain resource assignment field, whether the DCI is for transitioning from a first power state to a second power state (or vice versa) for a first cell or the DCI is for scheduling data for a second cell. The wireless device may determine the DCI is for transitioning based on the value of the frequency domain resource assignment field being set to a predefined value.

For example, when a resource allocation type 1 or a compact resource allocation type or a RIV (resource indicator value) resource allocation type is configured to the second cell, the wireless device may consider '1 . . . 1' as the predefined value (as '1 . . . 1' is an invalid entry for the resource allocation type 1). In the example, the wireless device may determine the DCI is for the transitioning based on the value of the frequency domain resource assignment being set to '1 . . . 1'. For example, when a resource allocation type 0 or a bitmap based allocation type or resource block group (RBG) based resource allocation type is configured to the second cell, the wireless device may consider '0 . . . 0' as the predefined value (as '0 . . . 0' is an invalid entry for the resource allocation type 0). In the example, the wireless device may determine the DCI is for the transitioning based on the value of the frequency domain resource assignment being set to '0 . . . 0'. For example, when a resource allocation type 1 or 0 is configured with a dynamic indication via the DCI format 1_1, the wireless device may consider '0 . . . 0' as the predefined value. In the example, the wireless device may determine the DCI is for the transitioning based on the value of the frequency domain resource assignment being set to '0 . . . 0'.

The wireless device may determine the DCI is for the scheduling based on the value of frequency domain resource assignment being different from the predefined value. For example, with the resource allocation type 1, when the value is not '1 . . . 1', the wireless device may determine the DCI is for the scheduling. For example, with the resource allocation type 0, when the value is not '0 . . . 0', the wireless device may determine the DCI is for the scheduling. For example, when the resource allocation type 0 or 1 with a dynamic indication, when the value is not '0 . . . 0', the wireless device may determine the DCI is for the scheduling.

Based on the determining, the wireless device may transition from the first power state to the second power state for the first cell in response to the determining the DCI is for the transitioning. The wireless device may receive the data based on the DCI in response to the determining the DCI is for the scheduling.

In an example, the first cell may be same as the second cell. In an example, the first cell is different from the second cell. For example, the second cell may be a primary cell, a special primary cell or a PUCCH cell. For example, the base station may transmit the DCI via the second cell. For example, the first cell may be a secondary cell.

In an example, a PS-DCI may comprise a time-domain resource allocation information, wherein the time-domain resource allocation may define a time of a power state duration. The wireless device may apply parameters or behaviors associated with the indicated power state for the indicated time duration. For example, a wireless device may apply a dormant state in response to receiving a PS-DCI with keeping the measurements such as CSI, RLM, L1-RSRP, RRM, and/or the like. In the example, time-domain resource allocation entries referred by a PS-DCI may be different from time-domain resource allocation entries used for a DCI comprising a resource assignment. For example, to indicate a time duration of a power saving state, one or more time-domain entries for a PS-DCI may consist of 10 msec, 20 msec, 40 msec, 100 msec, and/or the like. Other values are not precluded. A PS-DCI may contain more number of bits to carry a time-domain resource allocation compared to a scheduling DCI.

In an example, a wireless device may transmit a HARQ-ACK in response to a PS-DCI. In the example, a PS-DCI may carry an information of HARQ-ACK time and/or frequency resource. For example, the PS-DCI may comprise one or more DCI fields of HARQ-ACK time and/or frequency resource (e.g., PDSCH-to-HARQ_feedback timing indicator for the time resource, PUCCH resource indicator for the frequency resource). The wireless device may apply the indicated HARQ-ACK time after receiving the PS-DCI.

In an example, a wireless device may use a same RNTI (e.g., C-RNTI) on a PS-DCI as a RNTI used for a scheduling DCI comprising a resource assignment for a unicast data. The PS-DCI may be CRC scrambled with C-RNTI. The wireless device may receive a scheduling DCI, based on a DCI format used for the PS-DCI and a DCI size of the PS-DCI, with CRC scrambled by the C-RNTI. Other RNTI such as MCS-C-RNTI may be used. The network may configure to enable a PS-DCI functionality to a wireless device. A wireless device may not assume a set of DCI fields with prefixed values as a PS-DCI until the base station may configure the function. In an example, a base station may configure a list of one or more DCI fields that are used for differentiating a PS-DCI and a scheduling DCI. In an example, the wireless device may receive a DCI comprising a frequency domain resource allocation field. The wireless device may determine whether the DCI is for transitioning a power state of one or more first cells or the DCI is for scheduling of a second cell. The wireless device may consider one or more first DCI fields for interpreting the DCI in response to the determining the DCI is for the transitioning. The wireless device may consider one or more second DCI fields for interpreting the DCI in response to the determining the DCI is for the scheduling. For example, the one or more second DCI fields may comprise modulation and coding scheme, new data indicator and/or redundancy version. For example, the one or more first DCI fields may comprise one or more bits to indicate a power state of the one or more first cells.

In an example, a DCI format for a PS-DCI may be different from a scheduling DCI. A new DCI format may be configured to one or more search space to enable a wireless device receiving a PS-DCI.

In an example, a wireless device may use a second RNTI on a PS-DCI and use a first RNTI on a scheduling DCI comprising a resource assignment. In an example, DCI format 2_0 and mechanism of transmitting a slot format indicator may be used for a PS-DCI format. For example, a slot format may be carried on a PS-DCI where one or more entries from the configured set of slot formats may be reused. For example, a wireless device may receive a first SFI DCI and a second SFI DCI. The wireless device may receive the first DCI based on SFI-RNTI, and the second SFI DCI based on a PS-DCI. The wireless device may override slot format information based on the first SFI DCI in response to receiving the second SFI. The second RNTI may be different from SFI-RNTI. The PS-DCI may carry a set of SFI information for one or more slots. The wireless device may apply a dormant state on one or more slots where the PS-DCI indicates unknown slot or uplink slot.

In an example, one or more DCI fields with prefixed values to differentiate a PS-DCI from a scheduling DCI may comprise any DCI field from a scheduling DCI. Other set of DCI fields may be used, though examples are not listed.

Figure 38:
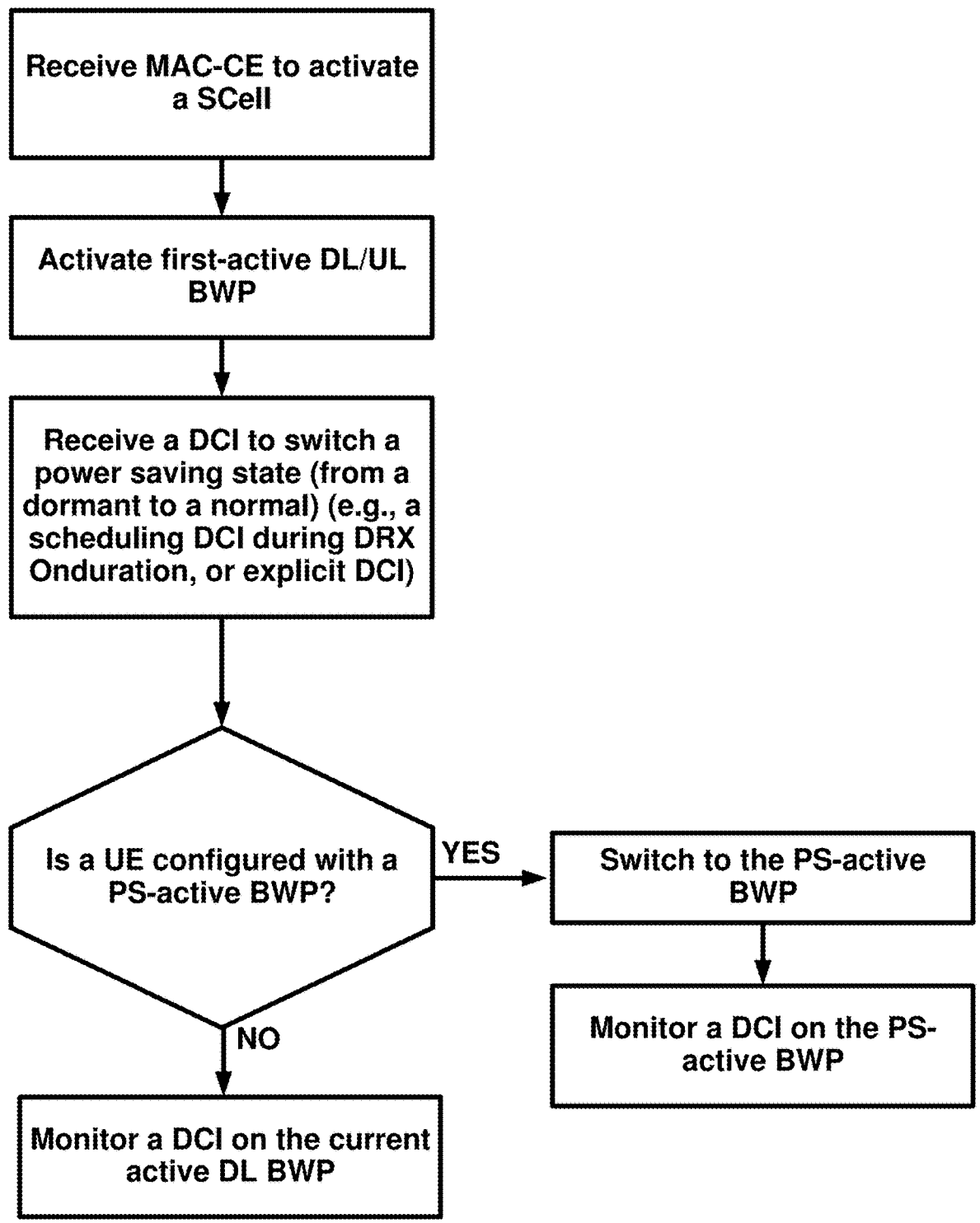
FIG. 38 shows a flow chart of an example embodiment.

FIG. 38 illustrates a diagram of switching to a PS-active BWP in response to a command indicating transition from a first power state (e.g., a dormant state, a power saving state, PS1, DRX off state) to a second power state (e.g., a non-dormant state, a non-power saving state, PS2, DRX active state). In an example, a wireless device may receive one or more first radio resource control (RRC) messages for a secondary cell. The one or more first RRC messages may comprise configuration parameters of a plurality of BWP indices, wherein each BWP index of the plurality of BWP indicis corresponds to a downlink BWP of a plurality of downlink BWPs of the secondary cell. In an example, the wireless device may receive one or more second RRC messages comprising a first configuration parameter of a first BWP index, from the plurality of BWP indices, indicating the first downlink BWP for activation of the secondary cell. For example, the first downlink BWP is a first active downlink BWP of a secondary cell (SCell). For example, the base station may indicate a bwp-Id of one of the plurality of downlink BWPs as the first active DL BWP of the secondary cell. For example, the bwp-Id (e.g., firstActiveDownlinkBWP-Id) may be configured in configuration parameters of a serving cell configuration (e.g., ServingCellConfig) of the secondary cell. The wireless device may activate the first active DL BWP indicated by the bwp-Id of the serving cell configuration in response to activating the secondary cell. For example, the bwp-Id may be in a range of [0-3].

In an example, the wireless device may receive one or more MAC CEs comprising indications to activate the secondary cell. In response to the one or more MAC CEs, the wireless device may activate the first active DL BWP (and a first UL BWP if configured) based on the configuration parameters of the secondary cell.

In an example, the wireless device may further receive one or more third RRC messages comprising a second configuration parameter of a second BWP index, from the plurality of BWP indices, indicating the second downlink BWP for transitioning from the dormant state to the non-dormant state of the secondary cell. The second downlink BWP is a PS-active BWP of the secondary cell.

In an example, the wireless device may further the one or more third RRC messages comprising a third configuration parameter of a dormant BWP index, from the plurality of BWP indices, indicating a dormant BWP for transitioning from the non-dormant state to the dormant state of the secondary cell. In an example, the second downlink BWP is different form the dormant BWP. In an example, the wireless device may activate the dormant BWP of the secondary cell as the active downlink BWP in response to the transitioning the secondary cell from the non-dormant state to the dormant state. In an example, the secondary cell is in the dormant state in response to the dormant BWP being the active downlink BWP of the secondary cell. In an example, the wireless device may further stop monitoring for a DCI comprising a resource assignment for the secondary cell in response to the secondary cell being in the dormant state. In an example, the dormant BWP of the secondary cell is not configured with a search space.

The wireless device may determine a power state of the secondary cell in response to the activation of the secondary cell based on the first active DL BWP. For example, when the first active DL BWP is a dormant BWP of the secondary cell, the wireless device may consider that the secondary cell is activated in the first power state (e.g., the dormant state). For example, the first active DL BWP is different from the dormant BWP, the wireless device may consider that the secondary cell is activated in the second power state (e.g., the normal state).

The wireless device may receive a command indicating transition the secondary cell from the normal state, when the secondary cell is in the normal state to the dormant state. For example, the command may be transmitted via one or more MAC CEs, one or more DCIs, and/or one or more RRC signaling. For example, the command may be determined based on one or more MAC timers and/or one or more DRX timers/configurations. The wireless device may transition the secondary cell to the dormant state based on the command.

The wireless device may receive a second command via a DCI indicating transitioning from a dormant state to a normal state of the secondary cell, wherein the secondary cell is in the dormant state. In an example, the wireless device may determine a cell is in the dormant state, when an active downlink BWP of the cell is a dormant BWP configured to the cell. In an example, the wireless device may determine the cell is in the non-dormant or the normal state when the active downlink BWP of the cell is different from the dormant BWP or the wireless device is not configured with the dormant BWP for the cell. In an example, the second command indicating transition of the secondary cell to the normal state from the dormant state via one or more MAC CEs, one or more DCIs, and/or one or more RRC signaling. The second command may be given to the wireless device based on one or more MAC timers and/or one or more DRX timers/configurations.

In an example, the second downlink BWP is the same as the first downlink BWP. In an example, the second downlink BWP is different from the first downlink BWP.

In an example, the wireless device may further monitor a first DCI for the first downlink bandwidth part in response to activating the first downlink bandwidth part. In an example, the wireless device may further monitor a second DCI for the second bandwidth part in response to activating the second downlink bandwidth part. In an example, the wireless device may further receive a downlink transport block on the second bandwidth part in response to receiving the second DCI.

In an example, the wireless device may further stop a bwp-Inactivity Timer of the secondary cell in response to transitioning the secondary cell to the dormant state In response to the DCI, the wireless device may determine whether the secondary cell is configured with a PS-active BWP (e.g., a second downlink BWP). When the PS-active BWP is configured, the wireless device may activate the PS-active BWP as an active downlink BWP. When the secondary cell is not configured with the PS-active BWP, the wireless device may maintain an active (e.g., a current active DL BWP) as the active BWP in response to the second command (e.g., via the DCI or the first DRX timer) indicating the transitioning to the normal state. The wireless device may monitor a scheduling DCI on an active DL BWP of the secondary cell, at least when the active DL BWP is different from the dormant BWP of the secondary cell or when the wireless device is not configured with the dormant BWP.

Figure 39:
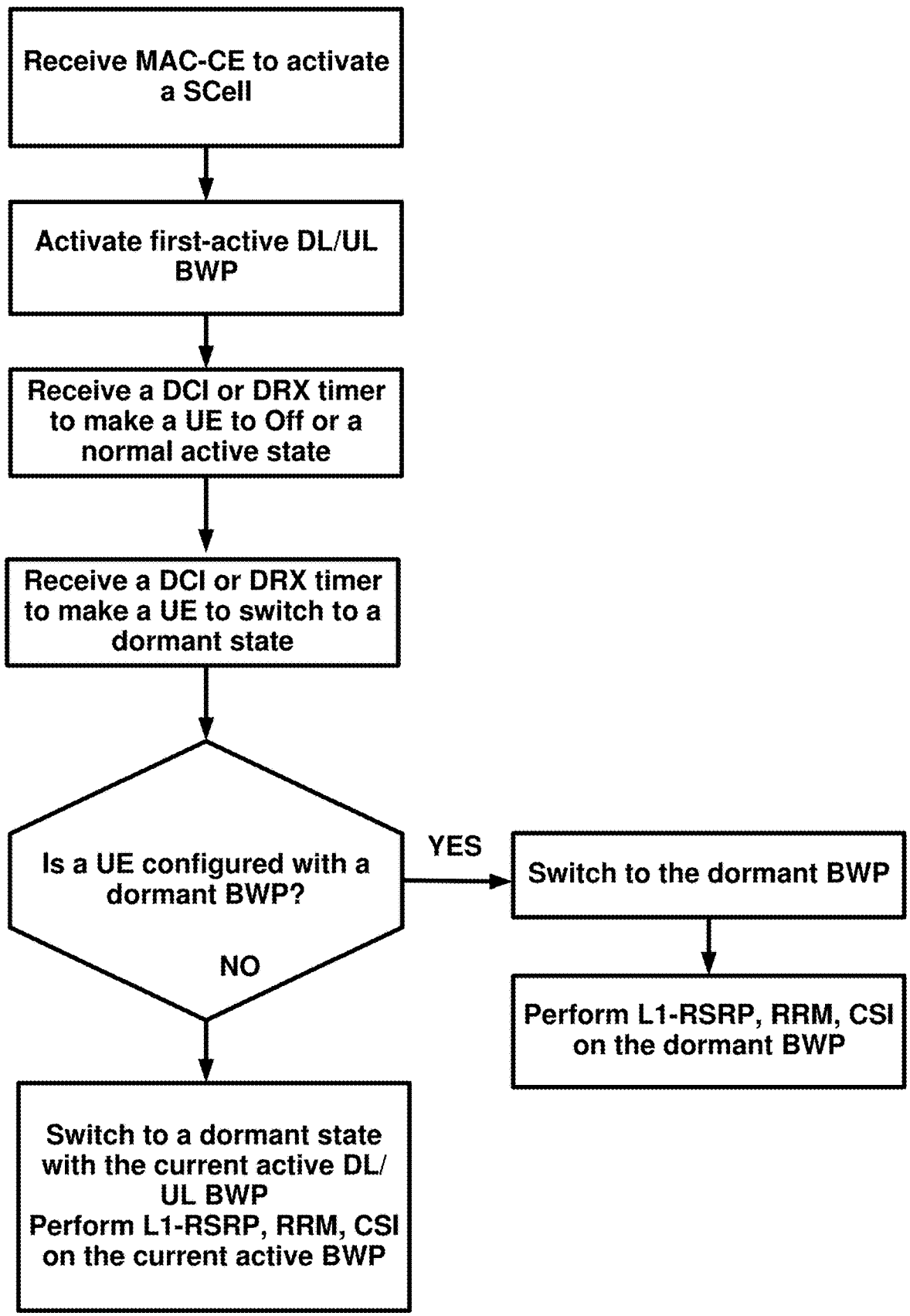
FIG. 39 shows a flow chart of an example embodiment.

FIG. 39 illustrates a diagram of switching to a dormant in response to a command indicating transition to the first power state from an OFF state or the second power state. In an example, a wireless device may receive one or more MAC CEs comprising indications to activate a secondary cell. In response to the one or more MAC CEs, the wireless device may activate a first active DL BWP and a first UL BWP if configured for the secondary cell. The wireless device may receive a first DCI or an expiry/start of a first DRX timer indicating transitioning from a dormant state to a normal state for the secondary cell. In response to the first DCI or the first DRX timer, the wireless device may transition the secondary cell to the normal state. The wireless device may receive a second DCI or an expiry/start of a second DRX timer indicating transitioning from the normal state to the dormant state for the secondary cell. In response to the second DCI or the second DRX timer, the wireless device may determine whether the wireless device is configured with a dormant BWP or not. When the dormant BWP is configured, the wireless device may activate/switch to the dormant BWP as an active BWP. The wireless device may perform measurements such as L1-RSRP, RRM, CSI on the dormant BWP. When the secondary cell is not configured with the dormant BWP, the wireless device may maintain an active (e.g., a current active DL BWP) as the active BWP in response to the second DCI or the second DRX timer indicating the transitioning to the dormant state. The wireless device may perform the measurements on the active BWP.

A wireless device may receive one or more radio resource control messages comprising configuration parameters of a cell, wherein the configuration parameters indicate a first bandwidth part is configured as a first active bandwidth part of the cell, and a second bandwidth part is configured as a second active bandwidth part of the cell. The wireless may activate the first bandwidth part in response to receiving a first command indicating activation of the cell from a deactivated state. The wireless device may monitor a first downlink control channel for the first bandwidth part in response to activating the first bandwidth part. The wireless device may transit to a second power state of the cell from the first power state in response to receiving a second command to switch the cell from the second state to the first power state. The wireless device may activate the second bandwidth part in response to the second command and may monitor a second DCI for the second bandwidth part in responding to activating and may receive a DCI on the second bandwidth part in response to receiving a DCI.

The wireless may receive the second command, indicating transitioning of the power state, based on PDCCH(s), MAC-CE(s), RRC message(s) or timer(s) such as DRX timer, or BWP inactivity timer, or a new timer.

A wireless device switches to the first power state in response to drx-onDurationTimer. The wireless device may switch from the first power state to the second power state during drx-onDurationTimer, in response to receiving a downlink control information, on a cell in a same cell group, comprising a resource assignment of a cell, or in response to transmitting to a cell, in the same cell group, an uplink data, SR, PRACH, or SRS. A cell group may be a master cell group, a secondary cell group, a PUCCH SCell group or a set of cells configured by RRC message(s).

A wireless device may receive a configuration to indicate with a first dormant bandwidth part, wherein the wireless device switches to the first dormant BWP in response to a switching of a power transition from the second power state to the first power state.

The first dormant BWP may be a default BWP of a cell.

The wireless device may continue monitoring a DCI on the first dormant BWP at least with SFI-RNTI, INT-RNTI, SI-RNTI, P-RNTI, TPC-PUCCH-RNTI, or TPC-PUSCH-RNTI in the first bandwidth part.

In an example, a wireless may monitor a CORESET configured as beam-failure recovery CORESET in a dormant state or a first power state.

The wireless device may continue performing beam management measurement (BM, or L1-RSRP) using the reference signals associated with one or more control resource sets configured to the first dormant bandwidth part, wherein the wireless device is not provided with additional reference signals for BM or L1-RSRP The wireless device may continue performing radio link monitoring (RLM) using the reference signals associated with one or more control resource sets configured to the first dormant bandwidth part, wherein the wireless device is not provided with additional reference signals for RLM.

A wireless device may receive a command of power state transition, a PS-DCI, wherein the PS-DCI has the same DCI size to one or more of DCIs comprising a resource assignment for a downlink or uplink data.

The wireless device may differentiate a PS-DCI and a DCI comprising a resource assignment for downlink or uplink transmission based on a set of prefixed DCI fields with prefixed values.

A wireless device may receive a PS-DCI, wherein the PS-DCI is a DCI indicating a power state change and the PS-DCI has the same size to one of DCIs comprising a resource assignment configured to a wireless device for a cell.

The wireless device may differentiate a PS-DCI and a DCI comprising a resource assignment, based on a few DCI fields and a set of values on the few DCI fields.

A wireless device may receive one or more radio resource control messages. The one or more radio resource control messages may comprise configuration parameters of a cell, indicating a first bandwidth part being configured to the cell. In response to receiving a first command indicating transitioning of the cell from a second power state (e.g., a normal state, non-power saving state) to a first power state (e.g., a power saving state, a dormant state), the wireless device may transition to the first power state for the cell and may activate the first bandwidth part configured for the cell. The wireless device may perform one or more measurements on the first bandwidth part of the cell in response to the first command.

A wireless device may receive one or more radio control messages for a cell. The one or more radio resource control messages may comprise configuration parameters of one or more bandwidth parts for the cell. The wireless device may receive a first command indicating transitioning of the cell from a second power state (e.g., a normal state) to a first power state (e.g., a dormant state or power saving state) for the cell. In response to the first command, the wireless device may transition to the first power state while maintain a current active DL BWP as active and a current active UL BWP as active for the cell. The wireless device may perform one or more measurements based on one or more CORESETs configured to the current active DL BWP of the cell. For example, for a RLM measurement, if a default operation is configured, the wireless device may perform RLM on one more TCI-associated reference signals to the one or more CORESETs of the current active DL BWP of the cell.

A wireless device may receive one or more radio resource control messages indicating that the wireless may be enabled for a dynamic power state transition based on a DCI (e.g., a PS-DCI, power state transition DCI) for a first cell. A PS-DCI may carry one or more power states for one or more cells, where at most one power state may be indicated for a cell. The wireless may receive a first PS-DCI and a second scheduling DCI comprising a resource assignment on the first cell on same one or more search space sets of a current active DL BWP of the first cell. The first PS-DCI and the second scheduling DCI may have the same DCI size and the same DCI format. The wireless device may differentiate the first DCI and the second scheduling DCI based on one or more DCI fields where a DCI field of the one or more DCI fields is filled with a prefixed value or a prefixed code point. The wireless device may determine a DCI as a PS-DCI if the one or more DCI fields of the DCI are filled with one or more prefixed code points. The wireless device may apply the indicated power state in the PS-DCI for the cell in response to receiving the PS-DCI.

In an example, a wireless device may receive configuration parameters indicating a first downlink bandwidth part (BWP) for activation of a secondary cell. The configuration parameters may further indicate a second downlink BWP for transitioning from a dormant state to a non-dormant state of the secondary cell. The wireless device may activate the first downlink BWP in response to receiving a medium access control activation command indicating activation of the secondary cell. The wireless device may receive a command indicating transition the secondary cell to the dormant state. The wireless device may transition to the dormant state based on one or more MAC timers and/or one or more DRX configuration parameters. The wireless device may receive a downlink control information, DCI, comprising a field indicating transitioning the secondary cell from the dormant state to the non-dormant state. The wireless device may activate the second downlink BWP as an active BWP in response to transitioning the secondary cell to the non-dormant state.

In an example, the wireless device may further receive one or more first radio resource control (RRC) messages for the secondary cell. The one or more first RRC messages may comprise configuration parameters of a plurality of BWP indices, wherein each BWP index of the plurality of BWP indicis corresponds to a downlink BWP of a plurality of downlink BWPs of the secondary cell.

In an example, the wireless device may further receive one or more second RRC messages comprising a first configuration parameter of a first BWP index, from the plurality of BWP indices, indicating the first downlink BWP for activation of the secondary cell.

In an example, the wireless device may further receive one or more third RRC messages comprising a second configuration parameter of a second BWP index, from the plurality of BWP indices, indicating the second downlink BWP for transitioning from the dormant state to the non-dormant state of the secondary cell.

In an example, the wireless device may further the one or more third RRC messages comprising a third configuration parameter of a dormant BWP index, from the plurality of BWP indices, indicating a dormant BWP for transitioning from the non-dormant state to the dormant state of the secondary cell.

In an example, the second downlink BWP is different form the dormant BWP.

In an example, the wireless device may further activate the dormant BWP of the secondary cell as the active downlink BWP in response to the transitioning the secondary cell from the non-dormant state to the dormant state.

In an example, the secondary cell is in the dormant state in response to the dormant BWP being the active downlink BWP of the secondary cell.

In an example, the wireless device may further stop monitoring for a DCI comprising a resource assignment for the secondary cell in response to the secondary cell being in the dormant state.

In an example, the dormant BWP of the secondary cell is not configured with a search space.

In an example, the first downlink BWP is a first active downlink BWP of the secondary cell.

In an example, the second downlink BWP is the same as the first downlink BWP.

In an example, the second downlink BWP is different from the first downlink BWP.

In an example, the wireless device may further monitor a first DCI for the first downlink bandwidth part in response to activating the first downlink bandwidth part.

In an example, the wireless device may further monitor a second DCI for the second bandwidth part in response to activating the second downlink bandwidth part.

In an example, the wireless device may further receive a downlink transport block on the second bandwidth part in response to receiving the second DCI.

In an example, the wireless device may further stop a bwp-Inactivity Timer of the secondary cell in response to transitioning the secondary cell to the dormant state.

In an example, the wireless device may further receive a second command, indicating transitioning from the non-dormant state to the dormant state of the secondary cell, wherein the second command is indicated via downlink control informations, medium access control control elements, RRC signaling, or discontinuous reception configuration/timers In an example, a wireless device may receive configuration parameters indicating a first bandwidth part (BWP) for activation of a cell. The configuration parameters may further indicate a second downlink BWP for transitioning from a dormant state to a non-dormant state of the cell. The wireless device may activate the first BWP as an active BWP in response to activation of the cell. The wireless device may activate the second BWP as the active BWP in response to transitioning the cell from a dormant state to the non-dormant state.

In an example, the first BWP is a first downlink BWP of the cell.

In an example, the second BWP is a second downlink BWP of the cell.

In an example, the active BWP is an active downlink BWP of the cell.

In an example, the downlink control information comprises a field indicating transitioning the cell from the dormant state to the non-dormant state.

In an example, the wireless device may further receive one or more first radio resource control, RRC, messages, for the cell, comprising configuration parameters of a plurality of BWP indices, wherein each BWP index of the plurality of BWP indicis corresponds to a downlink BWP of a plurality of downlink BWPs of the cell.

In an example, the wireless device may further receive one or more second RRC messages comprising a first configuration parameter of a first BWP index, from the plurality of BWP indices, indicating the first downlink BWP for activation of the cell.

In an example, the wireless device may further receive one or more third RRC messages comprising a second configuration parameter of a second BWP index, from the plurality of BWP indices, indicating the second downlink BWP for transitioning from the dormant state to the non-dormant state of the cell.

In an example, the wireless device may further the one or more third RRC messages comprising a third configuration parameter of a dormant BWP index, from the plurality of BWP indices, indicating a dormant BWP for transitioning from the non-dormant state to the dormant state of the cell.

In an example, the second downlink BWP is different form the dormant BWP.

In an example, the wireless device may further activate the dormant BWP of the cell as the active downlink BWP in response to the transitioning the cell from the non-dormant state to the dormant state.

In an example, the cell is in the dormant state in response to the dormant BWP being the active downlink BWP of the cell.

In an example, the wireless device may further stop monitoring for a downlink control information comprising a resource assignment for the cell in response to the cell being in the dormant state.

In an example, the dormant BWP of the cell is not configured with a search space.

In an example, the first downlink BWP is a first active downlink BWP of the cell.

In an example, the second downlink BWP is the same as the first downlink BWP.

In an example, the second downlink BWP is different from the first downlink BWP.

In an example, the wireless device may further monitor a first downlink control information for the first downlink bandwidth part in response to activating the first downlink bandwidth part.

In an example, the wireless device may further monitor a second downlink control information for the second bandwidth part in response to activating the second downlink bandwidth part.

In an example, the wireless device may further receive a downlink transport block on the second bandwidth part in response to receiving the second downlink control information.

In an example, the wireless device may further receive a second command, indicating transitioning from the non-dormant state to the dormant state, wherein the second command is indicated via downlink control information medium access control control elements, RRC signaling, or discontinuous reception configuration/timers.

In an example, the wireless device may further stop a bwp-Inactivity Timer of the cell in response to transitioning the cell to the dormant state.

In an example, the wireless device may further receive a downlink control information comprising a field indicating the transition the cell from the dormant state to the non-dormant state In an example, a wireless device may receive configuration parameters indicating a non-dormant BWP for transitioning to a non-dormant state of the cell. The wireless device may activate a first BWP as an active BWP in response to activation of the cell. The wireless device may activate the non-dormant BWP as the active BWP in response to transitioning the cell from a dormant state to the non-dormant state.

In an example, a wireless device may receive a downlink control information (DCI) associated with a cell radio network temporary identifier (C-RNTI), wherein the DCI comprises a frequency domain resource assignment field. The wireless device may determine, based on a value of the frequency domain resource assignment field, whether the DCI is for transitioning from a first power saving state to a second power saving state for a cell or is for scheduling data. The wireless device may transition from the first power saving state to the second power saving state for the cell in response to determining that the DCI is for the transitioning. The wireless device may receive the data based on the DCI in response to determining that the DCI is for the scheduling.

In an example, the first the first power saving state is a dormant state.

In an example, the first power saving state is a discontinuous reception off state.

In an example, the second power saving state is a non-dormant state or a normal state.

In an example, the second power state is a discontinuous reception active state.

In an example, the DCI is transmitted based on a DCI format 1_1 with a cyclic redundancy check scrambled by the C-RNTI.

In an example, a size of the DCI is determined regardless of the value of the frequency domain resource assignment field.

In an example, the DCI comprises a field indicating transitioning between the first power saving state and the second power saving state of one or more cells comprising the cell.

In an example, the wireless device may further determine the DCI is for the transitioning based on the value of the frequency domain resource assignment being set to a predefined value.

In an example, the wireless device may further determine determining the DCI is for the scheduling based on the frequency domain resource assignment being different from a predefined value.

In an example, the predefined value is a bit string of all ones, wherein each bit of the frequency domain resource assignment field is 1 in response to being configured with resource allocation type 0 as a resource allocation type.

In an example, the resource allocation type 0 is based on a resource indicator value.

In an example, the predefined value is a bit string of all zeros, wherein each bit of the frequency domain resource assignment field is 0 in response to being configured with resource allocation type 1 as a resource allocation type.

In an example, the resource allocation type 1 is based on a bitmap indication, wherein a bit of the bitmap corresponds to a resource block group of a plurality of resource blocks.

In an example, the wireless device may further transmit a hybrid automatic repeat request acknowledgement feedback corresponding to the DCI.

In an example, the wireless device may further receive the DCI indicating a resource for the hybrid automatic repeat request acknowledgement feedback In an example, a wireless device may receive a downlink control information (DCI) associated with a cell radio network temporary identifier (C-RNTI), wherein the DCI comprises a frequency domain resource assignment field. Based on the frequency domain resource allocation field, the wireless device may transition from the a first power saving state to a second power saving state or receive data based on the DCI.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving at least one radio resource control (RRC) message,
      wherein the at least one RRC comprises configuration parameters,
      wherein the configuration parameters indicate a dormant bandwidth part (BWP) and a non-dormant bandwidth part;
   activating the dormant BWP as an active BWP in response to a medium access control command indicating activation of the cell;
   activating the non-dormant BWP as the active BWP in response to receiving downlink control information (DCI) indicating a transition to an increased power level; and
   activating the dormant BWP as the active BWP to place the cell in a dormant state in response to receiving downlink control information (DCI) indicating a transition to a decreased power level.

2. The method of claim 1, wherein the cell, in the dormant state, stops monitoring for a downlink control information comprising a resource assignment for the cell.

3. The method of claim 1, further comprising stopping monitoring for a downlink control information comprising a resource assignment for the cell, in response to the cell being in the dormant state.

4. The method of claim 1, further comprising:
   receiving a downlink control information comprising a field indicating to transition the cell from the dormant state to the non-dormant state; and
   wherein the configuration parameters comprise a dormant BWP index, from a plurality of BWP indices, indicating a transition of the cell from the non-dormant state to the dormant state.

5. The method of claim 1, wherein
   the dormant BWP is a first downlink BWP of the cell; and
   the non-dormant BWP is a second downlink BWP of the cell.

6. The method of claim 1, wherein the configuration parameters for the non-dormant BWP comprise a second BWP index, from a plurality of BWP indices, indicating a transition of the cell from the dormant state to the non-dormant state of the cell.

7. The method of claim 6, wherein the configuration parameters for the dormant BWP comprise a dormant BWP index, from the plurality of BWP indices, indicating a transition of the cell from the non-dormant state to the dormant state.

8. The method of claim 7, wherein the dormant BWP of the cell is not configured with a search space.

9. A computer program stored on a non-transitory computer-readable storage medium, wherein the computer program, when executed by a processor, performs the method as claimed in claim 1.

10. A wireless device comprising a processor circuit and memory storing instructions that, when executed by the processor, cause the wireless device to perform the method of the claim 1.

11. A method comprising:
    transmitting at least one radio resource control (RRC) message, wherein the at least one RRC message comprises configuration parameters indicating a dormant bandwidth part (BWP) and a non-dormant bandwidth part;
    activating the dormant BWP as an active BWP in response to a medium access control command indicating activation of the cell;
    activating the non-dormant BWP as the active BWP in response to receiving downlink control information (DCI) indicating a transition to an increased power level; and
    activating the dormant BWP as the active BWP to place the cell in a dormant state in response to receiving downlink control information (DCI) indicating a transition to a decreased power level.

12. The method of claim 11, wherein the cell, in the dormant state, stops monitoring for a downlink control information comprising a resource assignment for the cell.

13. The method of claim 11, further comprising stopping monitoring for a downlink control information comprising a resource assignment for the cell, in response to the cell being in the dormant state.

14. The method of claim 11, further comprising:
    transmitting a downlink control information comprising a field indicating to transition the cell from the dormant state to the non-dormant state;

wherein the configuration parameters for the dormant BWP comprise a dormant BWP index, from a plurality of BWP indices, indicating a transition of the cell from the non-dormant state to the dormant state.

15. The method of claim 11, wherein the configuration parameters for the non-dormant BWP comprise a non-dormant BWP index, from a plurality of BWP indices, indicating a transition of the cell from the dormant state to the non-dormant state of the cell.

16. The method of claim 15, wherein the configuration parameters for the dormant BWP comprises a dormant BWP index, from the plurality of BWP indices, indicating a transition of the cell from the non-dormant state to the dormant state.

17. The method of claim 16, wherein the dormant BWP of the cell is not configured with a search space.

18. A computer program stored on a non-transitory computer-readable storage medium, wherein the computer program, when executed on a processor, performs the method as claimed in claim 11.

19. A base station comprising at least one processor and memory storing instructions that, when executed by the at least one processor, cause the base station to perform the method of the claim 11.

* * * * *